US012739849B2

(12) United States Patent
Lo et al.

(10) Patent No.: US 12,739,849 B2
(45) Date of Patent: Sep. 15, 2026

(54) RESOURCE CANCELLATION METHOD AND USER EQUIPMENT

(71) Applicant: Acer Incorporated, New Taipei City (TW)

(72) Inventors: Li-Chung Lo, New Taipei City (TW); Chien-Min Lee, New Taipei City (TW); Jen-Hsien Chen, New Taipei City (TW)

(73) Assignee: Acer Incorporated, New Taipei City (TW)

( * ) Notice: Subject to any disclaimer, the term of this patent is extended or adjusted under 35 U.S.C. 154(b) by 429 days.

(21) Appl. No.: 18/358,040

(22) Filed: Jul. 25, 2023

(65) Prior Publication Data

US 2024/0057115 A1 Feb. 15, 2024

Related U.S. Application Data

(60) Provisional application No. 63/397,395, filed on Aug. 12, 2022.

(51) Int. Cl.
*H04W 72/232* (2023.01)
*H04L 5/00* (2006.01)
*H04W 72/044* (2023.01)

(52) U.S. Cl.
CPC ......... *H04W 72/232* (2023.01); *H04L 5/0048* (2013.01); *H04L 5/0055* (2013.01); *H04W 72/044* (2013.01)

(58) Field of Classification Search
CPC ............. H04W 72/232; H04W 72/044; H04W 72/1268; H04W 72/0446; H04W 72/0453; H04W 72/21; H04W 72/231; H04L 5/0048; H04L 5/0055; H04L 5/0051; H04L 5/0053; H04L 5/0094; H04L 5/0091; H04B 7/0697
USPC .......................................................... 370/329
See application file for complete search history.

(56) References Cited

U.S. PATENT DOCUMENTS

2021/0204358 A1* 7/2021 Babaei .................. H04W 72/23
2021/0259002 A1* 8/2021 Hosseini ............... H04W 72/56
2021/0289525 A1* 9/2021 Khoshnevisan ........ H04L 1/189
2021/0352673 A1* 11/2021 Yang ..................... H04L 5/0085

(Continued)

FOREIGN PATENT DOCUMENTS

WO 2021159065 8/2021
WO 2021255938 12/2021

OTHER PUBLICATIONS

Vivo, "UL inter-UE Tx prioritization for URLLC", R1-1910225, Oct. 14-20, 2019. (From Applicant's IDS) (Year: 2019).*

(Continued)

*Primary Examiner* — Mang Hang Yeung
(74) *Attorney, Agent, or Firm* — JCIPRNET

(57) ABSTRACT

A resource cancellation method and user equipment (UE) are provided. In the method, a resource configuration is received; the first DCI associated with the resource configuration is received; and a first uplink (UL) transmission on the serving cell is cancelled according to the first downlink control information (DCI). The resource configuration indicates a position of first information for a serving cell in a first DCI, and the first information is associated with a first set of time and frequency resource in the serving cell.

47 Claims, 50 Drawing Sheets

(56) References Cited

U.S. PATENT DOCUMENTS

2022/0386355 A1* 12/2022 Yi .......................... H04W 72/23
2025/0274961 A1* 8/2025 Lim ...................... H04B 7/0628

OTHER PUBLICATIONS

Ericsson, "Inter-UE Prioritization and Multiplexing of UL Transmissions", R1-1911949, Nov. 18-22, 2019. (From Applicant's IDS) (Year: 2019).*
Vivo, "UL inter-UE Tx prioritization for URLLC", 3GPP TSG RAN WG1 #98bis, RI-1910225, Oct. 2019, pp. 1-12.
Ericsson, "Inter-UE Prioritization and Multiplexing of UL Transmissions", 3GPP TSG-RAN WG1 Meeting #99, RI-1911949, Nov. 2019, pp. 1-11.

* cited by examiner

Low priority UL transmission

S-DCI operation

<$B_0$, $B_1$>:<00>

<$B_0$, $B_1$>:<01>

<$B_0$, $B_1$>:<00,01>

<$B_0$, $B_1$>:<10,11>

UE without capability of beam specific CI may read

UE with capability of beam specific CI may read

RESOURCE CANCELLATION METHOD AND USER EQUIPMENT

CROSS-REFERENCE TO RELATED APPLICATION

This application claims the priority benefit of U.S. provisional patent application Ser. No. 63/397,395, filed on Aug. 12, 2022. The entirety of the above-mentioned patent application is hereby incorporated by reference herein and made a part of this specification.

BACKGROUND

1. Field of the Disclosure

The present disclosure generally relates to a resource cancellation method and user equipment (UE).

2. Description of Related Art

A base station may schedule uplink (UL) transmission with priority. For example, FIG. 1A is a schematic diagram that illustrates an example of scheduling transmissions. Referring to FIG. 1A, a gNB schedules a low-priority (LP) UL transmission for UE1 and schedules a high-priority (HP) UL transmission for UE2. It should be noticed that, in actual implementation, multiple scheduled transmissions for different UEs may collide. For example, FIG. 1B is a schematic diagram that illustrates an example of transmission collision. Referring to FIG. 1A and FIG. 1B, gNB schedules the resources of the LP UL transmission by downlink control information (DCI) #1 at slot n (where n is an integer). However, gNB may schedule the HP UL transmission over the LP UL transmission's resources by DCI #2 at slot n+1, and result in a collision between the transmission of two UEs. Therefore, a UL cancellation indication (CI) DCI would be needed to cancel one or some of the UL transmissions.

SUMMARY

Accordingly, the present disclosure is directed to a resource cancellation method and user equipment.

According to one or more exemplary embodiments of the disclosure, a resource cancellation method is adapted for a UE. The method includes: receiving a resource configuration; receiving the first DCI associated with the resource configuration; and cancelling a first uplink (UL) transmission on the serving cell according to the first downlink control information (DCI). The resource configuration indicates a position of first information for a serving cell in a first DCI, and the first information is associated with a first set of time and frequency resource in the serving cell.

According to one or more exemplary embodiments of the disclosure, a UE includes a transceiver, a memory, and a processor. The transceiver is used for transmitting or receiving signals. The memory is used for storing a program code. The processor is coupled to the transceiver and the memory. The processor is configured for executing the program to: receiving, through the transceiver, a resource configuration; receiving, through the transceiver, the first DCI associated with the resource configuration; and cancelling a first UL transmission on the serving cell according to the first DCI. The resource configuration indicates a position of first information for a serving cell in a first DCI, and the first information is associated with a first set of time and frequency resource in the serving cell.

According to one or more exemplary embodiments of the disclosure, a resource cancellation method is adapted for a network device. The method includes: transmitting a resource configuration; and transmitting the first DCI associated with the resource configuration. The resource configuration indicates a position of first information for a serving cell in a first DCI, and the first information is associated with a first set of time and frequency resource in the serving cell. The first DCI indicates cancelling a first UL transmission on the serving cell.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1A:
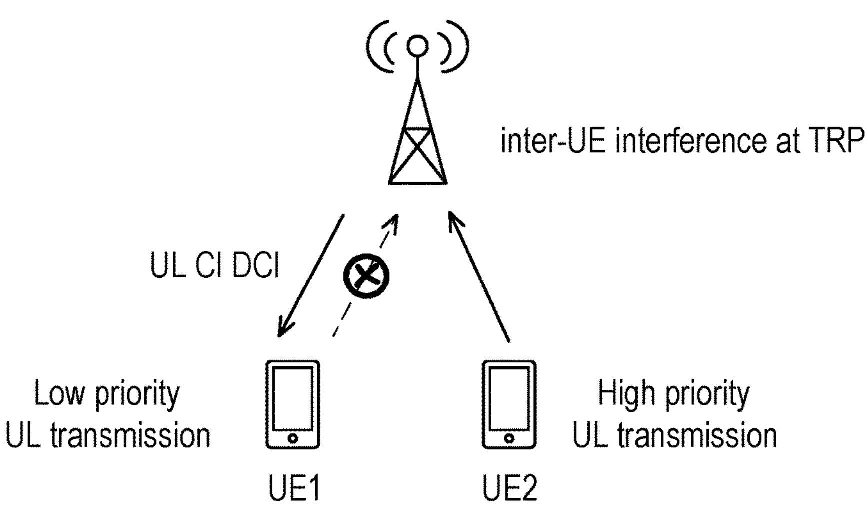
FIG. 1A is a schematic diagram that illustrates an example of scheduling transmissions.
Figure 1B:
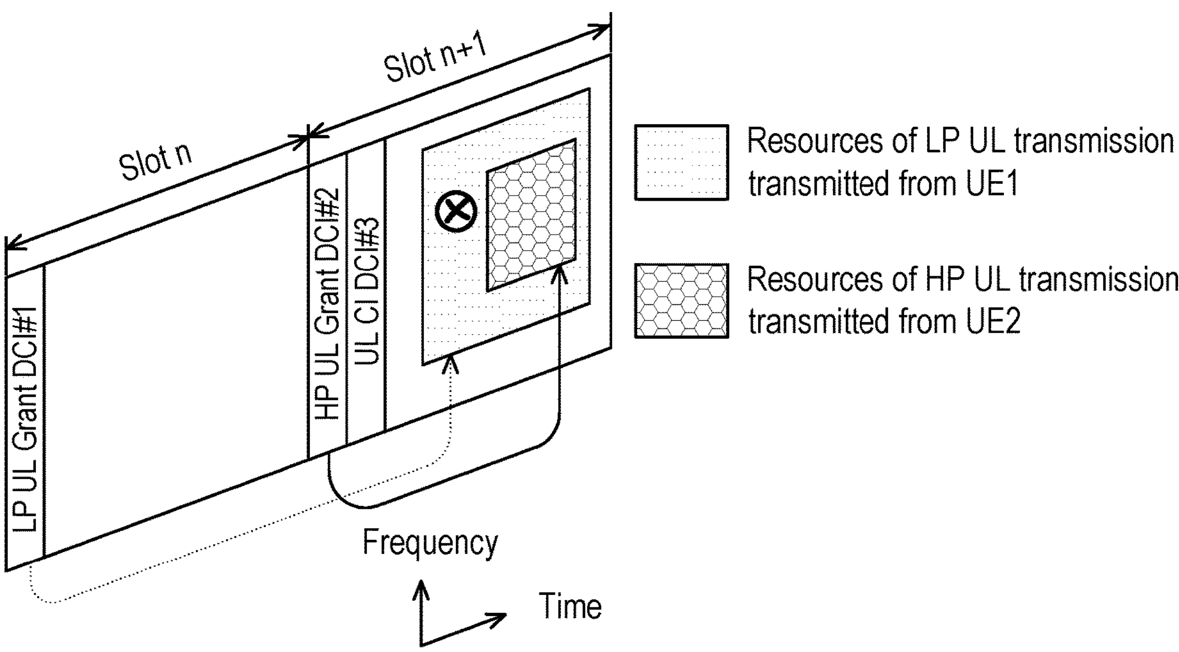
FIG. 1B is a schematic diagram that illustrates an example of transmission collision.

Reference will now be made in detail to the present preferred embodiments of the disclosure, examples of which are illustrated in the accompanying drawings. Wherever possible, the same reference numbers are used in the drawings and the description to refer to the same or like parts.

The abbreviations in the present disclosure are defined as follows and unless otherwise specified, the acronyms have the following meanings:

| Abbreviation | Full name |
|---|---|
| CRC | Cyclic redundancy check |
| CORESET | Control Resource Set |
| DCI | Downlink control information |
| DMRS | Demodulation reference signal |
| DL | Downlink |
| ID | Identity |
| MAC | Medium access control |
| MAC CE | MAC control element |
| MIMO | Multiple input multiple output |

-continued

| Abbreviation | Full name |
|---|---|
| mTRP(M-TRP) | Multiple TRP |
| PDCCH | Physical downlink control channel |
| PUSCH | Physical uplink shared channel |
| QCL | Quasi co-located |
| RNTI | Radio Network Temporary Identifier |
| RRC | Radio resource control |
| RS | Reference signal |
| RV | Redundancy version |
| Rx beam | Receiving beam |
| SFN | Single frequency network |
| SRS | Sound reference signal |
| TB | Transport block |
| TCI | Transmission Configuration Indicator |
| TDM | Time domain multiplexing |
| TRP | Transmission reception point |
| UE | User equipment |
| UL | Uplink |
| WID | Working item description |
| ACK | Acknowledgment |
| BWP | Bandwidth part |
| CC | Component carrier |
| CDM | Code division multiplexing |
| CG | Configured grant |
| CS | Configured Scheduling |
| CSI-RS | Channel state information reference signal |
| DMRS | Demodulation reference signals |
| FDRA | Frequency domain resource allocation |
| TDRA | Time domain resource allocation |
| gNodeB | next Generation Node B |
| HARQ | Hybrid Automatic Repeat request |
| MCS | Modulation coding scheme |
| NR | New radio |
| PDSCH | Physical downlink shared channel |
| PUCCH | Physical uplink control channel |
| RV | Redundancy version |
| SS | Search space |
| SSB | Synchronization signal block |
| SSBRI | Synchronization signal block resource indicator |
| SPS | Semi Persistent Scheduling |
| sTRP(S-TRP) | Single TRP |
| Tx beam | Transmitted beam |
| LP | Low priority |
| HP | High priority |
| CI | Cancellation indication |
| STxMP | Simultaneous multi-panel UL transmission |
| FR | Frequency range |
| CPE | Customer premises equipment |
| FWA | Fixed wireless access network |
| S-DCI | Single DCI |
| M-DCI | Multiple DCI |
| PRB | Physical resource block |
| OFDM | Orthogonal frequency domain multiplexing |
| CW | Codeword |
| SDM | Spatial domain multiplexing |
| T/F | Time/frequency |

Some related technologies are introduced first.

Spatial relative information in the disclosure may be:

TRP ID/indication/indicator;

Panel ID/indication/indicator;

a value of CORESETPoolIndex;

SRS resource set ID/indication/indicator;

SRS resource ID/indication/indicator;

TCI state ID/indication/indicator;

UL TCI state ID/indication/indicator;

DL TCI state ID/indication/indicator;

Joint TCI state ID/indication/indicator;

QCL-Type D;

RS ID/indication/indicator;

SSB resource ID/indication/indicator;

CSI-RS resource set ID/indication/indicator;

CSI-RS resource ID/indication/indicator;

capability ID/indication/indicator;

. . . but not limited herein.

UL transmission in the disclosure may be:

PUSCH;

LP PUSCH;

HP PUSCH;

SRS;

PUCCH;

. . . , but not limited herein

Cancel in the disclosure may be:

stop;

disable;

. . . , but not limited herein

RS in the disclosure may be DL RS and/or UL RS.

A DL RS configuration in the disclosure may be:

a DM-RS group;

a DM-RS group index;

a DM-RS resource;

a DM-RS resource index;

a DM-RS port index;

a DM-RS port;

a CSI-RS resource set index;

a CSI-RS resource set;

a CSI-RS resource index;

a CSI-RS resource;

a CSI-RS port index;

a CSI-RS port;

a SSB resource set index;

a SSB resource set;

a SSB resource index;

a SSB resource;

a SSB port index;

a SSB port;

. . . , but not limited herein.

A UL RS configuration in the disclosure may be:

a DM-RS group;

a DM-RS group index;

a DM-RS resource;

a DM-RS resource index;

a DM-RS port index;

a DM-RS port;

a RACH group;

a RACH group index;

a RACH resource;

a RACH resource index;

a SRS resource set index;

a SRS resource set;

a SRS resource index;

a SRS resource;

a SRS port index;

a SRS port;

. . . but not limited herein.

A CSI-RS in the disclosure may be:

a CSI-RS resource set index;

a CSI-RS resource set;

a CSI-RS resource index;

a CSI-RS resource;

a CSI-RS port index;

a CSI-RS port;

. . . but not limited herein.

A SSB in the disclosure may be:

a SSB resource set index;

a SSB resource set;

a SSB resource index;

a SSB resource;

a SSB port index;

a SSB port;

. . . but not limited herein.

A SRS in the disclosure may be:

a SRS resource set index;

a SRS resource set;

a SRS resource index;

a SRS resource;

a SRS port index;

a SRS port;

. . . , but not limited herein.

A beam in the disclosure may be represented by:

an antenna;

an antenna port;

an antenna element;

a group of antenna;

a group of antenna port;

a group of antenna element;

a spatial domain filter;

a reference signal resource;

a QCL assumption;

. . . , but not limited herein.

For example, a first beam may be represented as a first antenna port or a first group of antenna port or a first spatial domain filter.

For example, a first beam direction may be represented as a QCL assumption or a spatial domain filter.

A spatial domain filter in configuration in the disclosure may be:

a spatial Rx filter;

a spatial Tx filter.

A spatial Rx filter in configuration in the disclosure may be:

a Rx beam;

a spatial Rx parameter;

a spatial domain receive filter;

a panel;

. . . , but not limited herein.

A spatial Tx filter in configuration in the disclosure may be:

a Tx beam;

a spatial Tx parameter;

a spatial domain transmission filter;

a panel;

. . . , but not limited herein.

A TRP (e.g., transmission reception point) in the disclosure may be:

a cell;

a serving cell;

a gNodeB (e.g., next Generation Node B);

a panel;

an unlicensed cell;

an unlicensed serving cell;

an unlicensed TRP;

an eNodeB (evolved NodeB);

. . . , but not limited herein.

A codepoint in the disclosure may be:

index;

value;

identity;

. . . , but not limited herein.

PDSCH antenna port in the disclosure may be:

DM-RS port of a PDSCH

. . . , but not limited herein.

An index or an identity in the disclosure may be:

CORESETPoolIndex;

TRP ID;

Panel ID;

. . . , but not limited herein.

In the disclosure, UE may be configured with at least one of following for multiple TRP operation:

a set of CORESETPoolIndex;

a set of TRP;

a set of panel;

. . . , but not limited herein.

A PDSCH in the disclosure may be:

PUSCH;

DL assignment;

SPS scheduling;

Configured grant;

. . . , but not limited herein.

Communication device in the disclosure may be represented by UE, or gNodeB, but not limited herein.

Combinations of embodiments disclosed in the disclosure are not precluded.

All steps in the embodiment may not be performed in a step-by-step way.

Embodiments disclosed in the disclosure may apply for unlicensed band, licensed band, non-DRX mode, DRX mode, or power saving, but not limited herein.

Figure 2:
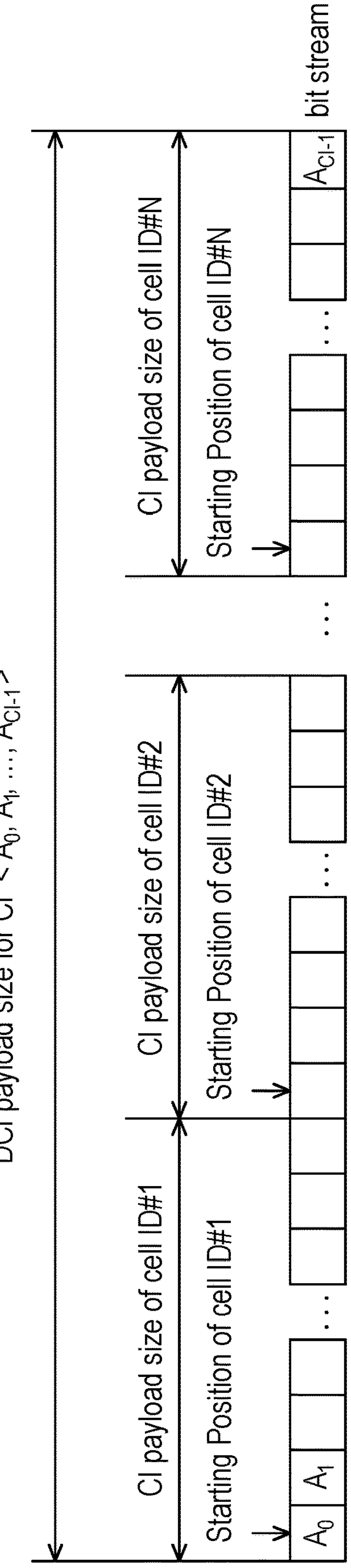
FIG. 2 is a schematic diagram that illustrates an uplink (UL) cancellation indication (CI) downlink control information (DCI).

FIG. 2 is a schematic diagram that illustrates an uplink (UL) cancellation indication (CI) downlink control information (DCI). Referring to FIG. 2, UE may receive a (group Common, for example) DCI (e.g., format 2_4) for cancelling/stopping (e.g., low priority) UL transmission according to an indicated time/frequency resource. This DCI may be called UL cancellation indication (CI) DCI. The DCI may be scrambled with a value of radio network temporary identifier (RNTI) (e.g., cancellation indication radio network temporary identifier (CI-RNTI)). DCI payload size for CI, CI payload size of cell ID #n (for example, bit $A_0$ to bit $A_{CI-1}$), and Starting Position of cell ID #n are configurable, where n is an integer.

A DCI (e.g., format 2_4) may be used for notifying the physical resource block(s) (PRB)(s) and orthogonal frequency-division multiplexing (OFDM symbol(s) where UE may cancel the corresponding UL transmission from the UE. At least one cancellation indication may be transmitted by means of the DCI (e.g., format 2_4) with CRC scrambled by (e.g., ci-RNTI). The size of the DCI (e.g., format 2_4) may be configurable by higher layers parameter e.g., dci-PayloadSizeForCI up to e.g., 126 bits. The number of bits for each cancellation indication may be configurable by higher layer parameter e.g., ci-PayloadSize. For a UE, there may be at most one cancellation indication for a UL carrier.

Figure 3:
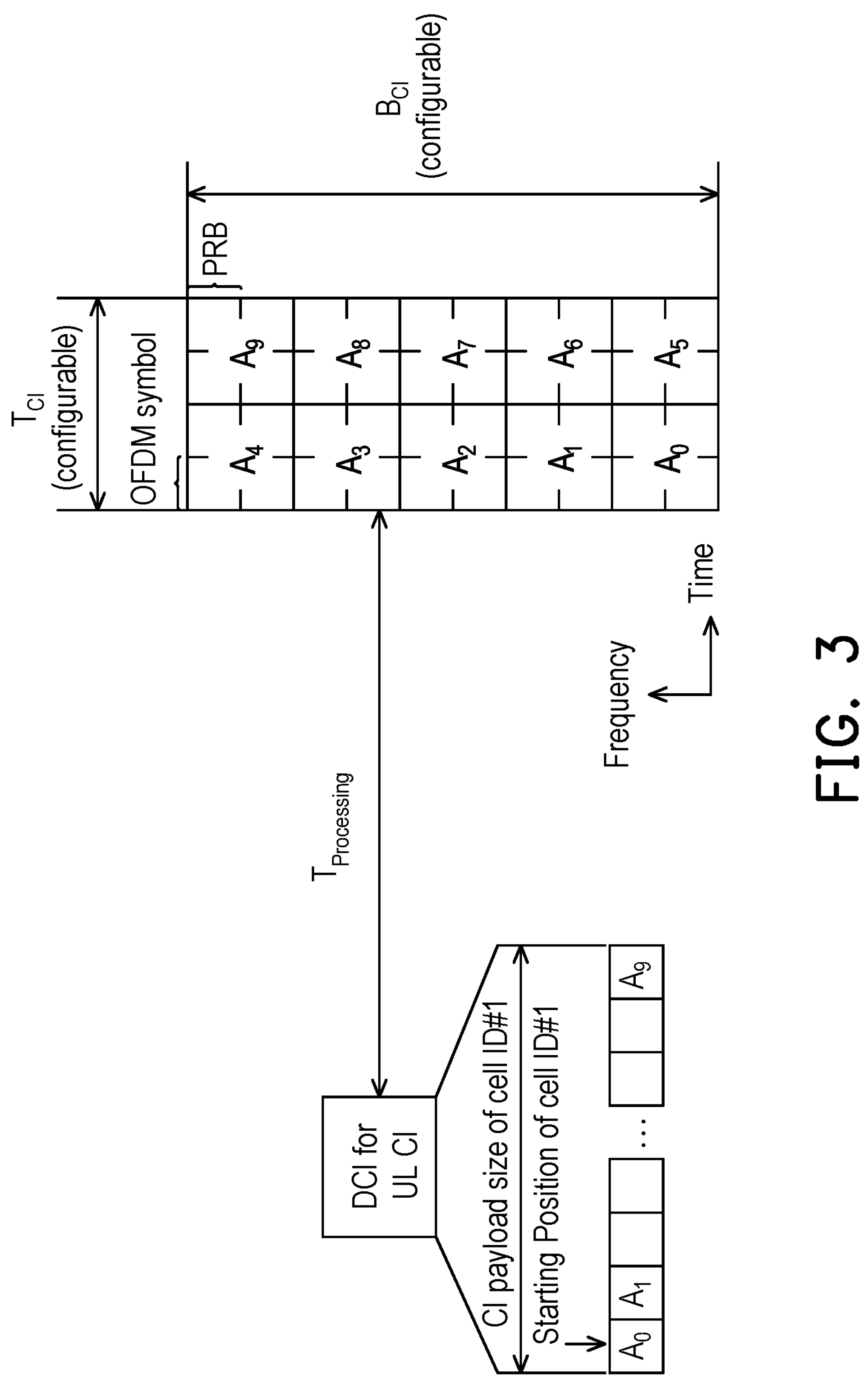
FIG. 3 is a schematic diagram that illustrates a resource mapping of UL CI DCI.
Figure 4:
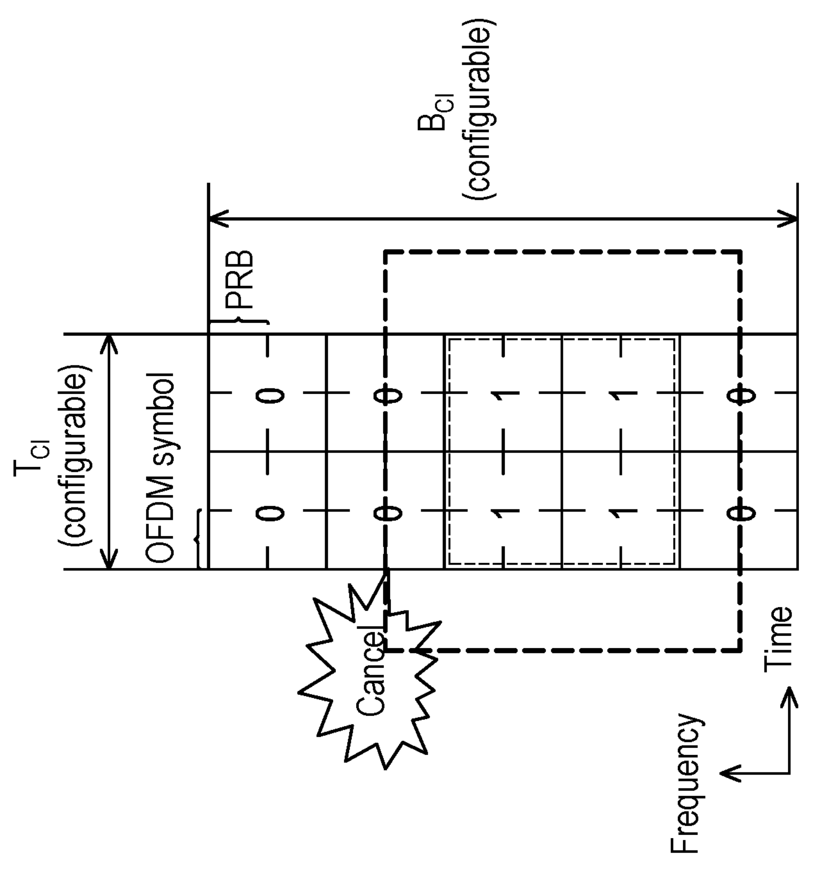
FIG. 4 is a schematic diagram that illustrates an example of transmission cancellation.

FIG. 3 is a schematic diagram that illustrates a resource mapping of UL CI DCI. Referring to FIG. 3, a bit (e.g., bit $A_0$ to bit $A_9$) in the DCI may be mapped to a region of time/frequency resources. For example, a region occupies two PRBs over two OFDM symbols. FIG. 4 is a schematic diagram that illustrates an example of transmission cancellation. Referring to FIG. 4, if the region is indicated by the bit (with value e.g., "1"), and/or if a (low priority (LP), for example) UL transmission is overlapping with the region, UE may cancel/stop the UL transmission. It should be noticed that the duration $T_{CI}$ of configured OFDM symbols and/or the number $B_{CI}$ of configured PRBs is configurable.

In CI DCI, UE may be configured/provided at least one following:

a value of RNTI e.g., CI-RNTI;

a DCI payload size for the DCI (e.g., format 2_4) (e.g., for CI);

at least one serving cell index.

each serving cell index may be associated with at least one following:

a CI payload size ($N_{CI}$) of the serving cell;

a location of the serving cell for fields in DCI (e.g., format 2_4);

a Position in DCI: starting position (in number of bit) of the CI payload size for the serving cell index within the DCI payload;

an indication for time-frequency resources:

the reference time and frequency region where a detected UL CI may be applicable of the serving cell;

a frequency region for CI ($B_{CI}$): a number of PRBs:

a reference frequency region where a detected UL CI may be applicable of the serving cell;

a time duration for CI ($T_{CI}$): a number of symbols:

a reference time region in symbols where a detected UL CI may be applicable of the serving cell;

a time granularity For CI ($G_{CI}$):

a number of partitions for the time duration for CI symbols;

a number of partitions within the time region of the serving cell;

a Uplink cancellation priority:

UL CI may be applicable to the UL transmissions indicated/configured as e.g., low priority level;

UL CI may be applicable to the UL transmissions irrespective of its priority level.

An indication by a DCI (e.g., format 2_4) for a serving cell may be applicable to a PUSCH transmission or an SRS transmission on the serving cell. If the physical uplink shared channel (PUSCH) transmission or the sounding reference signal (SRS) transmission is scheduled by a DCI format, the indication by the DCI (e.g., format 2_4) may be applicable to the PUSCH transmission or SRS transmission if the last symbol of the physical downlink control channel (PDCCH) reception providing the DCI format is earlier than the first symbol of the PDCCH reception providing the DCI (e.g., format 2_4).

For a serving cell, the UE may determine the first symbol of the $T_{CI}$ symbols to be the first symbol that may be after a $1^{st}$ processing time from the end of a PDCCH reception where the UE may detect the DCI (e.g., format 2_4), where the $1^{st}$ processing time may be obtained from a 2nd processing time for PUSCH processing capability associated with an offset.

UE may not expect to cancel the PUSCH transmission or the SRS transmission before a corresponding symbol that is the 2nd processing time after the last symbol of the PDCCH reception where the UE may detect the DCI (e.g., format 2_4).

A UE that may detect a DCI (e.g., format 2_4) for a serving cell may cancel at least one of the following:

a PUSCH transmission;

an actual repetition of a PUSCH transmission if the PUSCH transmission is with repetition Type B;

an SRS transmission on the serving cell.

The condition of UL transmission cancellation includes at least one of following:

the transmission may be PUSCH with e.g., low priority 0;

a group of symbols, from the $T_{CI}$ symbols, may have at least one bit value of '1' in the corresponding set of $N_{BI}=N_{CI}/G_{CI}$ bits in the DCI (e.g., format 2_4) and/or may include a symbol of the (repetition of the) PUSCH transmission or a symbol of the SRS transmission;

a group of PRBs, from the $B_{CI}$ PRBs, may have a corresponding bit value of '1' in the set of bits corresponding to the group of symbols in the DCI (e.g., format 2_4) and may include a PRB of the (repetition of the) PUSCH transmission or a PRB of the SRS transmission.

The cancellation of the (repetition of the) PUSCH transmission may include all symbols from the earliest symbol of the (repetition of the) PUSCH transmission that may be in a group of symbols having corresponding bit values of '1' in the DCI (e.g., format 2_4). The cancellation of the SRS transmission may include only symbols that are in one or more groups of symbols having corresponding bit values of '1' in the DCI (e.g., format 2_4).

If a UE cancels a $1^{st}$ UL transmission (e.g., a PUSCH transmission or an SRS transmission) based on a $1^{st}$ DCI format e.g., for UL CI, the UE may not expect to be scheduled by a $2^{nd}$ DCI format to transmit a $2^{nd}$ UL transmission (e.g., a PUSCH or an SRS) over a first set of symbols. The first set of symbols may include symbols of the cancelled $1^{st}$ UL transmission. The last symbol of the PDCCH reception providing the $2^{nd}$ DCI format may be later than the first symbol of the PDCCH reception providing the $1^{st}$ DCI format.

If UL CI priority indicators are configured for a given UE, if a field (e.g., uplink cancellation priority) is present, then UL CI may be applicable to a UL transmission indicated/configured as low priority level, where the UL transmission may be associated with based on, for example, a $1^{st}$ DCI format for UL CI; if the field (e.g., uplink cancellation priority) is absent, UL CI may be applicable to a UL transmission irrespective of its priority level, where the UL transmission may be associated with based on, for example, a $1^{st}$ DCI format for UL CI.

Figure 5:
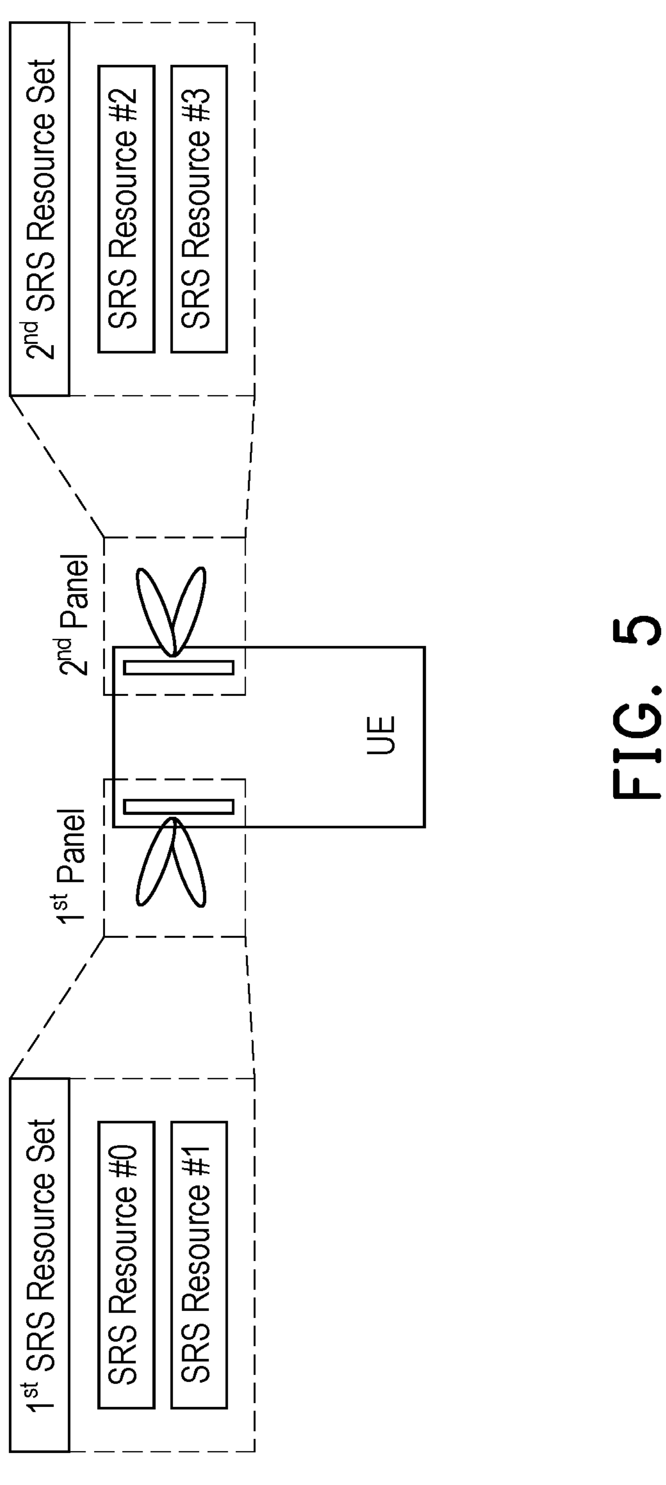
FIG. 5 is a schematic diagram that illustrates a sounding reference signal (SRS) configuration and an antenna arrangement.

FIG. 5 is a schematic diagram that illustrates a sounding reference signal (SRS) configuration and an antenna arrangement. Referring to FIG. 5, UE may be configured at least one SRS resource set. One resource in each of multiple SRS sets may be transmitted at a given time instant. SRS resources in different SRS resource sets may be transmitted simultaneously. The SRS resource set may be associated with a panel. For example, a UE has two panels in which $1^{st}$ panel is associated with $1^{st}$ SRS resource set and $2^{nd}$ panel is associated with $2^{nd}$ SRS resource set. The $1^{st}$ SRS resource set includes SRS resources #0 and #1, and the $2^{nd}$ SRS resource set includes SRS resources #2 and #3.

Figure 6:
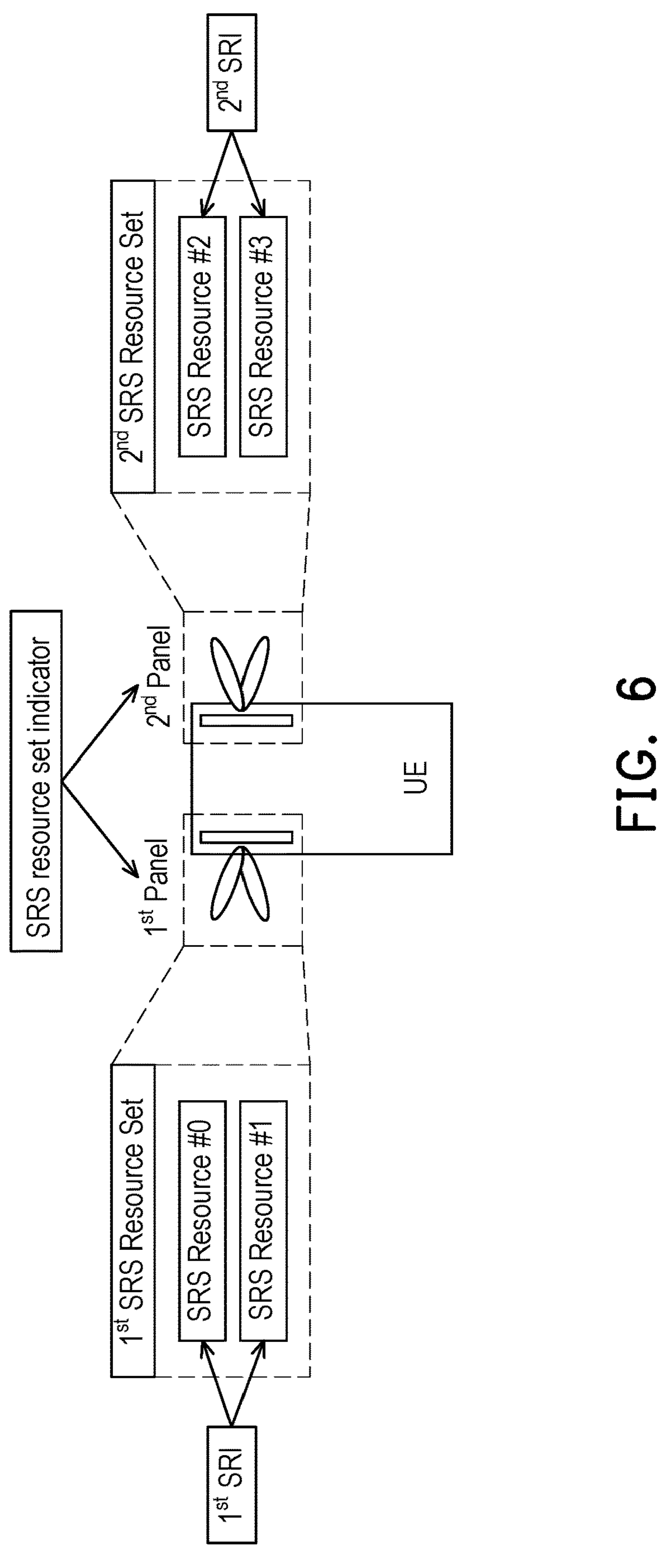
FIG. 6 is a schematic diagram that illustrates SRS resource indicators and an antenna arrangement.

FIG. 6 is a schematic diagram that illustrates SRS resource indicators and an antenna arrangement. Referring to FIG. 6, UL grant DCI, for example, Format 0_1/0_2, may include at least one of the following fields:

SRS resource set indicator: implicit panel indicator, for example, the $1^{st}$ panel and the $2^{nd}$ panel as shown in the figure;

$1^{st}$ SRS resource indicator ($1^{st}$ SRI): implicit Tx beam indicator associated with indicated panel, for example, the SRS resources #0 and #1 as shown in the figure;

$2^{nd}$ SRS resource indicator ($2^{nd}$ SRI): implicit Tx beam indicator associated with the indicated panel, for example, the SRS resources #2 and #3 as shown in the figure.

Figure 7A:
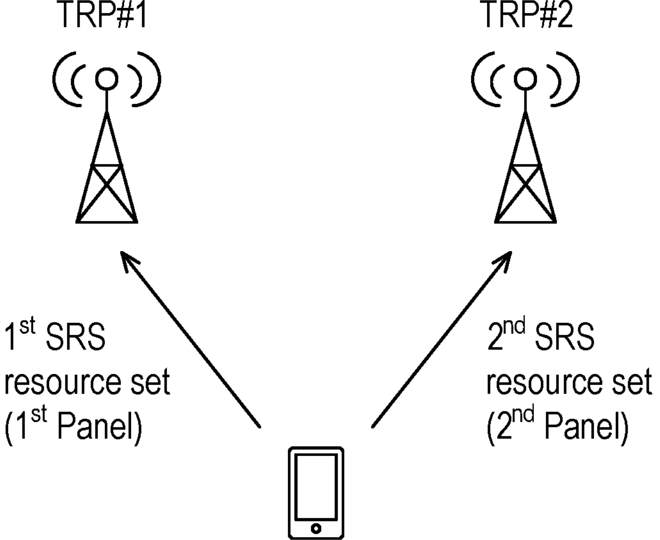
FIG. 7A to FIG. 7C are schematic diagrams that illustrate SRS resource set indicators for time-division multiplexing (TDM) based physical uplink shared channel (PUSCH) repetition.
Figure 7B:
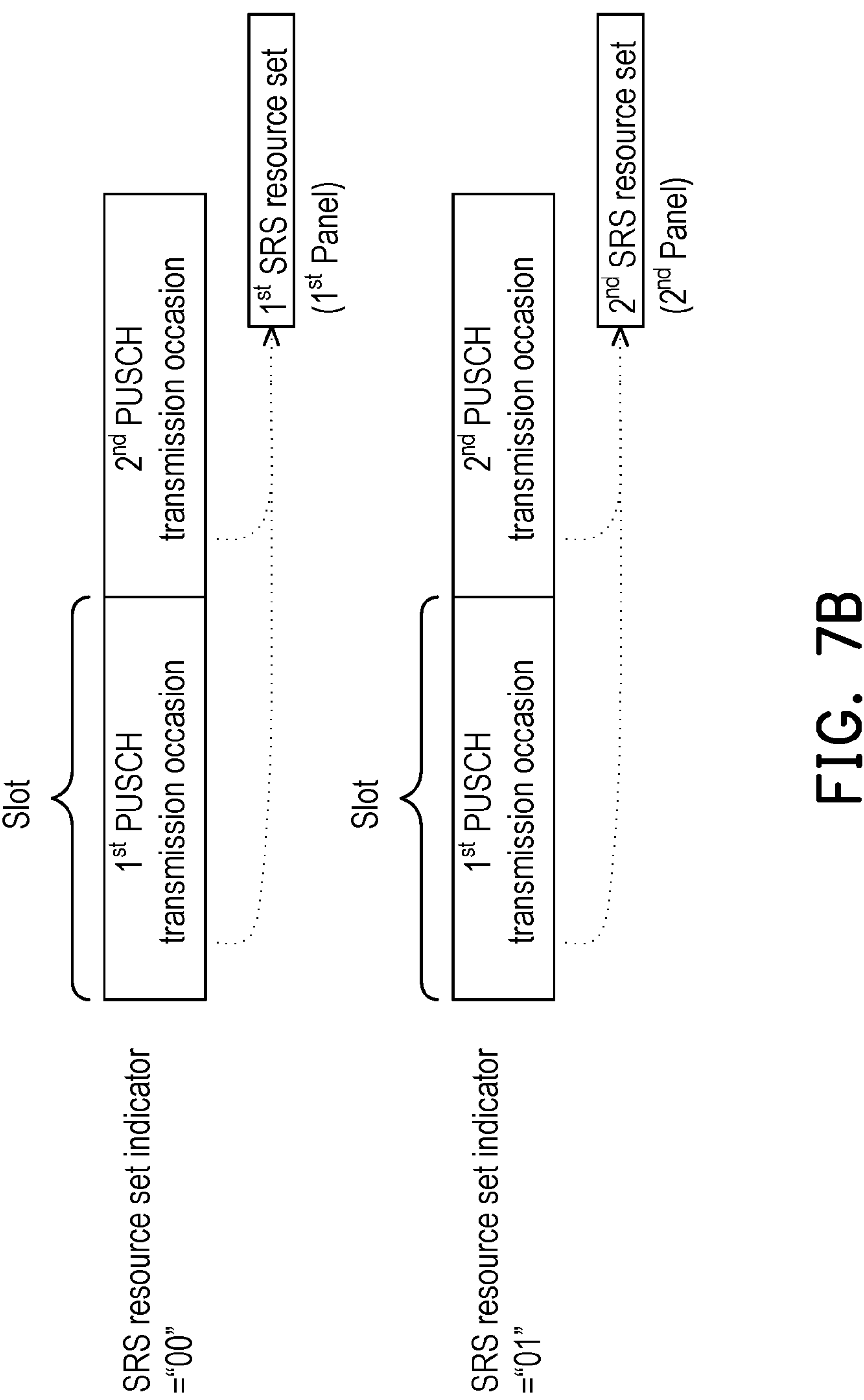
Figure 7C:
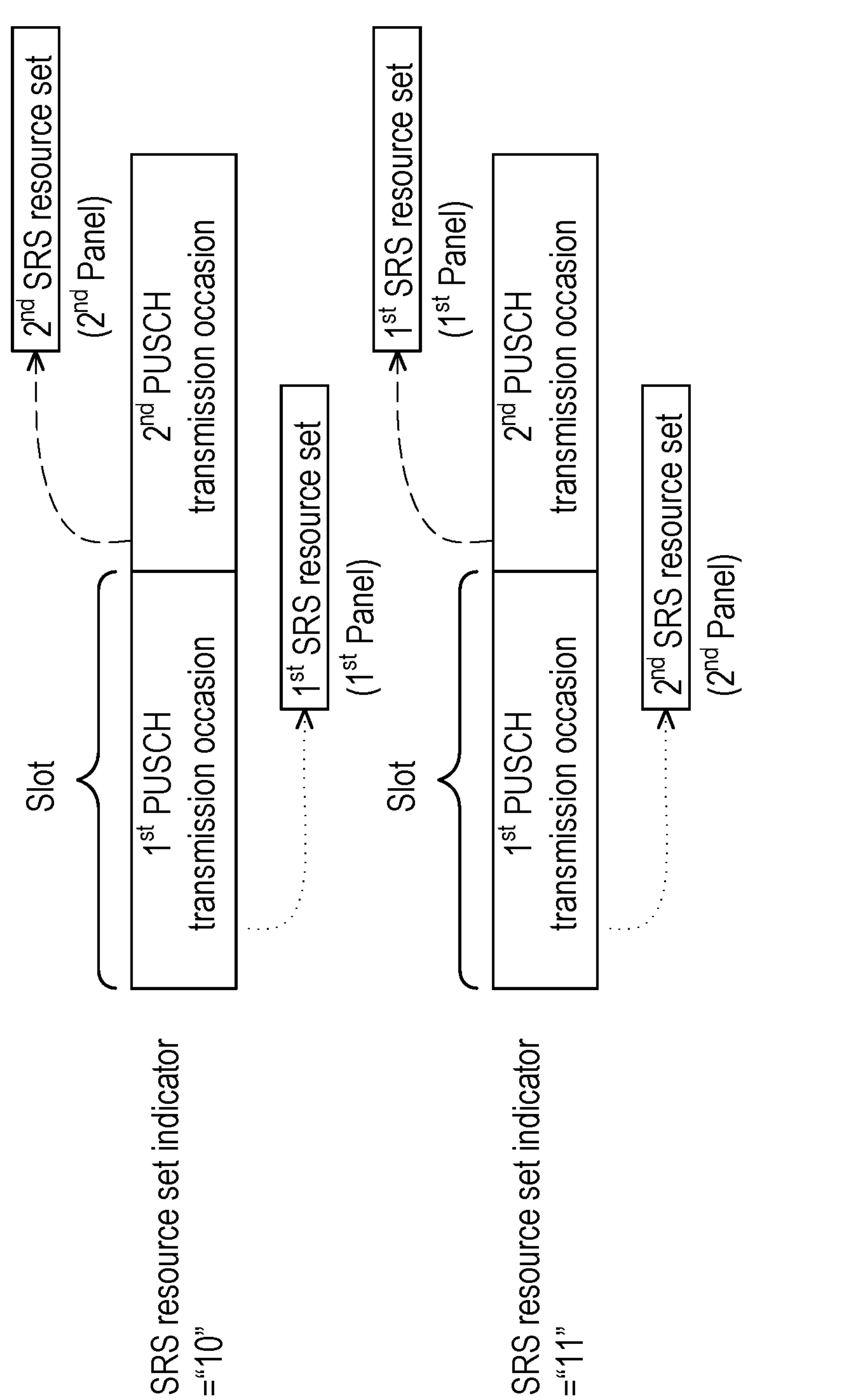

FIG. 7A to FIG. 7C are schematic diagrams that illustrate SRS resource set indicators for time-division multiplexing (TDM) based physical uplink shared channel (PUSCH) repetition. Referring to FIG. 7A and FIG. 7B, UL grant DCI, for example, Format 0_1/0_2, may include at least one of the following fields:

Time domain resource assignment: number of repetitions=e.g., 2;

SRS resource set indicator:

a codepoint (e.g., 00) may indicate PUSCH transmission associated with a $1^{st}$ SRS resource set corresponding to the $1^{st}$ panel;

a codepoint (e.g., 01) may indicate PUSCH transmission associated with a $2^{nd}$ SRS resource set corresponding to the $2^{nd}$ panel.

For example, if the time domain resource assignment is 2 and the SRS resource set indicator is configured with "00" as shown in FIG. 7B, PUSCH transmissions over two consecutive slots would be allocated to the 1st SRS resource set corresponding to the 1st panel. For another example, if the time domain resource assignment is 2 and the SRS resource set indicator is configured with "01" as shown in FIG. 7B, PUSCH transmissions over two consecutive slots would be allocated to the 2nd SRS resource set corresponding to the 2nd panel.

Referring to FIG. 7A and FIG. 7C, UL grant DCI, for example, Format 0_1/0_2, may include at least one of the following fields:

- Time domain resource assignment: number of repetitions=e.g., 2'
- SRS resource set indicator:
  - a codepoint (e.g., 10) may indicate PUSCH transmission associated with a 1st and a 2nd SRS resource sets which may be applied to the first and second slot of 2 consecutive slots, respectively;
  - a codepoint (e.g., 11) may indicate PUSCH transmission associated with a 2nd and a 1st SRS resource sets which may be applied to the first and second slot of 2 consecutive slots, respectively.

For example, if the time domain resource assignment is 2 and the SRS resource set indicator is configured with "10" as shown in FIG. 7C, PUSCH transmissions over two slots would be allocated to the 1st SRS resource set corresponding to the 1st panel and the 2nd SRS resource set corresponding to the 2nd panel, respectively. For another example, if the time domain resource assignment is 2 and the SRS resource set indicator is configured with "11" as shown in FIG. 7C, PUSCH transmissions over two slots would be allocated to the 2nd SRS resource set corresponding to the 2nd panel and the 1st SRS resource set corresponding to the 1st panel, respectively.

The 1st and the 2nd SRS resource sets may be respectively the ones with lower and higher SRS resource set ID of the two SRS resources sets configured by higher layer parameter. When two SRS resource sets are configured, for PUSCH repetition Type A, in case K>1, the same symbol allocation is applied across the K consecutive slots and the PUSCH is limited to a single transmission layer. The UE may repeat the TB across the K consecutive slots applying the same symbol allocation in each slot, and the association of the first and second SRS resource set to each slot may be determined as follows:

- if a DCI (e.g., format 0_1 or DCI format 0_2) indicates codepoint e.g., "00" for the SRS resource set indicator, the first SRS resource set may be associated with all K consecutive slots;
- if a DCI (e.g., format 0_1 or DCI format 0_2) indicates codepoint e.g., "01" for the SRS resource set indicator, the second SRS resource set may be associated with all K consecutive slots.

The UE may repeat the TB across the K consecutive slots applying the same symbol allocation in each slot, and the association of the first and second SRS resource set to each slot may be determined as follows:

- if a DCI (e.g., format 0_1 or DCI format 0_2) indicates codepoint e.g., "10" for the SRS resource set indicator, the first and second SRS resource set association to K consecutive slots may be determined as follows:
  - when K=2, the first and second SRS resource sets may be applied to the first and second slot of 2 consecutive slots, respectively;
  - when K>2 and/or cyclic mapping is enabled, the first and second SRS resource sets may be applied to the first and second slot of K consecutive slots, respectively, and the same SRS resource set mapping pattern may continue to the remaining slots of K consecutive slots;
  - when K>2 and/or sequential mapping is enabled, first SRS resource set may be applied to the first and second slots of K consecutive slots, and the second SRS resource set may be applied to the third and fourth slot of K consecutive slots, and the same SRS resource set mapping pattern may continue to the remaining slots of K consecutive slots.

The UE may repeat the TB across the K consecutive slots applying the same symbol allocation in each slot, and the association of the first and second SRS resource set to each slot may be determined as follows:

- if a DCI (e.g., format 0_1 or DCI format 0_2) indicates codepoint e.g., "11" for the SRS resource set indicator, the first and second SRS resource set association to K consecutive slots may be determined as follows:
  - when K=2, the second and first SRS resource set may be applied to the first and second slot of 2 consecutive slots, respectively;
  - when K>2 and/or cyclic mapping is enabled, the second and first SRS resource sets may be applied to the first and second slot of K consecutive slots, respectively, and the same SRS resource set mapping pattern may continue to the remaining slots of the K consecutive slots;
  - when K>2 and/or sequential mapping is enabled, the second SRS resource set may be applied to the first and second slot of K consecutive slots, and the first SRS resource set may be applied to the third and fourth slot of K consecutive slots, and the same SRS resource set mapping pattern may continue to the remaining slots of the K consecutive slots.

Note that: slots in the disclosure may be nominal repetitions, but not limited herein.

Figure 8A:
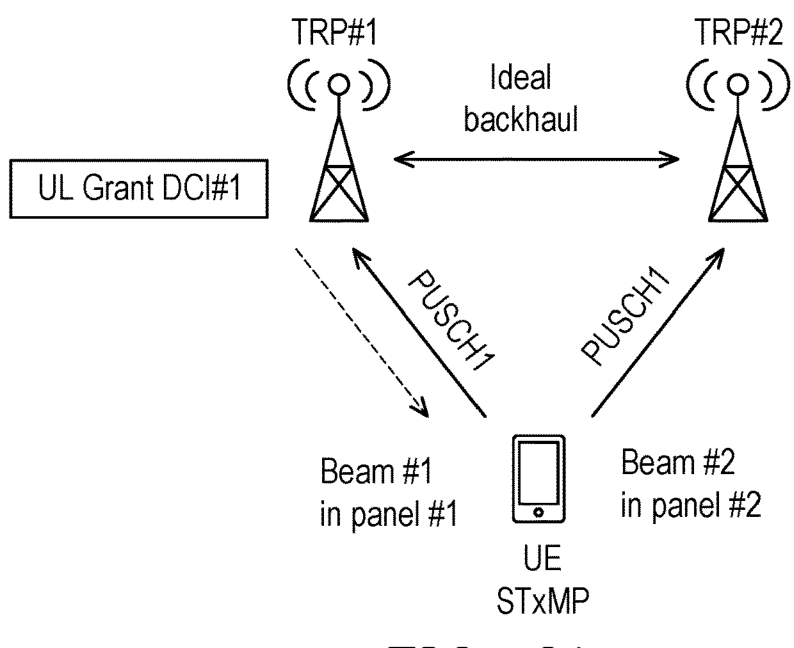
FIG. 8A and FIG. 8B are schematic diagrams that illustrate PUSCH in single DCI (S-DCI) based multiple transmission and reception point (TRP) operation.
Figure 8B:
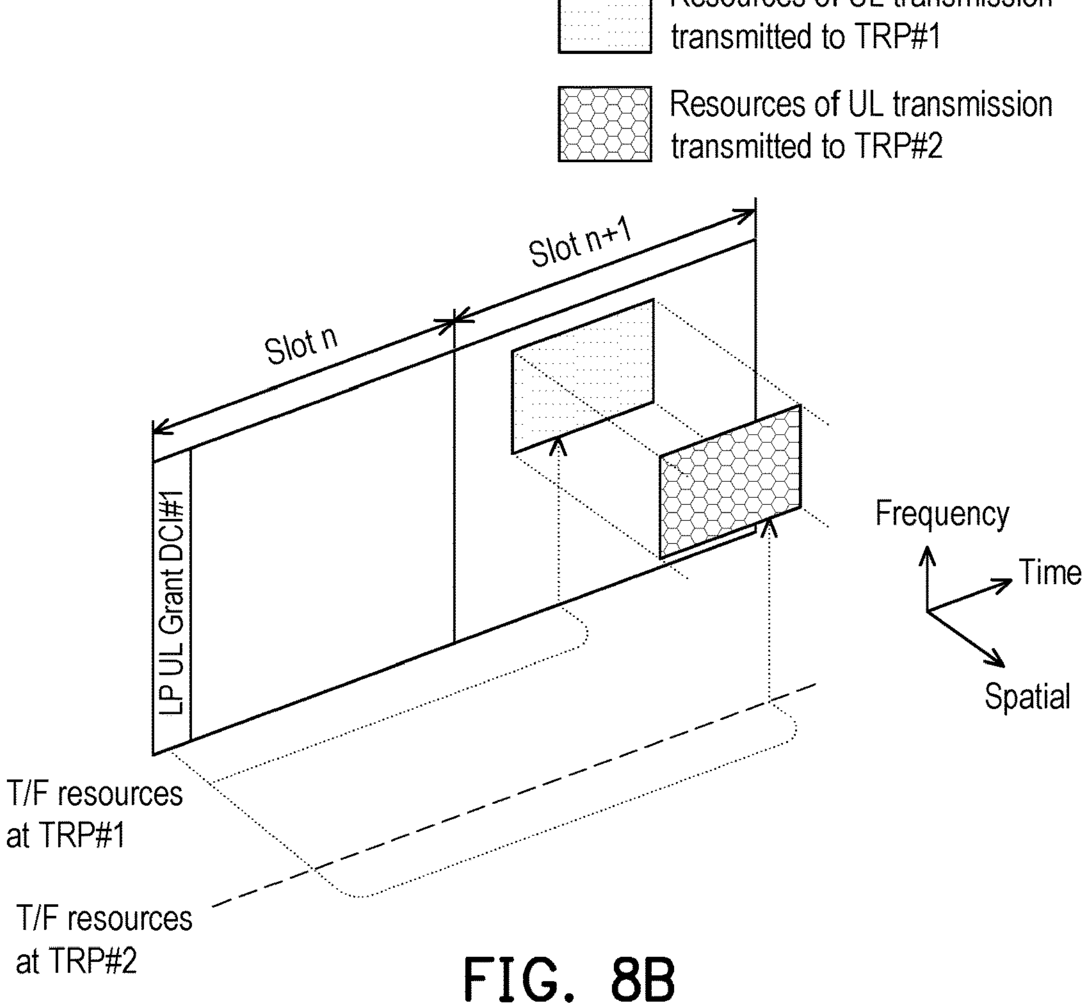

FIG. 8A and FIG. 8B are schematic diagrams that illustrate PUSCH in single DCI (S-DCI) based multiple transmission and reception point (TRP) operation. Referring to FIG. 8A and FIG. 8B, a single DCI may grant PUSCH transmitted simultaneously to multiple TRPs from different UE panels. Taking FIG. 8A as an example, UL grant DCI #1 indicates PUSCH transmissions on beam #1 in panel #1 to TRP #1 and beam #2 in panel #2 to TRP #2, respectively. It should be noticed that T/F resources of UL transmissions transmitted to TRP #1 and TRP #2 are overlapped fully as shown in FIG. 8B. However, the spatial resources would be distinguished by different beams.

Figure 9B:
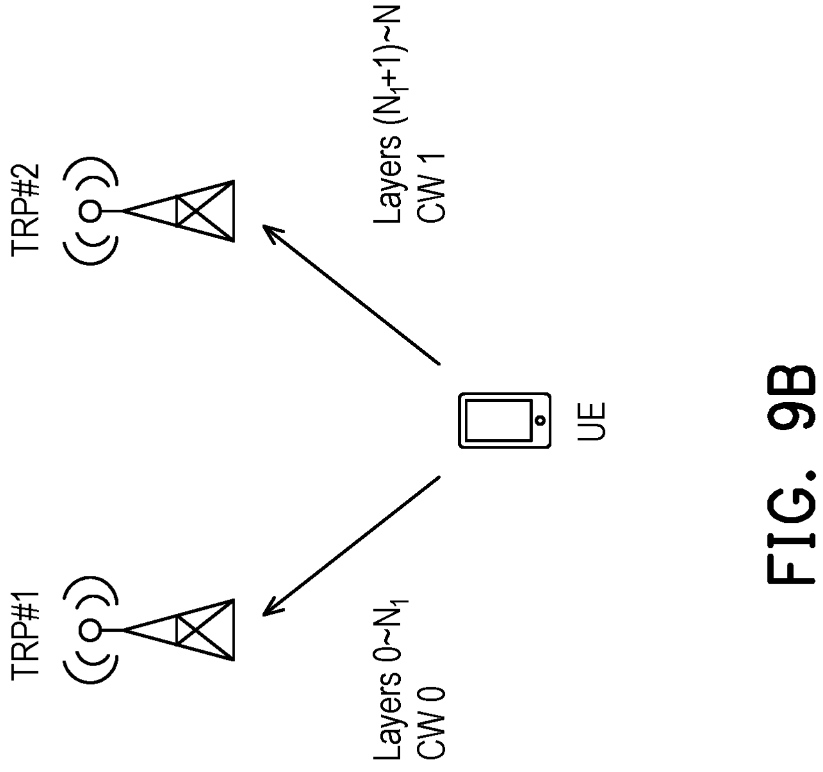
FIG. 9B is a schematic diagram that illustrates a SDM scheme with two CWs.
Figure 9A:
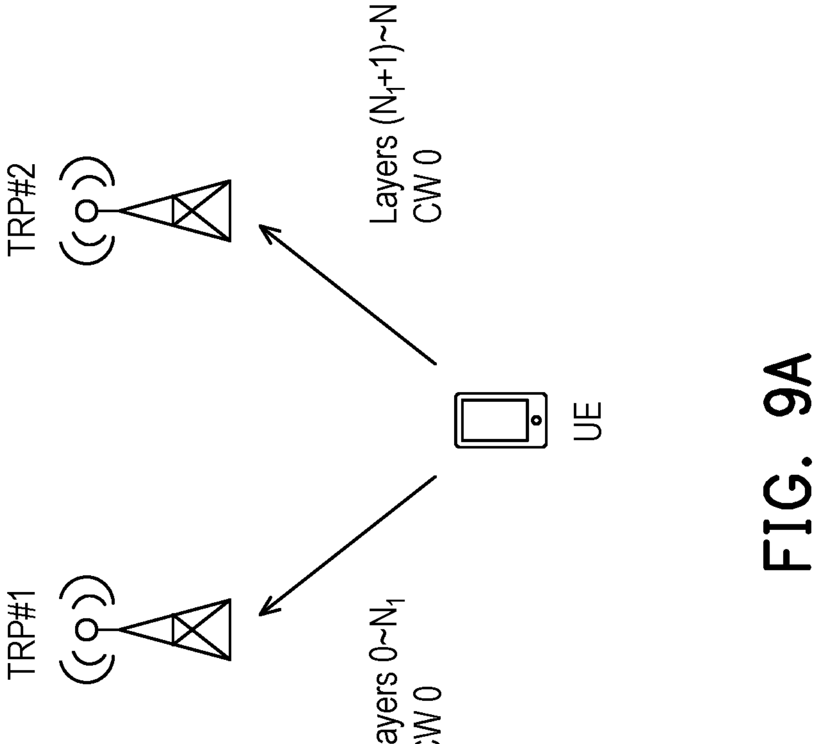
FIG. 9A is a schematic diagram that illustrates a space division multiplexing (SDM) scheme with one codeword (CW).

FIG. 9A is a schematic diagram that illustrates a space division multiplexing (SDM) scheme with one codeword (CW), and FIG. 9B is a schematic diagram that illustrates a SDM scheme with two CWs. Referring to FIG. 9A and FIG. 9B, in the SDM scheme, different layers/DMRS ports of one PUSCH may be separately precoded and transmitted from different UE panels simultaneously. Therefore, the spatial multiplexing gain would be enhanced.

For spatial diversity gain, PUSCH may be separate demodulation at each TRP, or joint demodulation at both TPRs. For example, FIG. 9C is a schematic diagram that illustrates a single frequency network (SFN) based transmission scheme. Referring to FIG. 9C, in the SFN-based transmission scheme, all of the same layers/DMRS ports of one PUSCH may be transmitted from two different UE panels simultaneously.

Figure 9D:
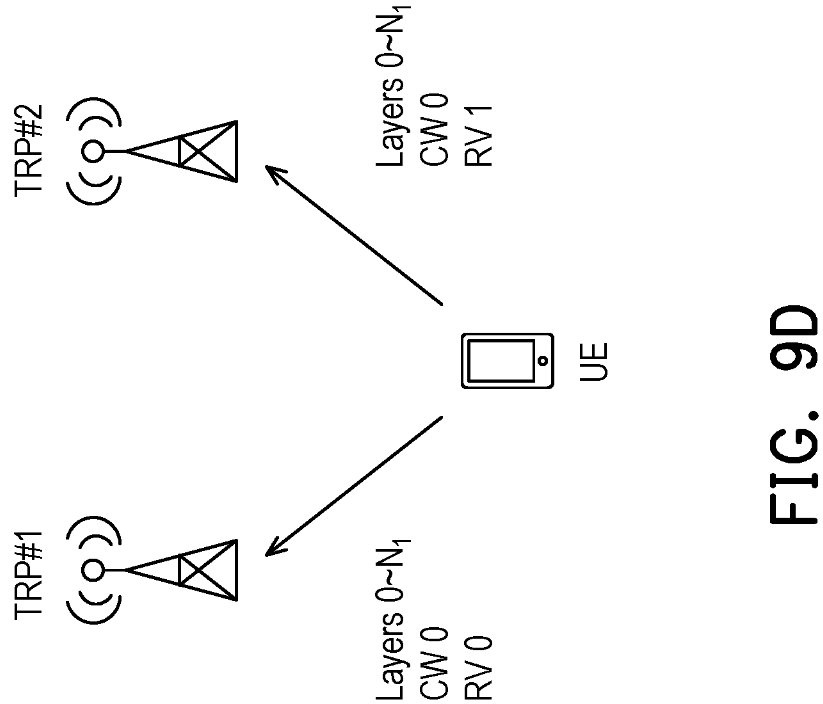
FIG. 9D is a schematic diagram that illustrates SDM repetition scheme.
Figure 9C:
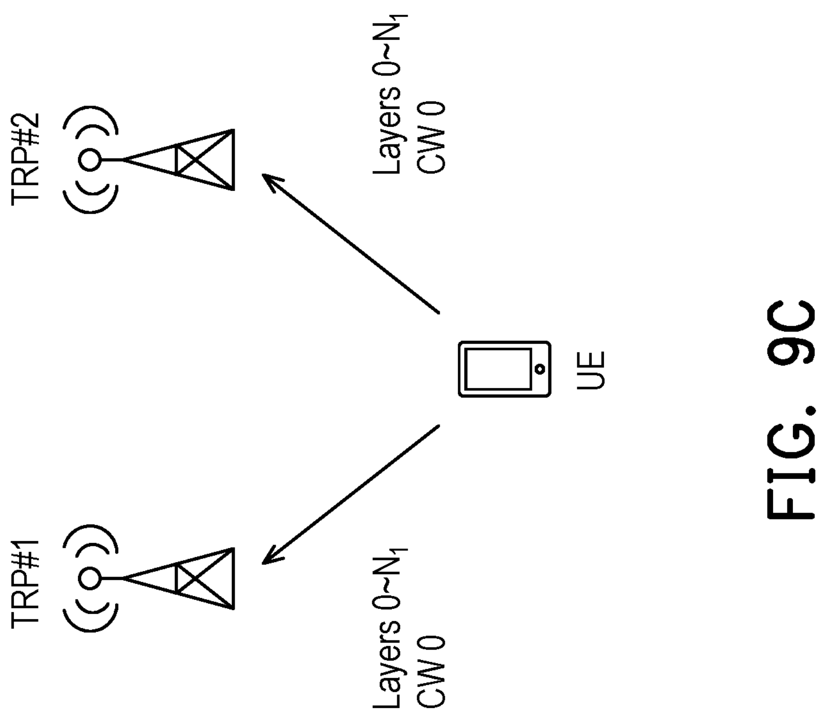
FIG. 9C is a schematic diagram that illustrates a single frequency network (SFN) based transmission scheme.

FIG. 9D is a schematic diagram that illustrates SDM repetition scheme. Referring to FIG. 9D, in SDM repetition scheme, 2 PUSCH transmission occasions with different RVs of the same TB may be transmitted from two different UE panels simultaneously.

Figure 10A:
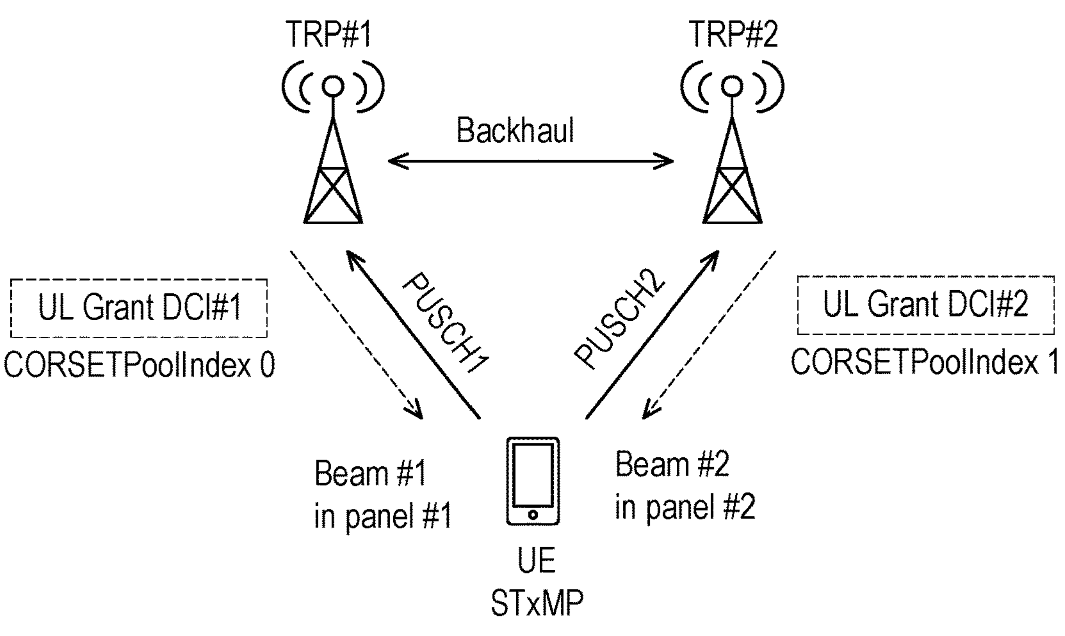
FIG. 10A and FIG. 10B are schematic diagrams that illustrate PUSCH in multiple DCI (M-DCI) based multip TRP operation.
Figure 10B:
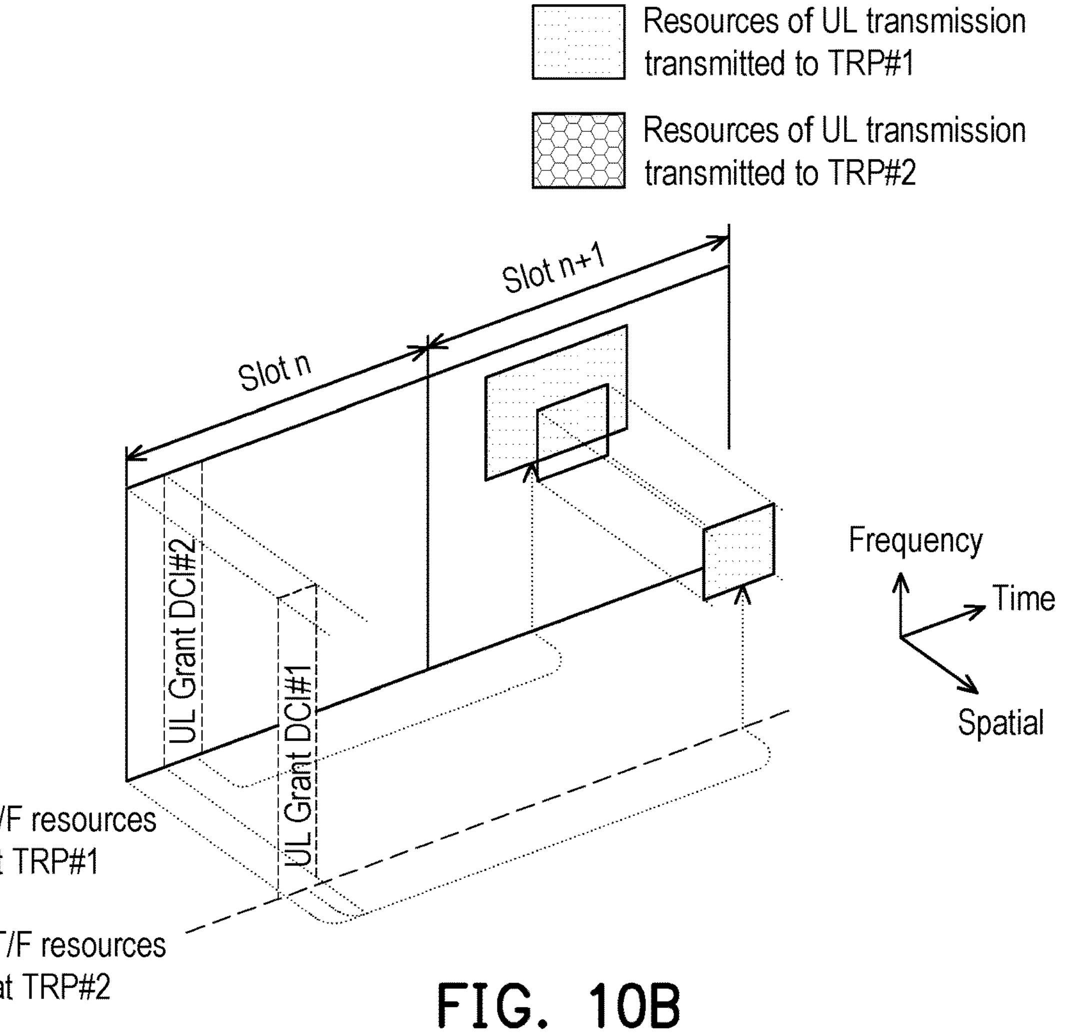

FIG. 10A and FIG. 10B are schematic diagrams that illustrate PUSCH in multiple DCI (M-DCI) based multip TRP operation. Referring to FIG. 10A, in multi-TRP operation, each DCI from the corresponding TRP may grant the corresponding PUSCH, where each DCI may be associated with a value of CORSETPoolIndex. For example, UL grant DCI #1 from TRP #1 is associated with CORSETPoolIndex 0, and UL grant DCI #2 from TRP #2 is associated with CORSETPoolIndex 1.

Referring to FIG. 10B, T/F resources for two TRPs are indicated by two DCIs, respectively. T/F resources of UL transmissions transmitted to TRP #1 and TRP #2 may be overlapped partially or be not overlapped.

Figure 11:
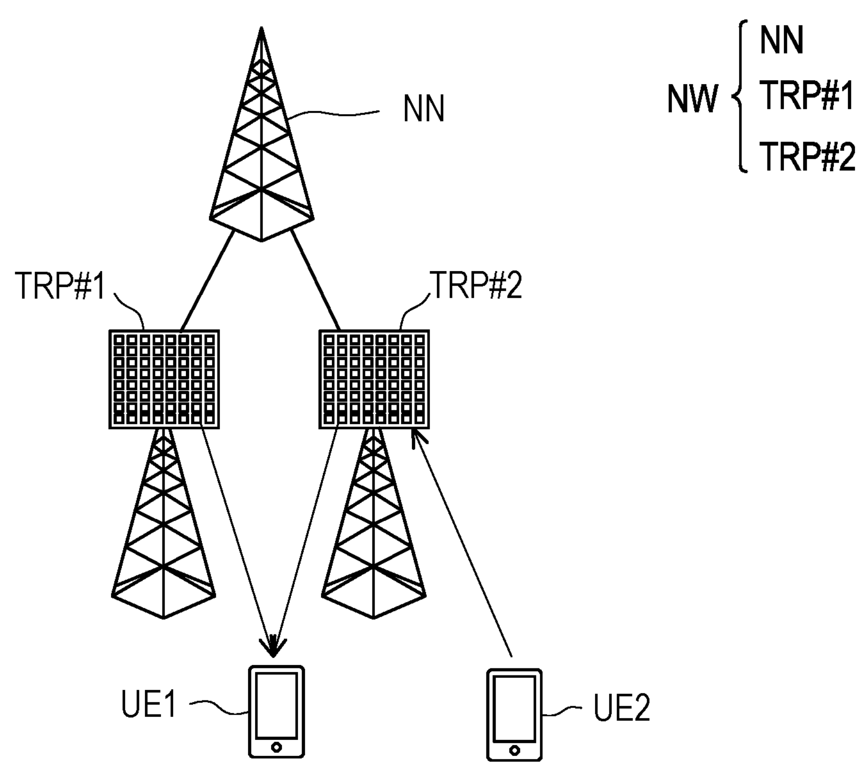
FIG. 11 is a schematic diagram that illustrates a radio communication network architecture according to an exemplary embodiment of the present disclosure.

FIG. 11 is a schematic diagram that illustrates a radio communication network architecture according to an exemplary embodiment of the present disclosure. Referring to FIG. 11, a radio communication network architecture (e.g., a Long Term Evolution (LTE) system, an LTE-Advanced (LTE-A) system, an LTE-Advanced Pro system, or a 5G NR Radio Access Network (RAN)) typically includes at least one base station (BS) NW, at least one UE, such as UE1 and UE2, and one or more optional network elements that provide connection towards a network. The UE1 and UE2 communicate with the network (e.g., a Core Network (CN), an Evolved Packet Core (EPC) network, an Evolved Universal Terrestrial Radio Access network (E-UTRAN), a 5G Core (5GC), or an internet), through a RAN established by one or more base stations.

It should be noted that, in the present disclosure, UE1 or UE2 may include, but is not limited to, a mobile station, a mobile terminal or device, or a user communication radio terminal. For example, UE1 or UE2 may be a portable radio equipment, which includes, but is not limited to, a mobile phone, a tablet, a wearable device, a sensor, a vehicle, or a Personal Digital Assistant (PDA) with wireless communication capability. The UE1 or UE2 is configured to receive and transmit signals over an air interface to one or more cells in a radio access network.

A base station NW may be configured to provide communication services according to at least one of the following Radio Access Technologies (RATs): Worldwide Interoperability for Microwave Access (WiMAX), Global System for Mobile communications (GSM, often referred to as 2G), GSM Enhanced Data rates for GSM Evolution (EDGE) Radio Access Network (GERAN), General Packet Radio Service (GPRS), Universal Mobile Telecommunication System (UMTS, often referred to as 3G) based on basic wideband-code division multiple access (W-CDMA), high-speed packet access (HSPA), LTE, LTE-A, eLTE (evolved LTE, e.g., LTE connected to 5GC), NR (often referred to as 5G), and/or LTE-A Pro. However, the scope of the present disclosure should not be limited to the above-mentioned protocols.

A base station NW may include, but is not limited to, a node B (NB) as in the UMTS, an evolved node B (eNB) as in the LTE or LTE-A, a radio network controller (RNC) as in the UMTS, a base station controller (BSC) as in the GSM/GSM Enhanced Data rates for GSM Evolution (EDGE) Radio Access Network (GERAN), a next-generation eNB (ng-eNB) as in an Evolved Universal Terrestrial Radio Access (E-UTRA) BS in connection with the 5GC, a next-generation Node B (gNB) as in the 5G Access Network (5G-AN), and any other apparatus capable of controlling radio communication and managing radio resources within a cell. The BS NW may connect to serve one or more UEs through a radio interface to the network.

The base station (BS) NW (or called network device) may be operable to provide radio coverage to a specific geographical area using a plurality of cells included in the RAN. The BS NW may support the operations of the cells. Each cell may be operable to provide services to at least one UE within its radio coverage. Specifically, each cell (often referred to as a serving cell) may provide services to serve one or more UEs within its radio coverage (e.g., each cell schedules the Downlink (DL) and optionally Uplink (UL) resources to at least one UE within its radio coverage for DL and optionally UL packet transmission). The BS NW may communicate with one or more UEs in the radio communication system through the plurality of cells.

The base station NW may include a network node NN and one or more TRPs, such as TRP #1 and TRP #2.

A network node NN may be, but not limited to, a node B (NB) as in the LTE, an evolved node B (eNB) as in the LTE-A, a radio network controller (RNC) as in the UMTS, a base station controller (BSC) as in the GSM/GERAN, a new radio evolved node B (NR eNB) as in the NR, a next generation node B (gNB) as in the NR, and any other apparatus capable of controlling radio communication and managing radio resources within one or more cells.

A TRP (e.g., TRP #1 or TRP #2), which may also be regarded as a remote radio head (RRH), may be a transceiver under the protocols of 5G NR wireless communication system and/or the protocols of a 4G wireless communication system. A TRP may be communicatively connected to a network node NN. The network node NN may connect to serve one or more UEs through one or more TRPs in the radio communication system. For example, TRP #1 and TRP #2 serve UE1, and TRP #2 serves UE2, but is not limited thereto.

As discussed above, the frame structure for NR is to support flexible configurations for accommodating various next generation (e.g., 5G) communication requirements, such as Enhanced Mobile Broadband (eMBB), Massive Machine Type Communication (mMTC), Ultra-Reliable and Low-Latency Communication (URLLC), while fulfilling high reliability, high data rate and low latency requirements. The Orthogonal Frequency-Division Multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP) may also be used. Additionally, two coding schemes are considered for NR: (1) Low-Density Parity-Check (LDPC) code and (2) Polar Code. The coding scheme adaption may be configured based on the channel conditions and/or the service applications.

It should be understood that the terms "system" and "network" used in the disclosure are often used interchangeably. The term "and/or" in the disclosure is only an association relationship describing the associated objects, which means that there can be three kinds of relationships, for example, A and/or B, which can mean three situations: A is present alone, A and B are present simultaneously, or B is present alone. In addition, the character "/" in the disclosure generally indicates that the associated objects are in an "or" relationship.

To facilitate understanding of the technical solutions of the embodiments of the disclosure, the technical concepts related to the embodiments of the disclosure are described below.

Figure 12:
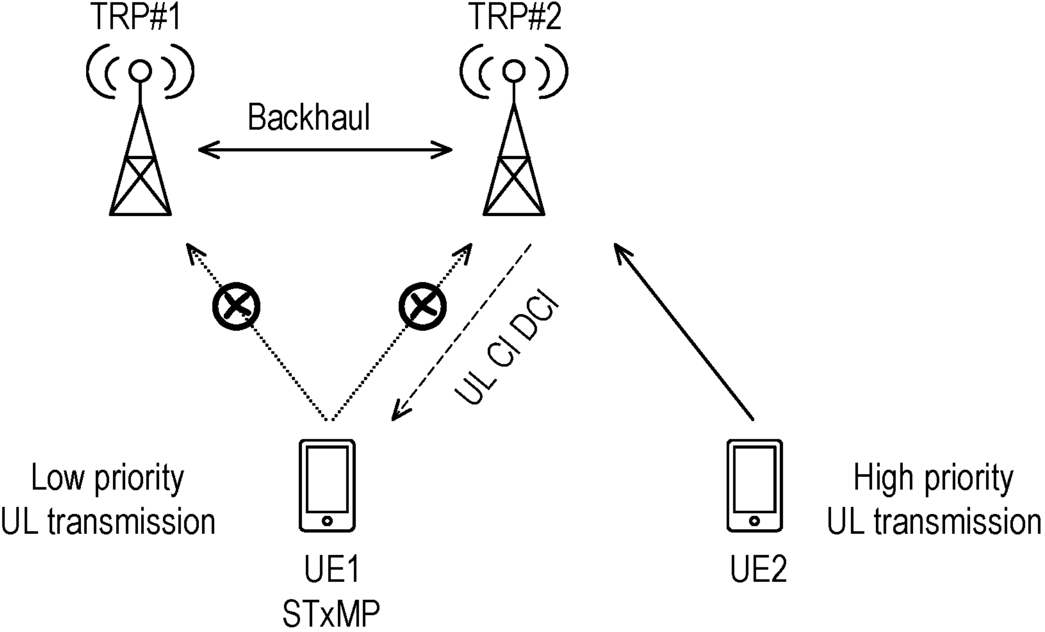
FIG. 12 is a schematic diagram that illustrates UL transmission cancellation according to an exemplary embodiment of the present disclosure.

FIG. 12 is a schematic diagram that illustrates UL transmission cancellation according to an exemplary embodiment of the present disclosure. Referring to FIG. 12, it should be noticed that throughput loss may be caused by unnecessary UL transmission cancellation. For example, UE may receive a UL CI DCI to cancel (e.g. low priority (LP)) UL transmission associated with indicated resources. How to support spatial domain (or TRP/Panel/Beam-specific) CI with the following scenarios and conditions in NR:

- STxMP scheduled by S-DCI or M-DCI (e.g., with ideal or non-ideal backhaul);
- Different spatial relation configurations for UL transmission:
  - e.g., UL transmission has (has not) a spatial relation (e.g., QCL assumption) with a specific DL RS;
- Backward compatibility.

Figure 13:
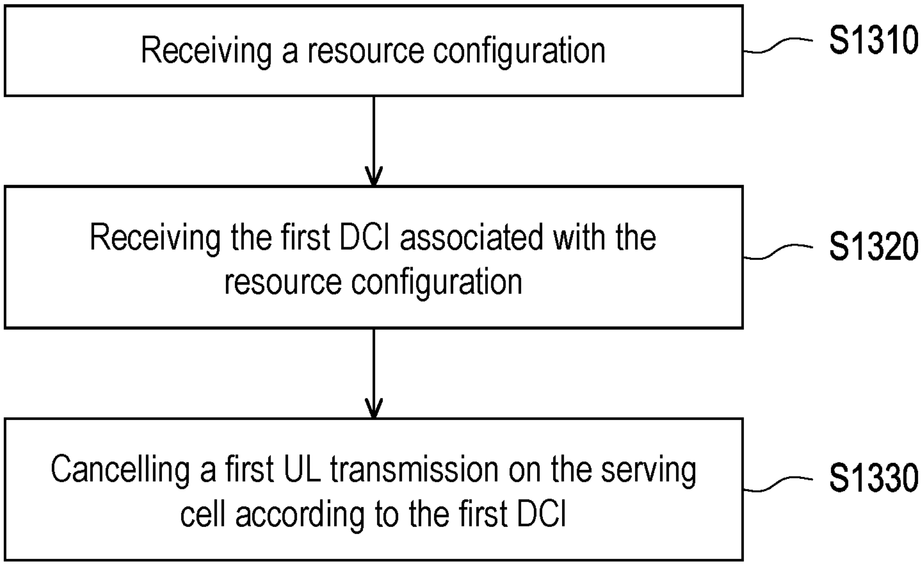
FIG. 13 is a flow chart that illustrates a resource cancellation method according to an exemplary embodiment of the present disclosure.

FIG. 13 is a flow chart that illustrates a resource cancellation method according to an exemplary embodiment of the present disclosure. Referring to FIG. 13, the method is adapted for a UE. The UE receives a resource configuration (step S1310). In one embodiment, the resource configuration indicates the position of first information for a serving cell in a first downlink control information (DCI). The resource configuration may indicate a payload size of a first DCI. In one embodiment, the position of the first information in the first DCI may be a first starting position of the first information for the serving cell in the first DCI and/or the first length of the first information for the serving cell in the first DCI. The first information is associated with a first set of time and frequency resource in the serving cell.

The UE receives the first DCI associated with the resource configuration (step S1320). The UE cancels a first uplink (UL) transmission on the serving cell according to the first DCI (step S1330).

In one embodiment, the UE cancels the first UL transmission on the serving cell according to the first information in the first DCI. In one embodiment, the first information is a cancellation indication (CI). Taking FIG. 2A as an example, the resource configuration indicates DCI payload size for CI, CI payload size for one or more cells (i.e., the first length of the first information for the serving cell in the first DCI), and the starting position for each cell (i.e., the first starting position of the first information). Each bit $A_0$ to $A_{CI-1}$ corresponds to one specific time and frequency resource. If one bit is configured with a value that represents the cancellation (e.g., "1"), the first UL transmission allocated on the time and frequency resource corresponding to the bit would be cancelled. If one bit is configured with a value that represents no cancellation (e.g., "0"), the first UL transmission allocated on the time and frequency resource corresponding to the bit would be performed and not be cancelled.

In one embodiment, the resource configuration further indicates a position of second information for the serving cell in the first DCI. The position of the second information may be a second starting position of the second information for the serving cell in the first DCI and/or the second length of the second information for the serving cell in the first DCI.

In one embodiment, the second information is associated with a spatial resource. The spatial resource may be associated with, for example, a CORESET pool index corresponding to TRP and/or a SRS resource set corresponding to a panel.

In one embodiment, UE may be configured with a TRP/Panel relative information (e.g., $L_{CI}$) (i.e., the second information) in a DCI, for example, format 2_4, used for, for example, UL CI. The $L_{CI}$ may be associated with at least one of the following: cell ID;

- a bit length (or a number/set of bits or a payload size), where the bit length may be configured or fixed or pre-determined;
- a start position in the DCI within the DCI payload.

The $L_{CI}$ may start after the last bit of payload size, for example, CI payload size of cell ID #n.

Figure 14:
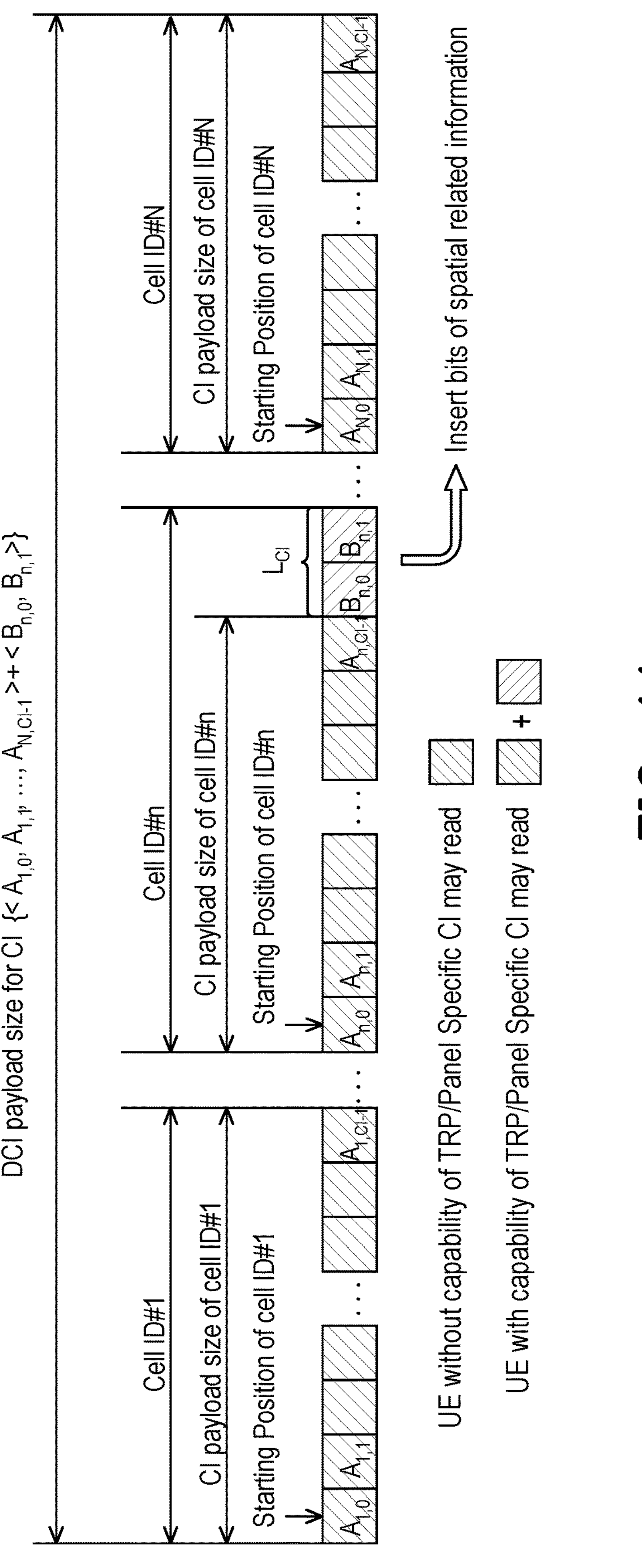
FIG. 14 is a schematic diagram that illustrates a TRP/panel relative information in DCI according to an exemplary embodiment of the present disclosure.

For example, FIG. 14 is a schematic diagram that illustrates a TRP/panel relative information in DCI according to an exemplary embodiment of the present disclosure. Referring to FIG. 14, compared with FIG. 2A, bits of spatial related information are inserted. For example, for cell ID #n, $L_{CI}$ includes two bits $B_{n,0}$ and $B_{n,1}$. UE with the capability of TRP/Panel Specific CI may read bits $A_{n,0}$ to $A_{n,CI-1}$ and bits $B_{n,0}$ and $B_{n,1}$. However, UE without the capability of TRP/Panel Specific CI may read merely bits $A_{n,0}$ to $A_{n,CI-1}$.

In one embodiment, UE may report at least one capability, where at least one capability may include at least one of the following:

- capability of TRP/Panel Specific CI (or STxMP);
- capability of without TRP/Panel Specific CI (or STxMP).

In one embodiment, UE may read a 1$^{st}$ set of bits in the DCI within the DCI payload, if UE reports/has the capability of without TRP/Panel Specific CI (or STxMP), and/or if UE deactivates TRP/Panel Specific CI (or STxMP). The 1$^{st}$ set of bits (such as bits $A_0$ to $A_9$ as shown in FIG. 14) may start from a 1$^{st}$ starting position with the length of a 1$^{st}$ CI payload size.

In one embodiment, UE may read a 1$^{st}$ set of bits and/or a 2$^{nd}$ set of bits in the DCI within the DCI payload if UE reports/has the capability of TRP/Panel Specific CI (or STxMP), and/or if UE activates TRP/Panel Specific CI (or STxMP). The 1$^{st}$ set of bits may start from a 1$^{st}$ starting position with the length of a 1$^{st}$ CI payload size. The 2$^{nd}$ set of bits e.g., $L_{CI}$ (bits $B_0$ to $B_9$ as shown in FIG. 14) may start from a 2$^{nd}$ starting position with the length of a 2$^{nd}$ CI payload size. The 1$^{st}$ set of bits and the 2$^{nd}$ set of bits may be consecutive.

In one embodiment, UE may read a 1$^{st}$ set of bits in the DCI within the DCI payload, if UE reports/has the capability of TRP/Panel Specific CI (or STxMP), and/or if UE activates TRP/Panel Specific CI (or STxMP). The 1$^{st}$ set of bits may start from the 1$^{st}$ starting position with a length of the 1$^{st}$ CI payload size plus a length of a 2$^{nd}$ CI payload size, for example, $L_{CI}$.

In one embodiment, the second information indicates at least one of the following information:

- at least one of a first sound reference signal (SRS) resource set and a first control resource set (CORESET) pool index;
- at least one of a second SRS resource set and a second CORESET pool index;
- a priority level; and
- irrespective of the priority level.

In one embodiment, an association of a codepoint and TRP/Panel relative information (i.e., the second information) may be configured by RRC/MAC CE or indicated by DCI. The association may be UE-specific.

Figure 15A:
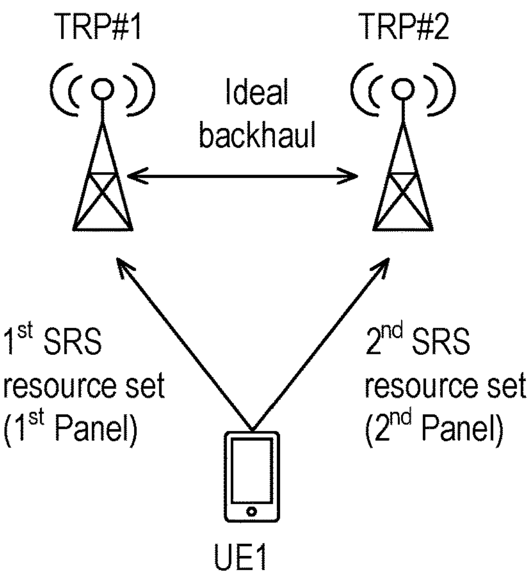
FIG. 15A is a schematic diagram that illustrates an S-DCI operation according to an exemplary embodiment of the present disclosure.
Figure 15B:
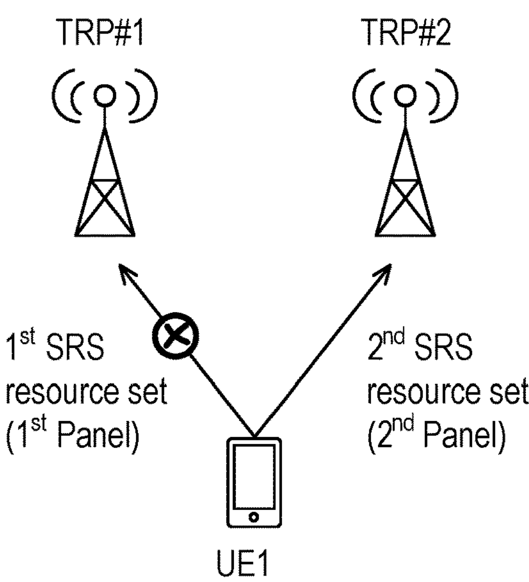
FIG. 15B to FIG. 15F are schematic diagrams that illustrate associations of codepoints and TRP/panel relative information according to an exemplary embodiment of the present disclosure.

For example, FIG. 15A is a schematic diagram that illustrates an S-DCI operation according to an exemplary embodiment of the present disclosure. Referring to FIG. 15A, UE1 provides 1$^{st}$ panel corresponding to 1$^{st}$ SRS resource set and 2$^{nd}$ panel corresponding to 2$^{nd}$ SRS resource set. Table (1) is an example of an association of a codepoint of $L_{CI}$ and TRP/Panel relative information for S-DCI.

TABLE 1

| $L_{CI}$ e.g., <$B_0$, $B_1$> | Description |
|---|---|
| 00 | If a UL transmission is a (LP) PUSCH, UE may cancel the PUSCH granted by a DCI associated with 1st CORESETPoolindex. |
| 01 | If a UL transmission is a (LP) PUSCH, UE may cancel the PUSCH granted by a DCI associated with 2nd CORESETPoolindex. |
| 10 | UL transmission cancellation may be applied with irrespective of priority level and/or TRP/Panel relative information |
| 11 | UL CI may be applicable to a UL transmission indicated/configured as low priority level |

Figure 15C:
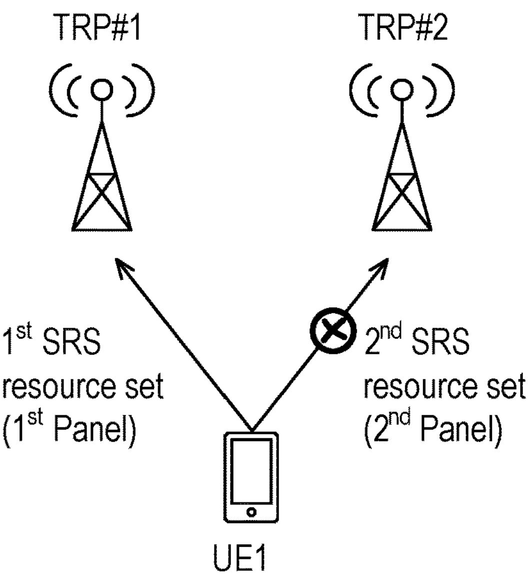
Figure 15D:
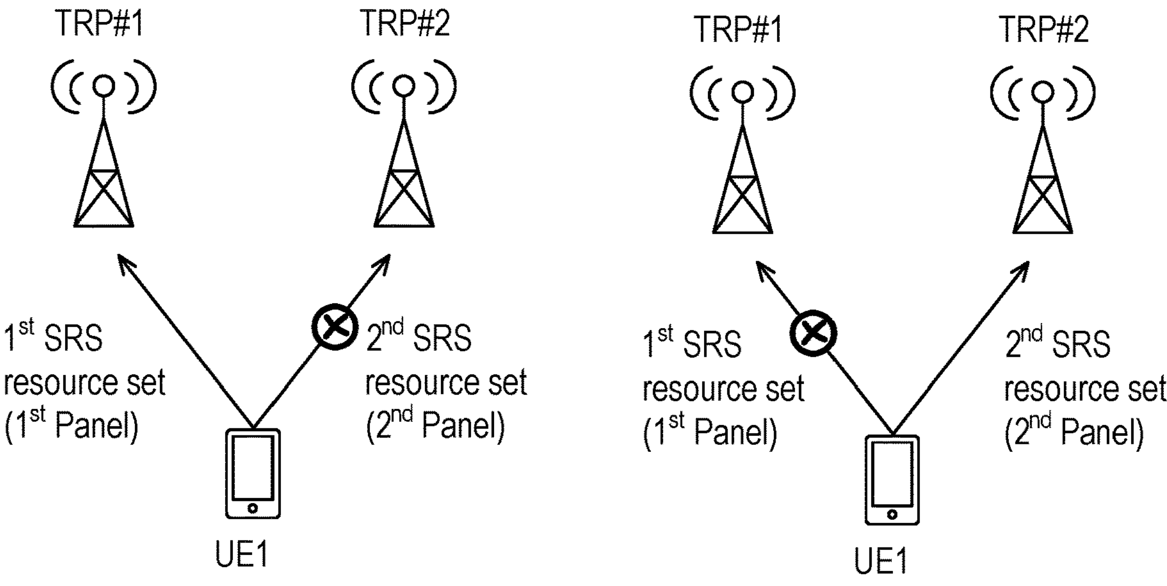

In one embodiment, the UE may cancel the first UL transmission on the serving cell according to the first information and the second information in the first DCI. For example, FIG. 15B to FIG. 15F are schematic diagrams that illustrate associations of codepoints and TRP/panel relative information according to an exemplary embodiment of the present disclosure. Referring to FIG. 151B, $L_{CI}$ is configured as "00", and UE1 may cancel the UL transmission associated with the 1st SRS resource set. Referring to FIG. 15C, $L_{CI}$ is configured as "01", and UE1 may cancel the UL transmission associated with the 2nd SRS resource set. Referring to FIG. 15D, $L_{CI}$ is configured as "10" or "11", and UE1 may cancel one of the UL transmissions associated with the 1st SRS resource set or the 2nd SRS resource set.

Table (2) is another example of an association of a codepoint of $L_{CI}$ and TRP/Panel relative information for S-DCI.

TABLE 2

| $L_{CI}$ e.g., <$B_0$, $B_1$> | Description |
|---|---|
| 00 | UE may cancel the LP UL transmission associated with 1st SRS resource set. |
| 01 | UE may cancel the UL transmission associated with 1st SRS resource set irrespective of priority level. |
| 10 | UE may cancel the LP UL transmission associated with 2nd SRS resource set. |
| 11 | UE may cancel the UL transmission associated with 2nd SRS resource set irrespective of priority level. |

Figure 15E:
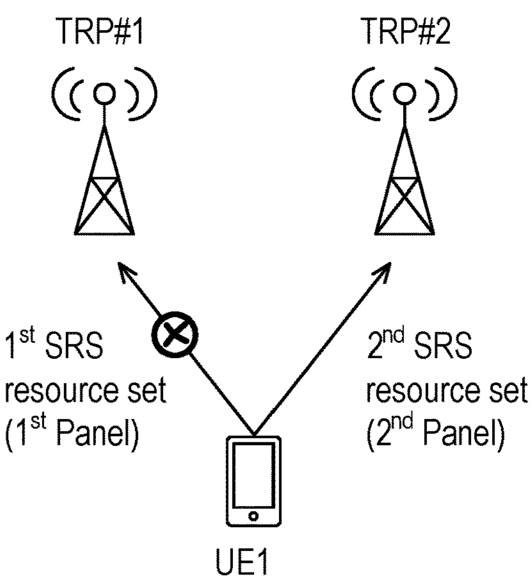
Figure 15F:
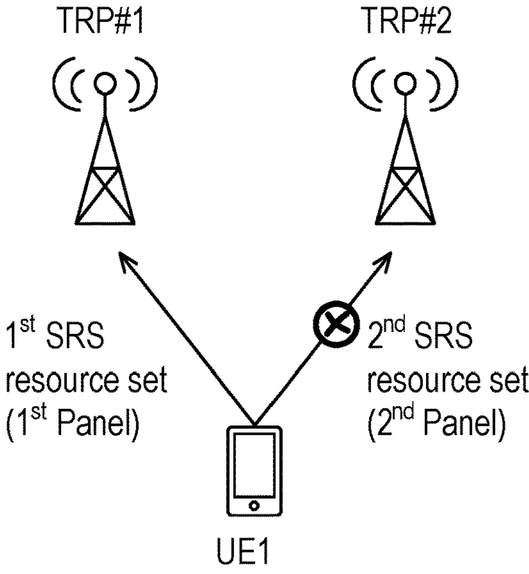

Referring to FIG. 15E, $L_{CI}$ is configured as "00" or "01", and UE1 may cancel the UL transmission associated with the 1st SRS resource set. Referring to FIG. 15F, $L_{CI}$ is configured as "10" or "11", and UE1 may cancel the UL transmission associated with the 2nd SRS resource set.

Figure 16:
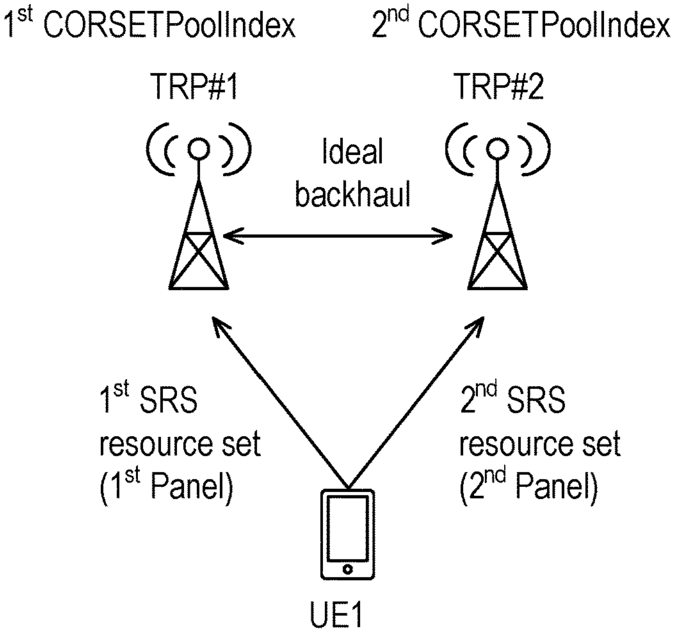
FIG. 16 is a schematic diagram that illustrates an M-DCI operation with one UE according to an exemplary embodiment of the present disclosure.

For example, FIG. 16 is a schematic diagram that illustrates an M-DCI operation with one UE according to an exemplary embodiment of the present disclosure. Referring to FIG. 16, UE1 provides r panel corresponding to SRS resource set and 2nd panel corresponding to 2nd SRS resource set. Furthermore, TRP #1 corresponds to 1st CORESETPoolIndex, and TRP #2 corresponds to 2nd CORESETPoolIndex. Table (3) is an example of an association of a codepoint of $L_{CI}$ and TRP/Panel relative information for M-DCI.

TABLE 3

| $L_{CI}$ e.g., <$B_0$, $B_1$> | Description |
|---|---|
| 00 | If a UL transmission is a (LP) PUSCH, UE may cancel the PUSCH granted by a DCI associated with 1st CORESETPoolindex. If a UL transmission is a SRS, UE may cancel the SRS associated with 1st SRS resource set |
| 01 | If a UL transmission is a (LP) PUSCH, UE may cancel the PUSCH granted by a DCI associated with 2nd CORESETPoolindex. If a UL transmission is a SRS, UE may cancel the SRS associated with 2nd SRS resource set. |
| 10 | UL transmission cancellation may be applied with irrespective of priority level and/or TRP/Panel relative information |
| 11 | UL CI may be applicable to a UL transmission indicated/configured as low priority level |

In one embodiment, UE may receive a new field of TRP/Panel relative information in the UL CI DCI. An association of a codepoint of the new field and TRP/Panel relative information may be configured by RRC/MAC CE or indicated by DCI. The new field may be associated with at least one cell ID. If the new field is associated with more than one cell ID, a 1st reference cell ID (or reference RS) and/or a 2nd reference cell ID (or reference RS) may be configured. The 1st reference cell ID (or reference RS) may be associated with 1st SRS resource set and/or the 1st CORESETPoolIndex. The 2nd reference cell ID (or reference RS) may be associated with 2nd SRS resource set and/or the 2nd CORESETPoolIndex. For example, Table (4) is another example of an association of a codepoint of $L_{CI}$ and TRP/Panel relative information for M-DCI.

TABLE 4

| $L_{CI}$ e.g., <$B_0$, $B_1$> | Description |
|---|---|
| 00 | If a UL transmission is a (e.g., LP) PUSCH or a SRS UE may cancel the UL transmission associated with 1st SRS resource set and/or the 1st CORESETPoolIndex |
| 01 | If a UL transmission is a (e.g., LP) PUSCH or a SRS UE may cancel the UL transmission associated with 2nd SRS resource set and/or 2nd the CORESETPoolIndex |
| 10 | UL transmission cancellation may be applied with irrespective of priority level |
| 11 | UL CI may be applicable to a UL transmission indicated/configured as low priority level |

In one embodiment, an association of a codepoint and TRP/Panel relative information may be configured by RRC/MAC CE or indicated by DCI. A 1st codepoint may indicate that UE may cancel UL transmission. The condition of UL transmission cancellation may include at least one of the following:

The transmission may be PUSCH with low priority e.g., 0 or irrespective of priority level; A group of symbols, from the $T_{CI}$ symbols, may have at least one bit value of '1' in the corresponding set of $N_{BI}=N_{CI}/G_{CI}$ bits in the DCI (e.g., format 2_4) and/or may include a symbol of the (repetition of the) PUSCH transmission or a symbol of the SRS transmission;

A group of PRBs, from the $B_{CI}$ PRBs, may have a corresponding bit value of '1' in the set of bits corresponding to the group of symbols in the DCI (e.g., format 2_4) and may include a PRB of the (repetition of the) PUSCH transmission or of the SRS transmission. A 2nd codepoint may indicate that UE may not cancel UL transmission.

In one embodiment, an association of a codepoint and TRP/Panel relative information may be configured by RRC/MAC CE or indicated by DCI. A 3rd codepoint may indicate that UE may cancel UL transmission associated with a 1st SRS resource set and/or a 1st value of CORESETPoolIndex. The condition of UL transmission cancellation may include at least one of the following:

The transmission may be PUSCH with e.g., low priority 0 or irrespective of priority level A group of symbols, from the $T_{CI}$ symbols, may have at least one bit value of '1' in the corresponding set of $N_{BI}=N_{CI}/G_{CI}$ bits in the DCI (e.g., format 2_4) and/or may include a symbol of the (repetition of the) PUSCH transmission or of the SRS transmission; A group of PRBs, from the $B_{CI}$ PRBs, may have a corresponding bit value of '1' in the set of bits corresponding to the group of symbols in the DCI (e.g., format 2_4) and may include a PRB of the (repetition of the) PUSCH transmission or of the SRS transmission. The 1st SRS resource set may be:

- associated with a 1st reference cell ID (or reference RS);
- lower/higher SRS resource set ID if two SRS resources sets configured by higher layer parameter;
- lowest/highest SRS resource set ID if at least one SRS resources sets configured by higher layer parameter;
- a configured/indicated SRS resource set ID by RRC, MAC CE, or DCI.

The 1st value of CORESETPoolIndex may be:

- associated with a 1st reference cell ID (or reference RS);
- lower/higher value of CORESETPoolIndex if two value of CORESETPoolIndex is configured by a higher layer parameter;
- a configured/indicated value of CORESETPoolIndex, MAC CE, or DCI.

In one embodiment, an association of a codepoint and TRP/Panel relative information may be configured by RRC/MAC CE or indicated by DCI. A 4th codepoint may indicate that UE may cancel UL transmission associated with a 1st SRS resource set and/or a 2nd value of CORESETPoolIndex. The condition of UL transmission cancellation may include at least one of the following:

The transmission may be PUSCH with e.g., low priority 0 or irrespective of priority level A group of symbols, from the $T_{CI}$ symbols, may have at least one bit value of '1' in the corresponding set of $N_{BI}=N_{CI}/G_{CI}$ bits in the DCI (e.g., format 2_4) and/or may include a symbol of the (repetition of the) PUSCH transmission or of the SRS transmission; A group of PRBs, from the $B_{CI}$ PRBs, may have a corresponding bit value of '1' in the set of bits corresponding to the group of symbols in the DCI (e.g., format 2_4) and may include a PRB of the (repetition of the) PUSCH transmission or of the SRS transmission. The 2nd SRS resource set may be:

- associated with a 1st reference cell ID (or reference RS);
- lower/higher SRS resource set ID if two SRS resources sets configured by higher layer parameter;
- lowest/highest SRS resource set ID if at least one SRS resources sets configured by higher layer parameter;
- a configured/indicated SRS resource set ID by RRC, MAC CE, or DCI.

The 2nd value of CORESETPoolIndex may be:

- associated with a 1st reference cell ID (or reference RS);
- lower/higher value of CORESETPoolIndex if two value of CORESETPoolIndex is configured by a higher layer parameter;
- a configured/indicated value of CORESETPoolIndex, MAC CE, or DCI.

Figure 17:
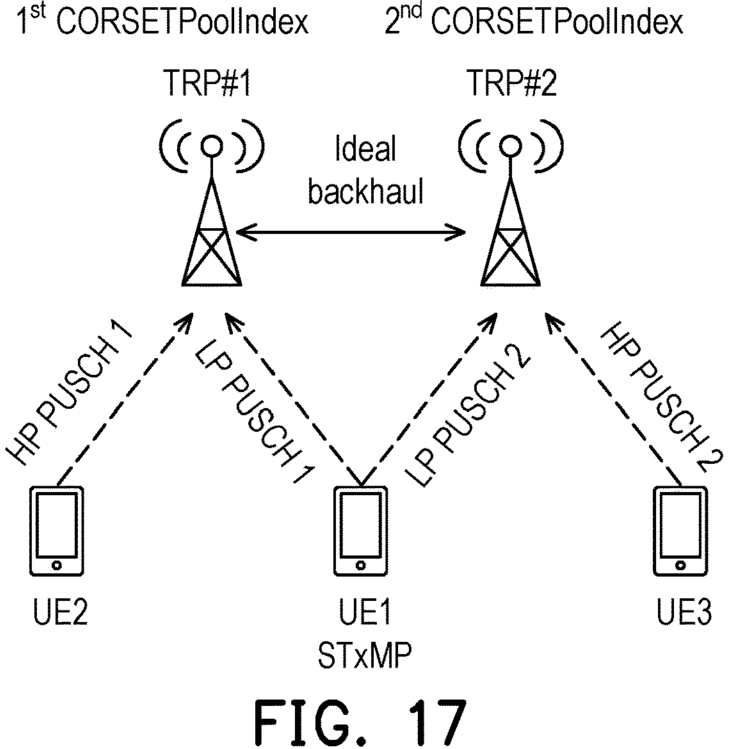
FIG. 17 is a schematic diagram that illustrates an M-DCI operation with multiple UEs according to an exemplary embodiment of the present disclosure.

FIG. 17 is a schematic diagram that illustrates an M-DCI operation with multiple UEs according to an exemplary embodiment of the present disclosure. Referring to FIG. 17, TRP #1 serves UE1 and UE2, and TRP #2 serves UE1 and UE3. TRP #1 allocates resources for (HP) PUSCH 1 of UE2 and (LP) PUSCH 1 of UE1. TRP #2 allocates resources for (HP) PUSCH 2 of UE3 and (LP) PUSCH 2 of UE1.

Figure 18:
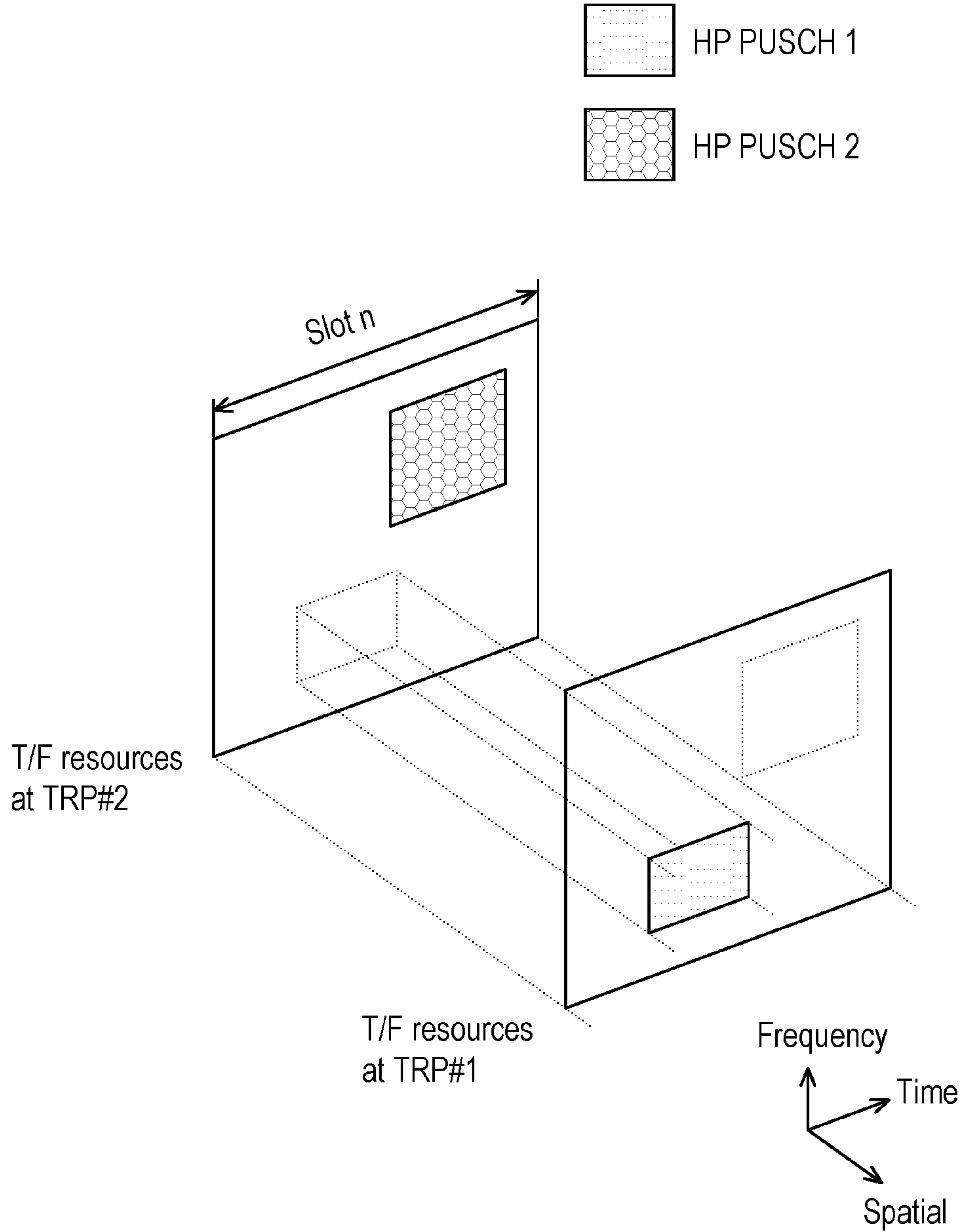
FIG. 18 is a schematic diagram that illustrates a resource allocation of the M-DCI operation according to an exemplary embodiment of the present disclosure.

FIG. 18 is a schematic diagram that illustrates a resource allocation of the M-DCI operation according to an exemplary embodiment of the present disclosure. Referring to FIG. 18, T/F resources allocated for HP PUSCH 1 and HP PUSCH 2 may not be overlapped. However, T/F resources allocated for LP PUSCH 1 or LP PUSCH 2 as shown in FIG. 17 may be overlapped with HP PUSCH 1 or HP PUSCH 2.

In one embodiment, the resource configuration may further indicate a position of third information for the serving cell in the first DCI, and the third information is associated with a second set of the time and frequency resource in the serving cell. In one embodiment, the position of the third information in the first DCI may be the third starting position of the third information and/or the third length of the third information.

In one embodiment, the first set of the time and frequency resource corresponds to a first spatial relation, and the second set of the time and frequency resource corresponds to a second spatial relation.

In one embodiment, the first spatial relation includes at least one of a first SRS resource set, a first transmission configuration indicator (TCI) state and a first value of CORESET pool index. The second spatial relation includes at least one of a second SRS resource set, a second transmission configuration indicator (TCI) state and a second value of CORESET pool index.

Figure 19:
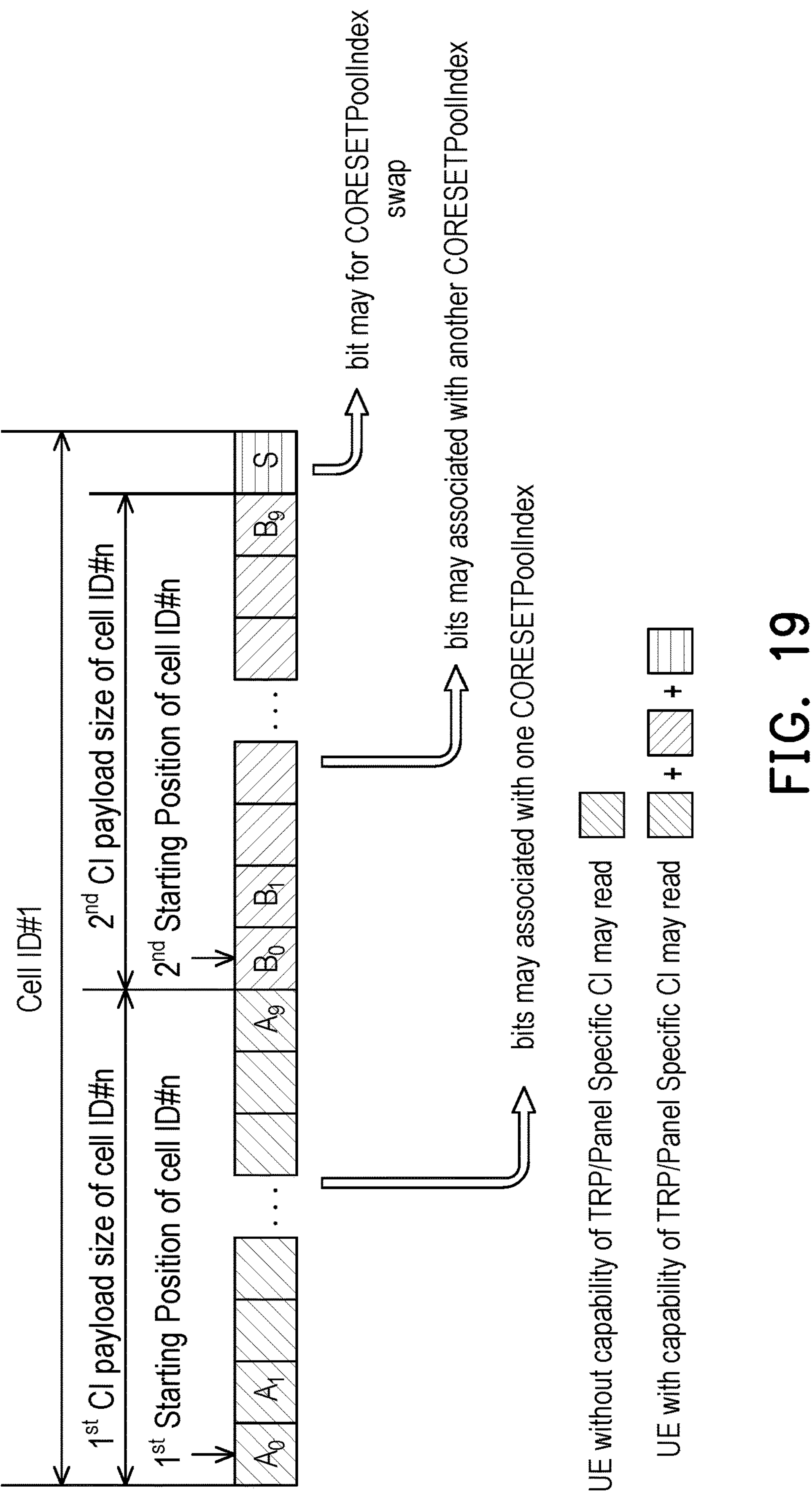
FIG. 19 is a schematic diagram that illustrates an explicit TRP/panel specific region of time and frequency resources for CI according to an exemplary embodiment of the present disclosure.

For example, FIG. 19 is a schematic diagram that illustrates an explicit TRP/panel specific region of time and frequency resources for CI according to an exemplary embodiment of the present disclosure. Referring to FIG. 19, for cell ID #n, UE may be configured with a 1st CI payload size (e.g., the total of bit $A_0$ to bit $A_9$) and/or a 2nd CI payload size (e.g., the total of bit $B_0$ to bit $B_9$). UE may be configured with a 1st start position and/or 2nd start position in the DCI within the DCI payload. UE may be configured with a bit (e.g., "S") for spatial relative information (e.g., CORESETPoolIndex or SRS resource set) switching/swap. UE with the capability of TRP/Panel Specific CI may read bits $A_0$ to $A_9$, bits $B_0$ to $B_9$, and bit S. However, UE without the capability of TRP/Panel Specific CI may read merely bits $A_0$ to $A_9$.

In one embodiment, UE may read a 1st set of bits in the DCI within the DCI payload, if UE reports/has the capability of without TRP/Panel Specific CI (or STxMP), and/or if UE deactivates TRP/Panel Specific CI (or STxMP). The 1st set of bits (such as bits $A_0$ to $A_9$ as shown in FIG. 19) may start from a 1st starting position with the length of a 1st CI payload size.

In one embodiment, UE may read a 1st set of bits and/or a 2nd set of bits in the DCI within the DCI payload if UE reports/has the capability of TRP/Panel Specific CI (or STxMP), and/or if UE activates TRP/Panel Specific CI (or STxMP). The 1st set of bits may start from a 1st starting position with the length of a 1st CI payload size. The 2nd set of bits e.g., $L_{CI}$ (bits $B_0$ to $B_9$ as shown in FIG. 19) may start from a 2nd starting position with the length of a 2nd CI payload size. The 1st set of bits and the 2nd set of bits may be consecutive.

In one embodiment, the resource configuration further includes a first bit (e.g., bit S as shown in FIG. 19). In response to the first bit being a first value (e.g., "0"), the first set of the time and frequency resource is associated with at least one of a first SRS resource set and a first CORESET pool index, and the second set of the time and frequency resource is associated with at least one of a second SRS resource set and a second CORESET pool index. On the other hand, in response to the first bit being a second value (e.g., "1"), the first set of the time and frequency resource is associated with at least one of the second SRS resource set and the second CORESET pool index, and the second set of the time and frequency resource is associated with the at least one of the first SRS resource set and the first CORESET pool index.

Figure 20A:
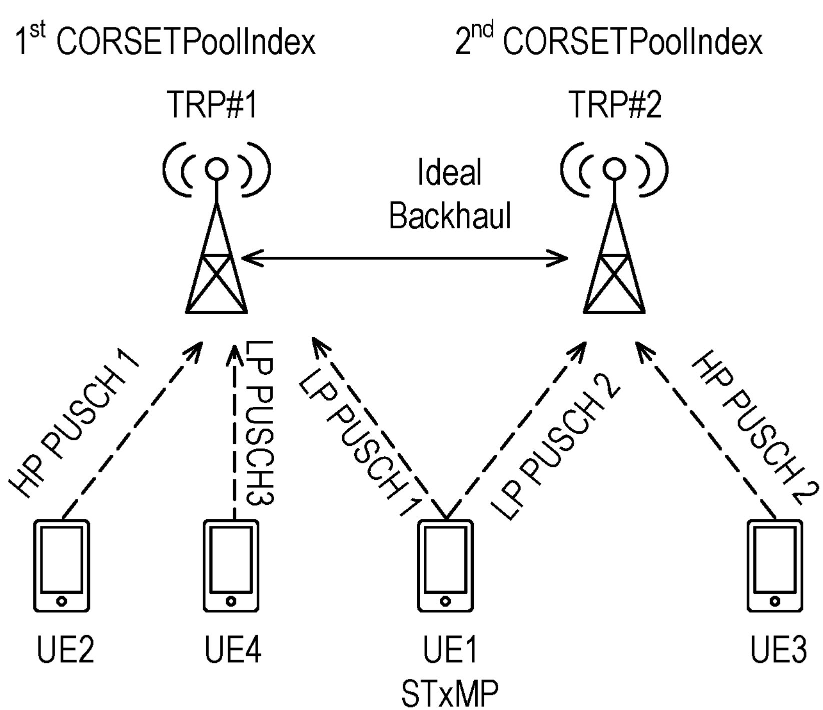
FIG. 20A and FIG. 20B are schematic diagrams that illustrate an explicit TRP/panel specific region of time and frequency resources for CI with a switching bit as “0” according to an exemplary embodiment of the present disclosure.
Figure 20B:
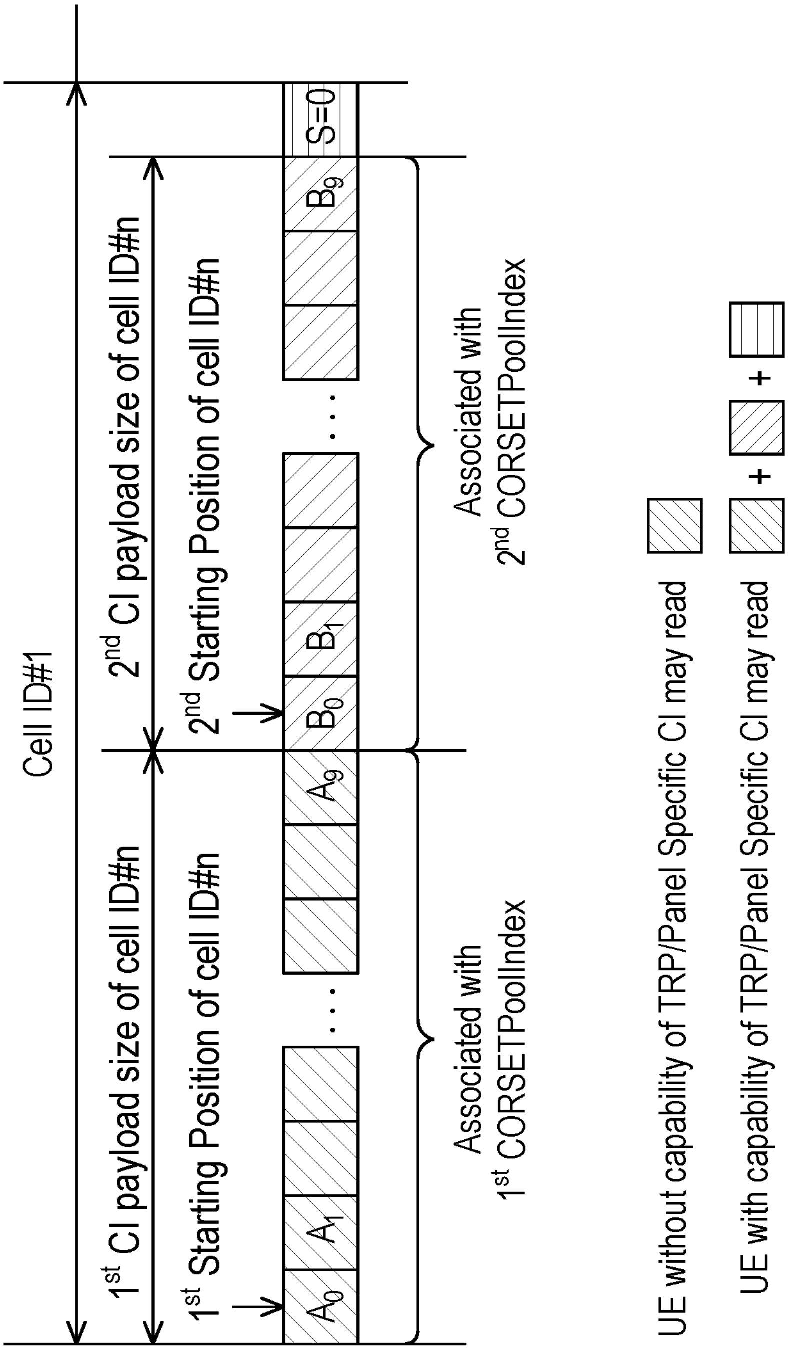

For example, FIG. 20A and FIG. 20B are schematic diagrams that illustrate an explicit TRP/panel specific region of time and frequency resources for CI with a switching bit (i.e., the aforementioned first bit) as "0" according to an exemplary embodiment of the present disclosure. Referring to FIG. 20A, TRP #1 serves UE1, UE2 and UE4. TRP #2 serves UE1 and UE3. TRP #1 allocates resources for (HP) PUSCH 1 of UE2, (LP) PUSCH 3 of UE4, and (LP) PUSCH 1 of UE1. TRP #2 allocates resources for (HP) PUSCH 2 of UE3 and (LP) PUSCH 2 of UE1.

Referring to FIG. 20B, if the switching bit (e.g., "S")="0" for spatial relative information (e.g., CORESETPoolIndex or SRS resource set) switching/swap, the $1^{st}$ CI payload size and/or the $1^{st}$ start position may be associated with $1^{st}$ CORESETPoolInex, and the $2^{nd}$ CI payload size and/or the $2^{nd}$ start position may be associated with $2^{nd}$ CORESETPoolInex.

Figure 21A:
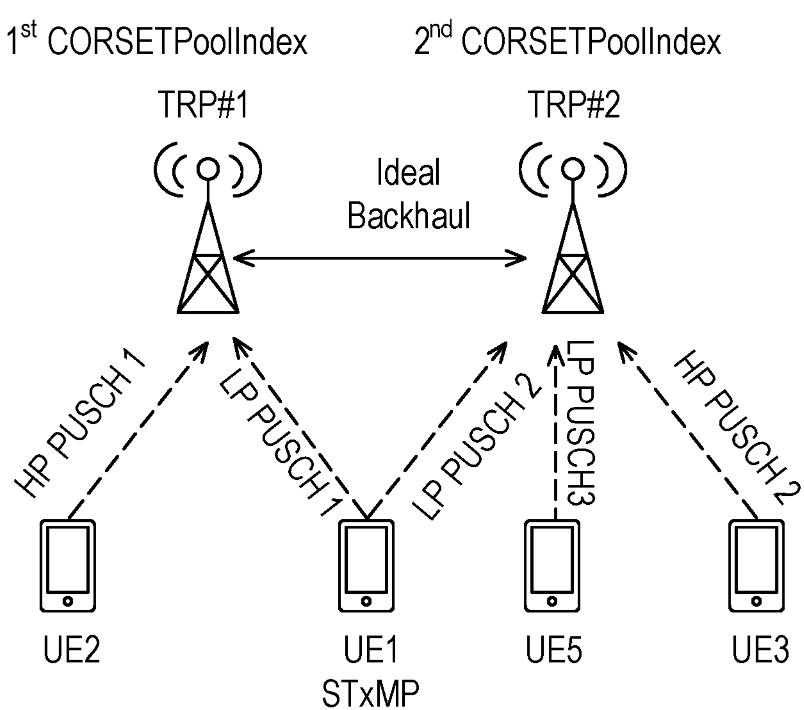
FIG. 21A and FIG. 21B are schematic diagrams that illustrate an explicit TRP/panel specific region of time and frequency resources for CI with a switching bit as “1” according to an exemplary embodiment of the present disclosure.
Figure 21B:
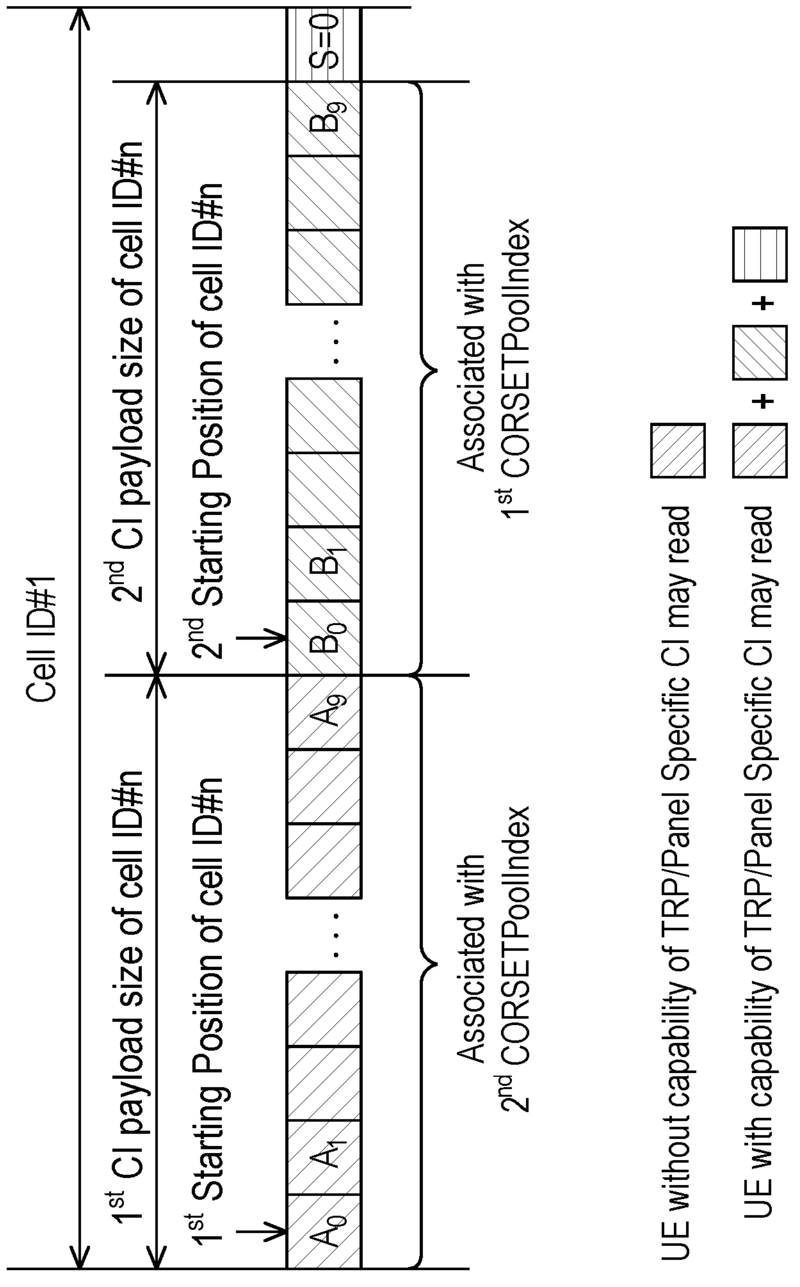

FIG. 21A and FIG. 21B are schematic diagrams that illustrate an explicit TRP/panel specific region of time and frequency resources for CI with a switching bit (i.e., the aforementioned first bit) as "1" according to an exemplary embodiment of the present disclosure. Referring to FIG. 21A, TRP #1 serves UE1 and UE2. TRP #2 serves UE1, UE3, and UE5 TRP #1 allocates resources for (HP) PUSCH 1 of UE2 and (LP) PUSCH 1 of UE1. TRP #2 allocates resources for (HP) PUSCH 2 of UE3, (LP) PUSCH 3 of UE5 and (LP) PUSCH 2 of UE.

Referring to FIG. 21, if the switching bit (e.g., "S")="1" for spatial relative information (e.g., CORESETPoolIndex or SRS resource set) switching/swap, the $1^{st}$ CI payload size and/or the $1^{st}$ start position may be associated with $2^{nd}$ CORESETPoolInex, and the $2^{nd}$ CI payload size and/or the $2^{nd}$ start position may be associated with $1^{st}$ CORESETPoolInex.

In one embodiment, the UE may cancel the first UL transmission on the serving cell according to the first information and the third information in the first DCI. In one embodiment, UE may cancel a UL transmission associated with a $1^{st}$ SRS resource set and/or a $1^{st}$ value of CORESETPoolIndex. The condition of UL transmission cancellation may include at least one of the following:

The transmission may be PUSCH with e.g., low priority 0;

The UL transmission may be overlapping a time/frequency region indicated by at least one bits having the value of "1" in the $1^{st}$ set of bits.

In one embodiment, the $1^{st}$ SRS resource set may be:

- lower/higher SRS resource set ID if two SRS resources sets configured by higher layer parameter;
- lowest/highest SRS resource set ID if at least one SRS resources sets configured by higher layer parameter;
- a configured/indicated SRS resource set ID by RRC, MAC CE, or DCI.

In one embodiment, the $1^{st}$ value of CORESETPoolIndex may be:

- lower/higher value of CORESETPoolIndex if two value of CORESETPoolIndex configured by higher layer parameter;
- a configured/indicated value of CORESETPoolIndex, MAC CE, or DCI.

In one embodiment, UE may cancel a UL transmission associated with a $2^{nd}$ SRS resource set and/or a $2^{nd}$ value of CORESETPoolIndex. The condition of UL transmission cancellation may include at least one of the following:

The transmission may be PUSCH with e.g., low priority 0;

The UL transmission may be overlapping a time/frequency region indicated by at least one bits having value of "1" in the $2^{nd}$ set of bits.

In one embodiment, the $2^{nd}$ SRS resource set may be:

- lower/higher SRS resource set ID if two SRS resources sets configured by higher layer parameter;
- lowest/highest SRS resource set ID if at least one SRS resources sets configured by higher layer parameter;
- a configured/indicated SRS resource set ID by RRC, MAC CE, or DCI.

In one embodiment, the $2^{nd}$ value of CORESETPoolIndex may be:

- lower/higher value of CORESETPoolIndex if two value of CORESETPoolIndex configured by higher layer parameter;
- a configured/indicated value of CORESETPoolIndex, MAC CE, or DCI.

In one embodiment, the UE may receive a second DCI. The second DCI indicates the first UL transmission. The first DCI is associated with a first CORESET pool index, and the second DCI is associated with a second CORESET pool index.

Figure 22A:
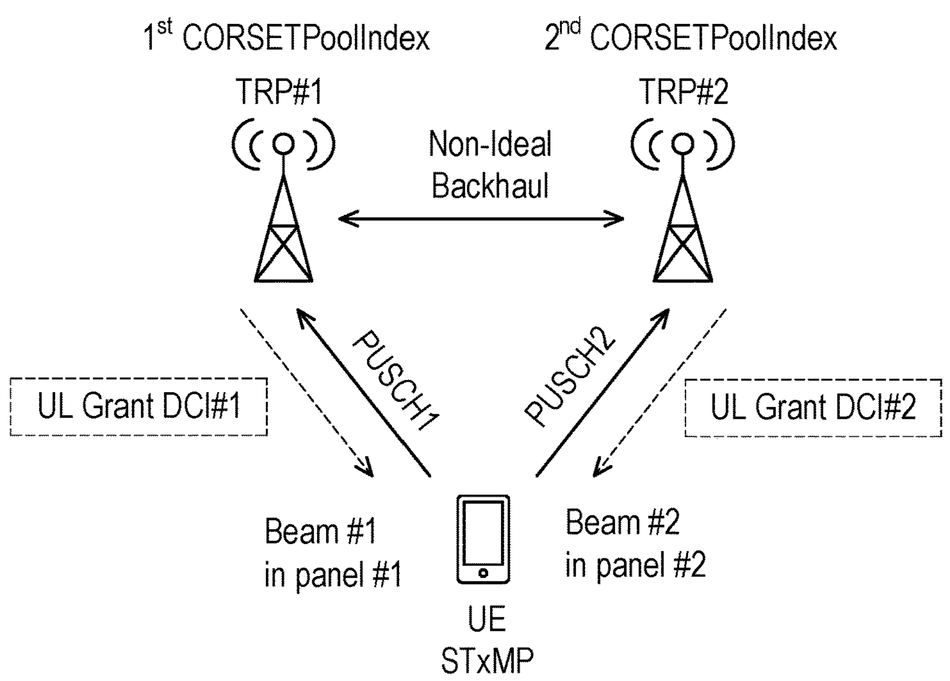
FIG. 22A and FIG. 22B are schematic diagrams that illustrate an implicit TRP/panel specific CI according to an exemplary embodiment of the present disclosure.
Figure 22B:
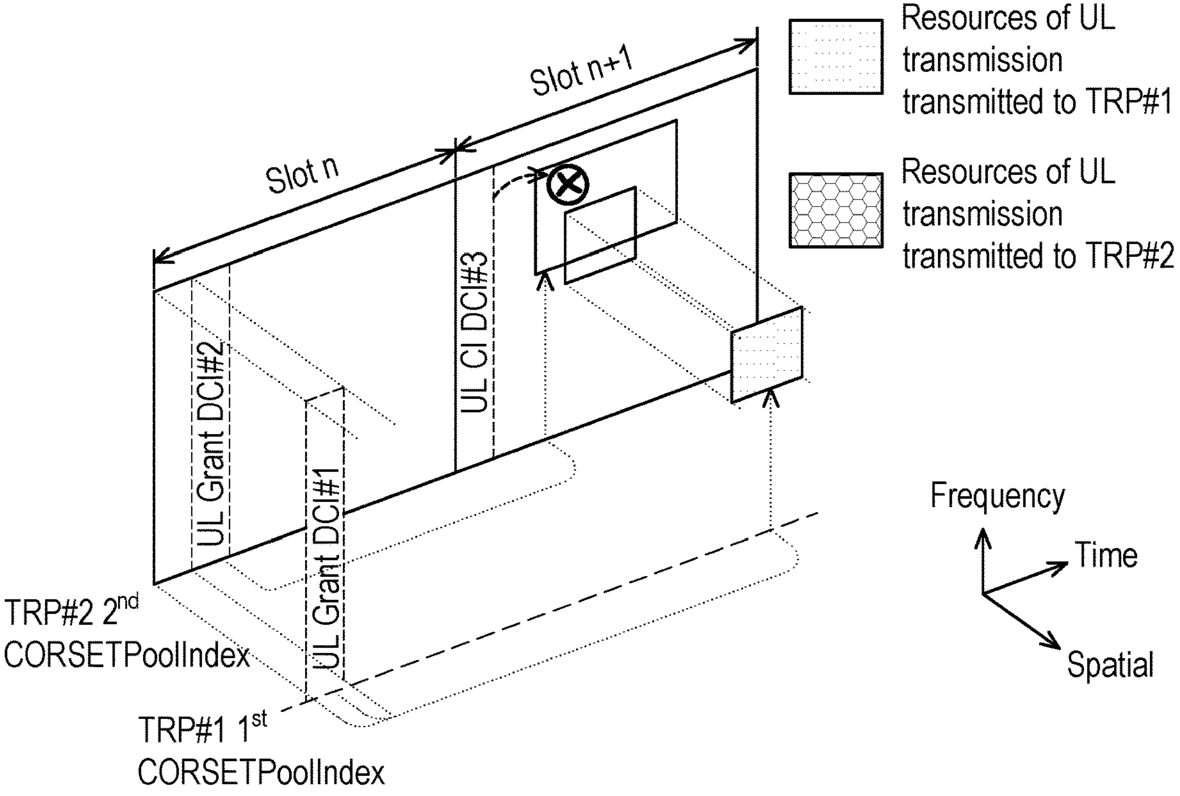

For example, FIG. 22A and FIG. 22B are schematic diagrams that illustrate an implicit TRP/panel specific CI according to an exemplary embodiment of the present disclosure. Referring to FIG. 22A, TRP #1 indicates the resource of PUSCH1 for the TCI state or DL RS corresponding to beam #1 of the SRS resource set corresponding to panel #1 by DCI #1. TRP #2 indicates the resource of PUSCH2 for the TCI state or DL RS corresponding to beam #2 of the SRS resource set corresponding to panel #2 by DCI #2.

In one embodiment, the UE may cancel the first UL transmission on the serving cell according to the first DCI in response to the first CORESET pool index being the same as the second CORESET pool index. In other words, if the first DCI for UL CI is associated with a value of CORESETPoolIndex, UE may cancel a UL transmission granted by the second DCI associated with the same value of CORESETPoolIndex. For example, referring to FIG. 22B, if the DCI #3 for UL CI is associated with $2^{nd}$ CORESETPoolIndex, UE may cancel the UL transmission granted by the DCI #2 associated with the $2^{nd}$ CORESETPoolIndex. However, the UL transmission granted by the DCI #1 associated with the $1^{st}$ CORESETPoolIndex is not cancelled.

Figure 23A:
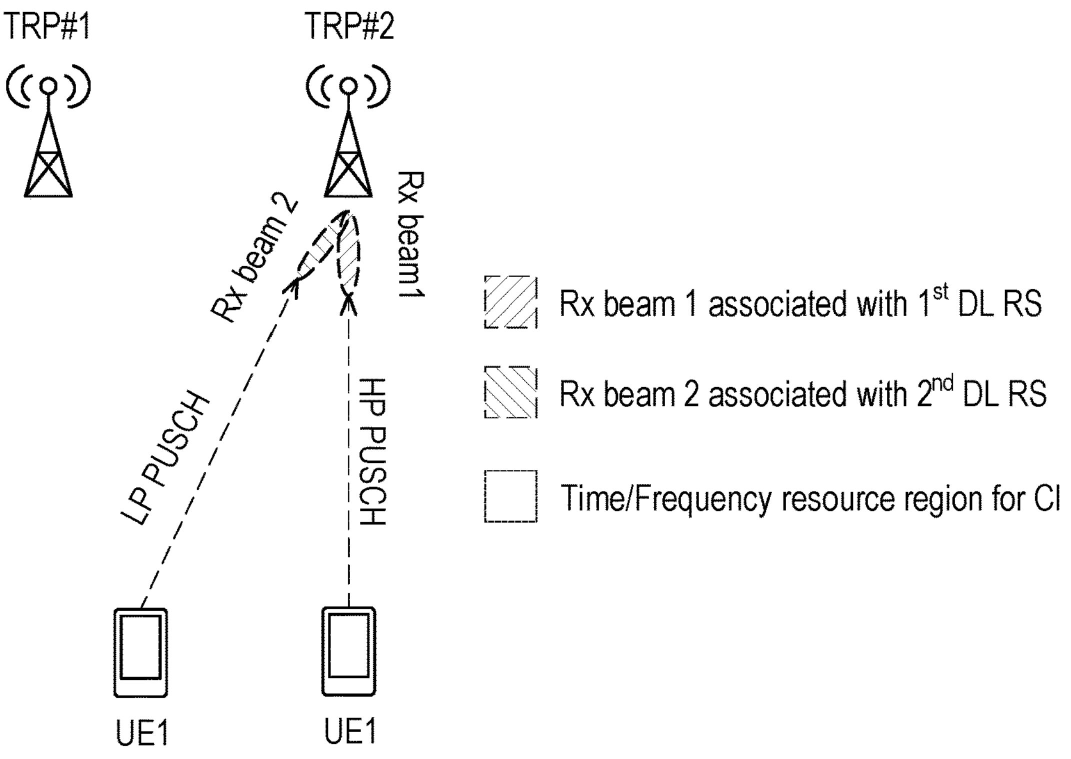
FIG. 23A and FIG. 23B are schematic diagrams that illustrate an explicit beam specific CI according to another exemplary embodiment of the present disclosure.
Figure 23B:
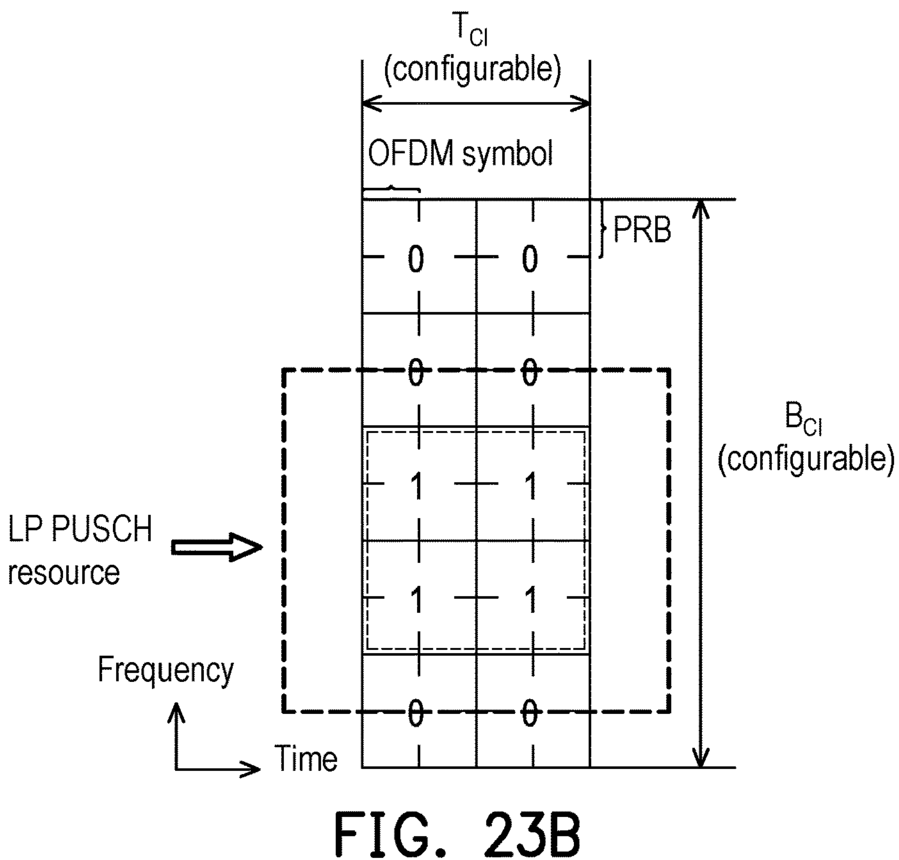

FIG. 23A and FIG. 23B are schematic diagrams that illustrate an explicit beam specific CI according to another exemplary embodiment of the present disclosure. Referring to FIG. 23A and FIG. 23B, T/F resource region indicated by UL CI DCI may be overlapping with at least one UL transmission. For example, TRP #2 may perform simultaneously reception with multiple Rx beams. Rx beam 1 is associated with $1^{st}$ DL RS or $1^{st}$ TCI state. Rx beam 2 is associated with $2^{nd}$ DL RS or $2^{nd}$ TCI state. At least one LP UL transmission may be cancelled if the at least one LP UL transmission and a HP UL transmission are received with at least one same Rx beam. However, the LP UL transmission may not be cancelled.

Figure 24:
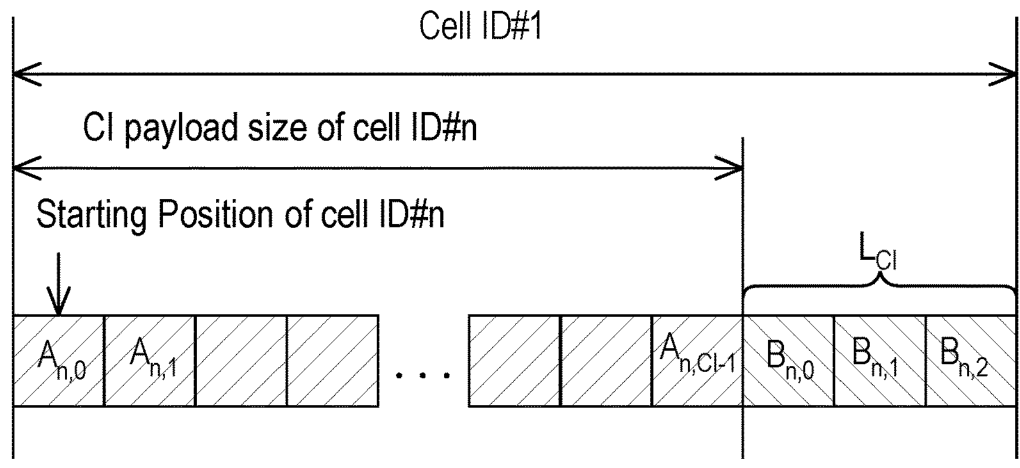
FIG. 24 is a schematic diagram that illustrates beam relative information in DCI according to an exemplary embodiment of the present disclosure.
Figure 24:
Figure 24:
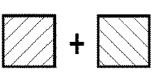

In one embodiment, the second information further indicates a first TCI state or a firt DL RS. For example, FIG. 24 is a schematic diagram that illustrates beam relative information in DCI according to an exemplary embodiment of the present disclosure. Referring to FIG. 24, UE may be configured with a beam relative information (e.g., $L_{CI}$) (i.e., the second information) in a DCI, for example, format 2_4 for, for example, UL CI. The $L_{CI}$ may associated with at least one of the following:

- cell ID (e.g., cell ID #n);
- a bit length (or a number/set of bits or a payload size) (e.g., the number of bits $B_{n,0}$ to $B_{n,2}$), where the bit length may be configured or fixed or pre-determined; a start position in the DCI within the DCI payload.

The $L_{CI}$ may start after the last bit of payload size (e.g., CI payload size of cell ID #n). UE with the capability of beam specific CI may read bits $A_{n,0}$ to $A_{n,CI-1}$ and bits $B_{n,0}$ to $B_{n,2}$. However, UE without the capability of beam specific CI may read merely bits $A_{n,0}$ to $A_{n,CI-1}$.

In one embodiment, UE may read a $1^{st}$ set of bits in the DCI within the DCI payload, if UE reports/has the capability of without TRP/Panel Specific CI (or STxMP), and/or if UE deactivates TRP/Panel Specific CI (or STxMP). The $1^{st}$ set of bits (such as bits $A_{n,0}$ to $A_{n,0}$ as shown in FIG. 24) may start from a $1^{st}$ starting position with the length of a $1^{st}$ CI payload size.

In one embodiment, UE may read a $1^{st}$ set of bits and/or a $2^{nd}$ set of bits in the DCI within the DCI payload if UE reports/has the capability of TRP/Panel Specific CI (or STxMP), and/or if UE activates TRP/Panel Specific CI (or STxMP). The $1^{st}$ set of bits may start from a $1^{st}$ starting position with the length of a $1^{st}$ CI payload size. The $2^{nd}$ set of bits e.g., $L_{CI}$(bits $B_{n,0}$ to $B_{n,2}$ as shown in FIG. 24) may start from a $2^{nd}$ starting position with the length of a $2^{nd}$ CI payload size. The $1^{st}$ set of bits and the $2^{nd}$ set of bits may be consecutive.

In one embodiment, UE may read a $1^{st}$ set of bits in the DCI within the DCI payload, if UE reports/has the capability of TRP/Panel Specific CI (or STxMP), and/or if UE activates TRP/Panel Specific CI (or STxMP). The $1^{st}$ set of bits may start from the $1^{st}$ starting position with a length of the $1^{st}$ CI payload size plus a length of a $2^{nd}$ CI payload size, for example, $L_{CI}$.

Figure 25:
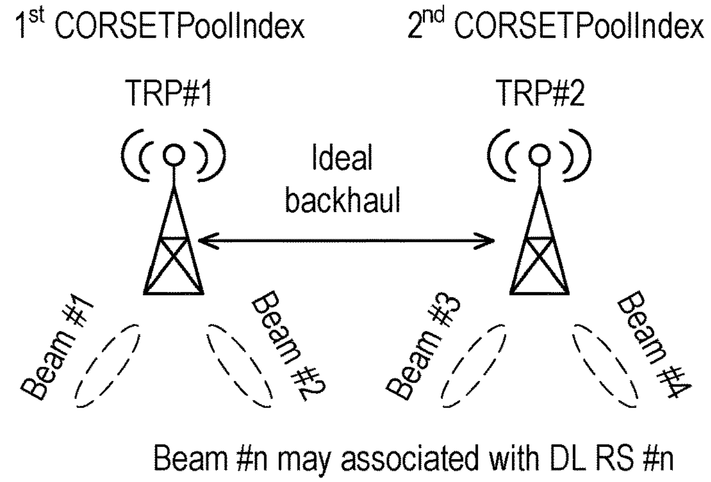
FIG. 25 is a schematic diagram that illustrates associations between SRS resource sets and control resource set (CORESET) pool indices according to an exemplary embodiment of the present disclosure.
Figure 25:
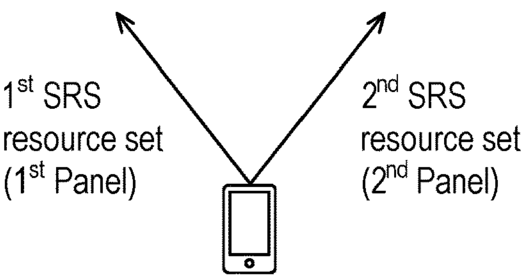

FIG. 25 is a schematic diagram that illustrates associations between SRS resource sets and control resource set (CORESET) pool indices according to an exemplary embodiment of the present disclosure. Referring to FIG. 25, $1^{st}$ SRS resource set ($1^{st}$ Panel) may be associated with $1^{st}$ CORSETPoolIndex. $2^{nd}$ SRS resource set ($2^{nd}$ Panel) may be associated with $2^{nd}$ CORSETPoolIndex. Beam #n may be associated with DL RS #n.

Table (5) is an example of an association of a codepoint of $L_{CI}$ and beam relative information.

TABLE 5

| $L_{CI}$ e.g., $<B_{n,0}, B_{n,1}, B_{n,2}>$ | Description |
|---|---|
| 000 | $1^{st}$ DL RS (or $1^{st}$ TCI state) |
| 001 | $2^{nd}$ DL RS (or $2^{nd}$ TCI state) |
| 010 | $3^{rd}$ DL RS (or $3^{rd}$ TCI state) |
| 011 | $4^{th}$ DL RS (or $4^{th}$ TCI state) |
| 100 | $1^{st}$ SRS resource set (or $1^{st}$ CORESETPoolIndex) |
| 101 | $2^{nd}$ SRS resource set (or $2^{nd}$ CORESETPoolIndex) |
| 110 | UL transmission cancellation may be applied irrespective of beam relative information and/or priority level |
| 111 | UL CI may be applicable to a UL transmission indicated/configured as low priority level |

If a UL transmission is a (e.g., LP) PUSCH or a SRS and/or if the UL transmission is associated with at least one DL RS (or TCI state), UE may cancel the UL transmission associated with $L_{CI}$.

In one embodiment, UE may report at least one capability, wherein at least one capability may include at least one of the following:

- capability of beam specific CI;
- capability of without beam specific CI.

In one embodiment, UE may read a $1^{st}$ set of bits in the DCI within the DCI payload if UE reports/has the capability of without beam specific CI, and/or if UE deactivates beam specific CI, where the $1^{st}$ set of bits may start from a $1^{st}$ starting position with the length of a $1^{st}$ CI payload size.

In one embodiment, UE may read a $1^{st}$ set of bits and/or a $2^{nd}$ set of bits in the DCI within the DCI payload if UE reports/has the capability of beam specific CI, and/or if UE activates beam specific CI. The $1^{st}$ set of bits may start from a $1^{st}$ starting position with the length of a $1^{st}$ CI payload size. The $2^{nd}$ set of bits e.g., $L_{CI}$(bits $B_{n,0}$ to $B_{n,2}$ as shown in FIG. 24) may start from a $2^{nd}$ starting position with the length of a $2^{nd}$ CI payload size. The $1^{st}$ set of bits and the $2^{nd}$ set of bits may be consecutive.

In one embodiment, UE may read a $1^{st}$ set of bits in the DCI within the DCI payload if UE reports/has the capability of beam specific CI, and/or if UE activates beam specific CI. The $1^{st}$ set of bits may start from the $1^{st}$ starting position with a length of the $1^{st}$ CI payload size plus a length of a $2^{nd}$ CI payload size e.g., $L_{CI}$.

In one embodiment, an association of a codepoint and beam relative information may be configured by RRC/MAC CE or indicated by DCI.

In one embodiment, a $1^{st}$ codepoint may indicate that UE may cancel UL transmission. The condition of UL transmission cancellation may include at least one of following:

- the transmission may be PUSCH with low priority e.g., 0 or irrespective of its priority level;
- a group of symbols, from the $T_{CI}$ symbols, may have at least one bit value of '1' in the corresponding set of $N_{BI}=N_{CI}/G_{CI}$ bits in the DCI (e.g., format 2_4) and/or may include a symbol of the (repetition of the) PUSCH transmission or of the SRS transmission; a group of PRBs, from the $B_{CI}$ PRBs, may have a corresponding bit value of '1' in the set of bits corresponding to the group of symbols in the DCI (e.g., format 2_4) and may include a PRB of the (repetition of the) PUSCH transmission or of the SRS transmission.

In one embodiment, a $2^{nd}$ codepoint may indicate that UE may cancel UL transmission associated with a TCI state (or a DL RS or a UL RS). The condition of UL transmission cancellation may include at least one of the following:

- the transmission may be PUSCH with e.g., low priority 0;
- a group of symbols, from the $T_{CI}$ symbols, may have at least one bit value of '1' in the corresponding set of $N_{BI}=N_{CI}/G_{CI}$ bits in the DCI (e.g., format 2_4) and/or may include a symbol of the (repetition of the) PUSCH transmission or of the SRS transmission; a group of PRBs, from the $B_{CI}$ PRBs, may have a corresponding bit value of '1' in the set of bits corresponding to the group of symbols in the DCI (e.g., format 2_4) and may include a PRB of the (repetition of the) PUSCH transmission or of the SRS transmission.

Figure 26A:
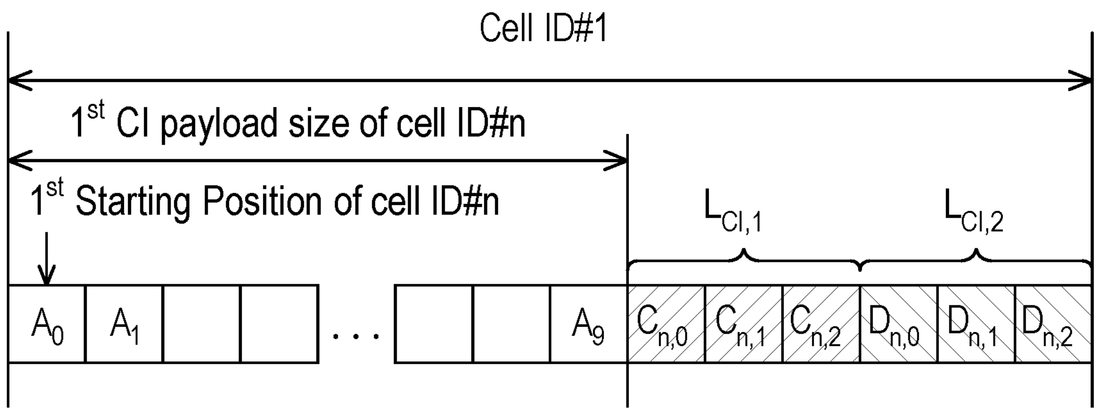
FIG. 26A to FIG. 26C are schematic diagrams that illustrate associations between downlink (DL) referecnce signal (RS) or transmission configuration indicator (TCI) state and additional bits according to an exemplary embodiment of the present disclosure.
Figure 26B:
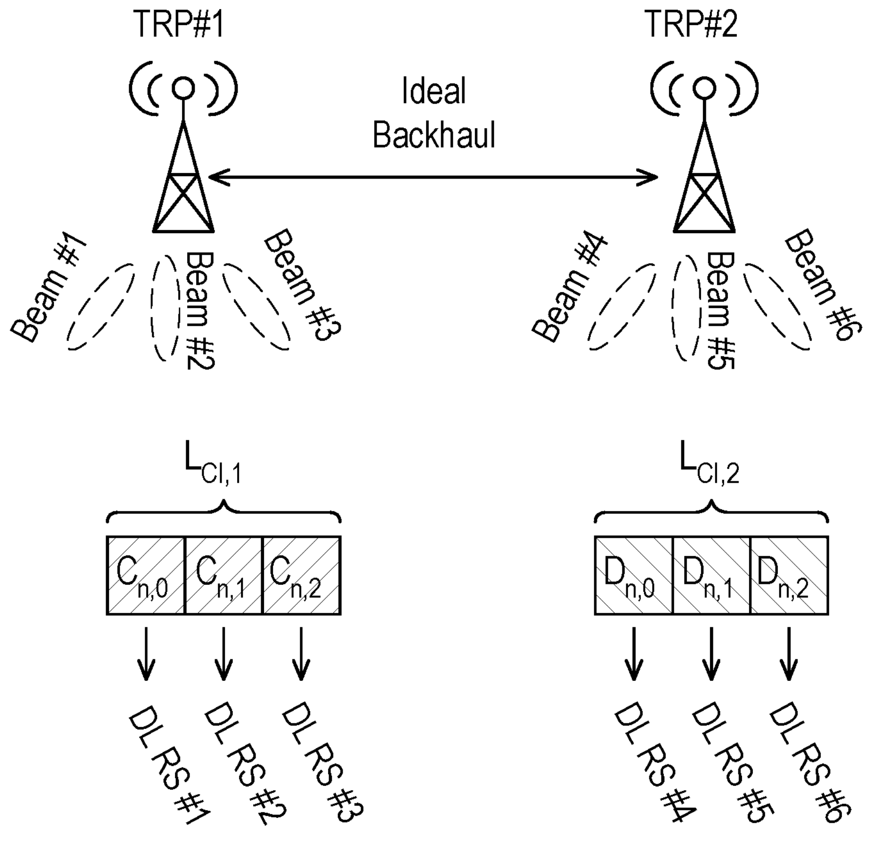
Figure 26C:
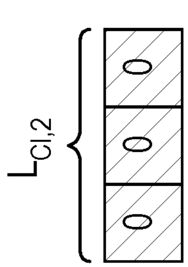
Figure 26C:
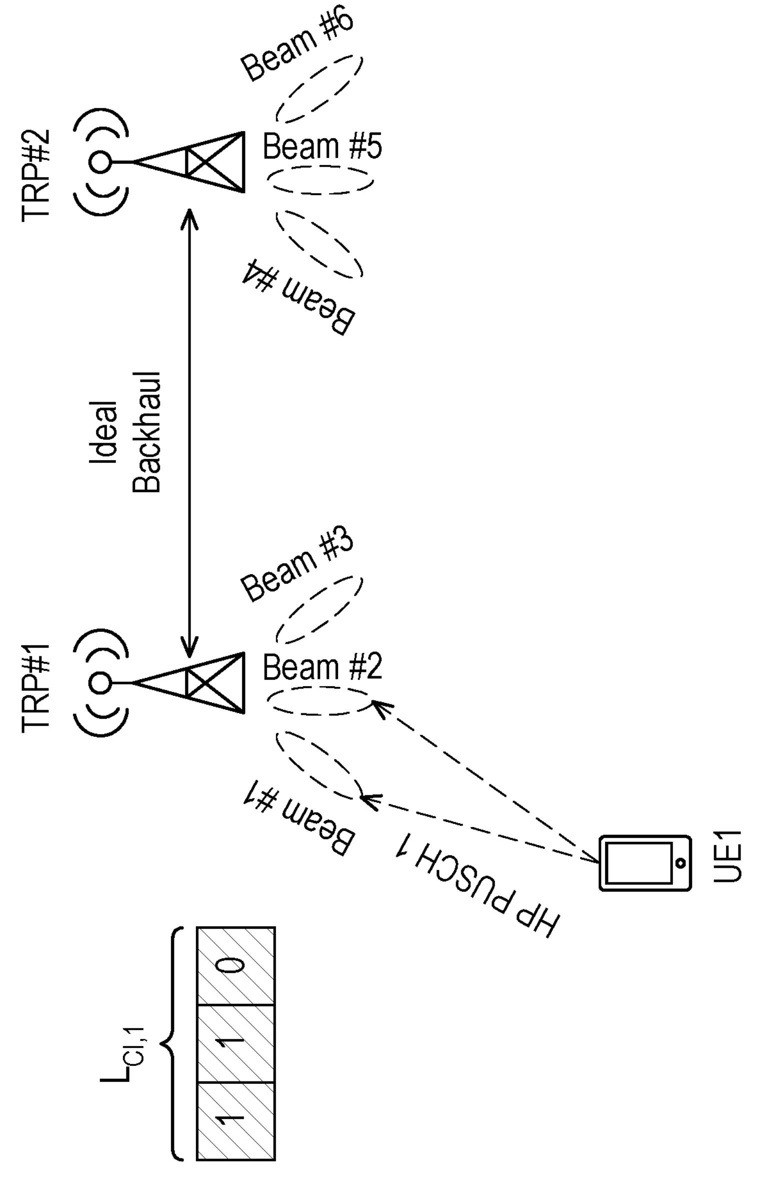

In one embodiment, the second information is a bitmap indicating a first set of TCI states or DL RSs. For example, FIG. 26A to FIG. 26C are schematic diagrams that illustrate associations between downlink (DL) reference signal (RS) or transmission configuration indicator (TCI) state and additional bits according to an exemplary embodiment of the present disclosure. Referring to FIG. 26A, each bit in the $L_{CI,1}$ may be associated with at least one DL RS (or TCI state). For example, referring to FIG. 26B, the $L_{CI,1}$ includes three bits $C_{n,0}$, $C_{n,1}$, $C_{n,2}$ corresponding to DL RS #1, DL RS #2, and DL RS #3, respectively. Each bit in the $L_{CI,2}$ may be associated with at least one DL RS (or TCI state). For example, the $L_{CI,2}$ includes three bits $D_{n,0}$, $D_{n,1}$, $D_{n,2}$ corresponding to DL RS #4, DL RS #5, and DL RS #6, respectively.

Referring to FIG. 26C, if the $L_{CI,1}$ is configured as "110", UE1 cancels the PUSCH via the DL RS #3 or $3^{rd}$ TCI state corresponding to beam #3. If the $L_{CI,2}$ is configured as "000", the PUSCH via the DL RS #3 to DL RS #6 or $3^{rd}$ TCI state to $6^{th}$ TCI state corresponding to beam #4 to beam #6 would be cancelled.

In one embodiment, the first set of the time and frequency resource is associated with one of the first set of TCI state indicated by the second information.

Figure 27A:
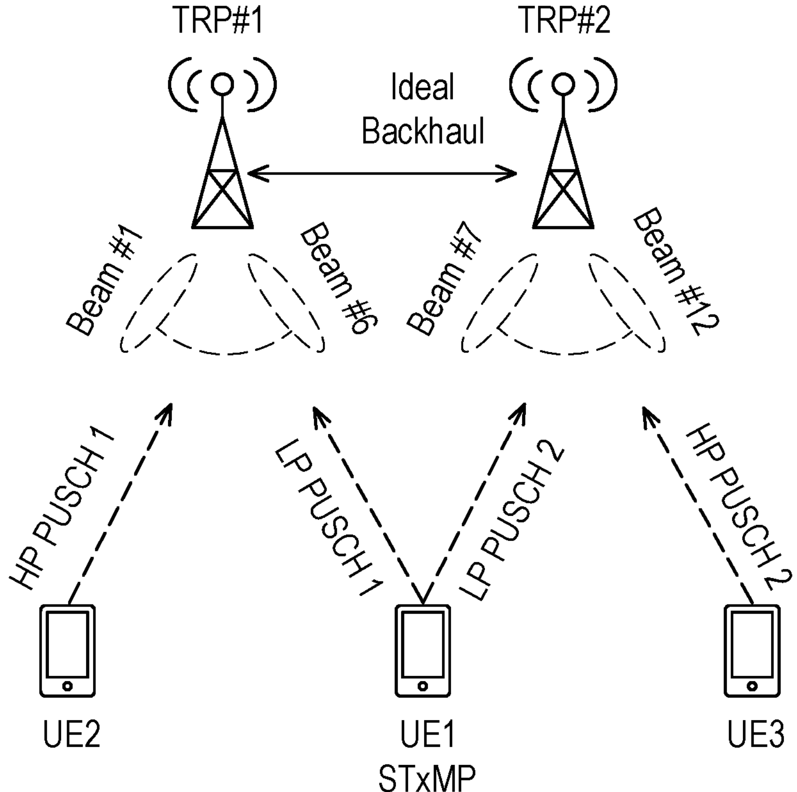
FIG. 27A to FIG. 27C are schematic diagrams that illustrate an explicit beam specific region of time and frequency resource for CI according to an exemplary embodiment of the present disclosure.
Figure 27B:
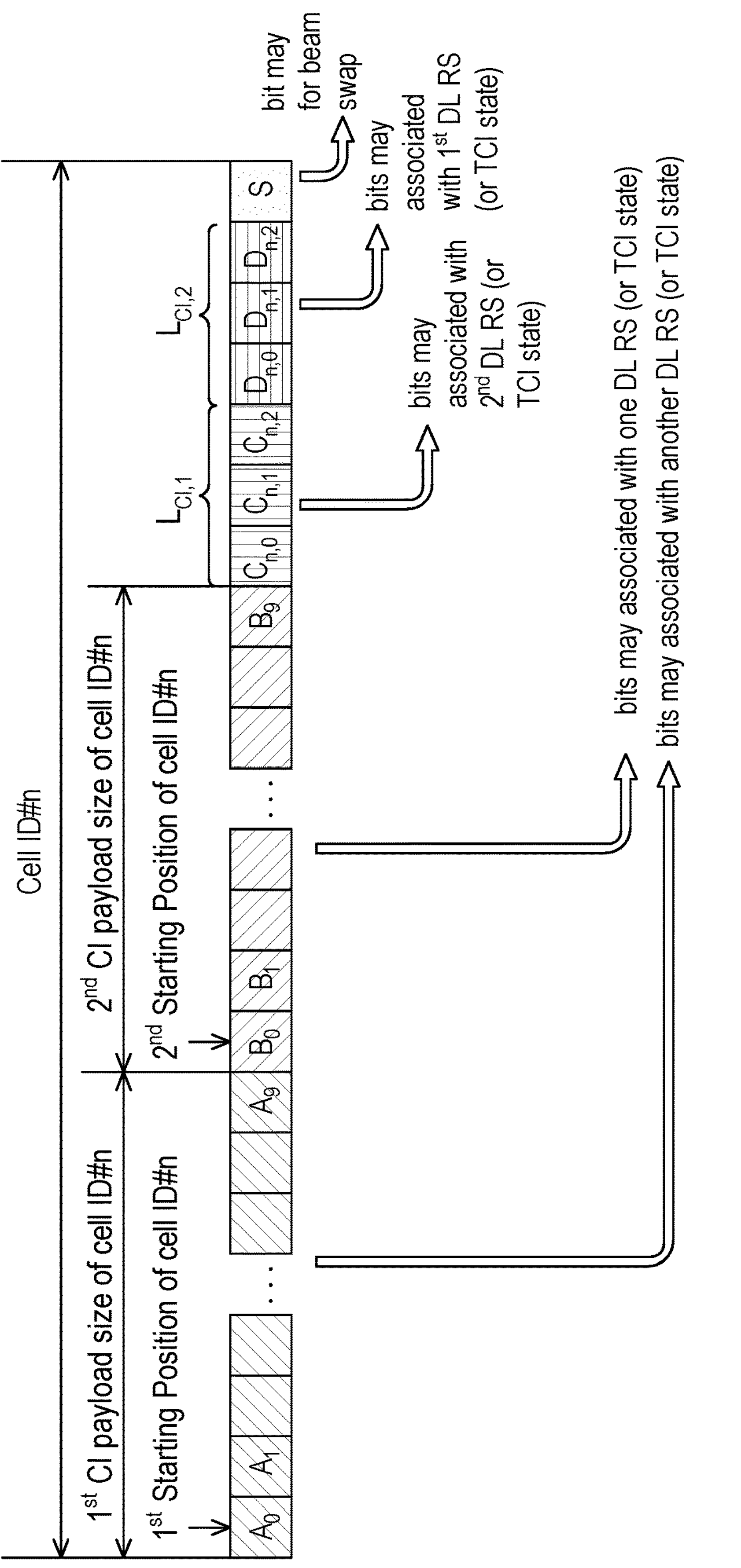
Figure 27C:
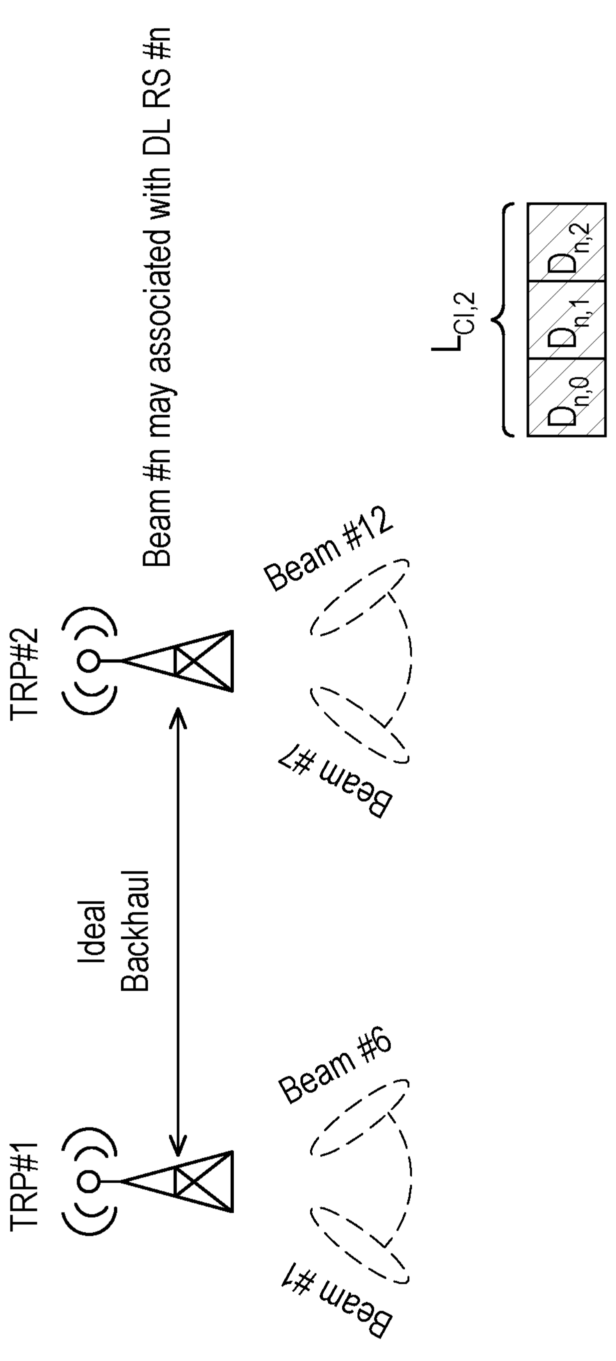
Figure 27C:
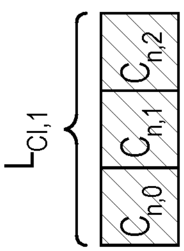

In one embodiment, the resource configuration further includes fourth information related to one TCI state. In one embodiment, the resource configuration further includes fifth information related to another TCI state. For example, FIG. 27A to FIG. 27C are schematic diagrams that illustrate an explicit beam specific region of time and frequency resource for CI according to an exemplary embodiment of the present disclosure. Referring to FIG. 27A, TRP #1 provides $1^{st}$ TCI state to $6^{th}$ TCI state or DL RS #1 to DL RS #6 corresponding to beam #1 to beam #6. TRP #2 provides $7^{th}$ TCI state to $12^{th}$ TCI state or DL RS #7 to DL RS #12 corresponding to beam #7 to beam #12.

Referring to FIG. 27B, UE may be configured with a $1^{st}$ CI payload size and/or a $2^{nd}$ CI payload size. UE may be configured with a $1^{st}$ start position and/or $2^{nd}$ start position in the DCI within the DCI payload. UE may be configured with a $1^{st}$ and/or $2^{nd}$ beam relative information (e.g., $L_{CI,1}$ and/or $L_{CI,2}$) for, for example, UL CI. UE may be configured with a bit (e.g., "S") for spatial relative information (e.g., DL RS or TCI state). switching/swap. Bits $B_0$ to $B_9$ may be associated with one DL RS (or TCI state). Bits $A_0$ to $A_9$ may be associated with another DL RS (or TCI state). The $L_{CI,1}$ may be associated with $2^{nd}$ DL RS (or TCI state). The $L_{CI,2}$ may be associated with $1^{st}$ DL RS (or TCI state).

In one embodiment, the fourth information indicates at least one of the following information:

a first TCI state;

a priority level; and irrespective of the priority level.

In one embodiment, the fifth information indicates at least one of the following information:

a second TCI state;

a priority level; and irrespective of the priority level.

For example, referring to FIG. 27C, the $L_{CI,1}$ includes three bits $C_{n,0}$, $C_{n,1}$, $C_{n,2}$ the $L_{CI,2}$ includes three bits $D_{n,0}$, $D_{n,1}$, $D_{n,2}$. Table (6) is an example of an association of a codepoint of $L_{CI,1}$ and beam relative information.

TABLE 6

| $L_{CI,1}$ e.g., <$C_{n,0}$, $C_{n,1}$, $C_{n,2}$> | Description |
|---|---|
| 000 | DL RS#1 (or TCI state#1) |
| 001 | DL RS#2 (or TCI state#2) |
| 010 | DL RS#3 (or TCI state#3) |
| 011 | DL RS#4 (or TCI state#4) |
| 100 | DL RS#5 (or TCI state#5) |
| 101 | DL RS#6 (or TCI state#6) |
| 110 | UL transmission cancellation associated with DL RS #1~#6 may be applied irrespective of beam relative information and/or priority level |
| 111 | UL CI may be applicable to a UL transmission associated with DL RS #1~#6 indicated/configured as low priority level |

Table (7) is an example of an association of a codepoint of $L_{CI,1}$ and beam relative information.

TABLE 7

| $L_{CI,2}$ e.g., <$D_{n,0}$, $D_{n,1}$, $D_{n,2}$> | Description |
|---|---|
| 000 | DL RS#7 (or TCI state#7) |
| 001 | DL RS#8 (or TCI state#8) |
| 010 | DL RS#9 (or TCI state#9) |
| 011 | DL RS#10 (or TCI state#10) |
| 100 | DL RS#11 (or TCI state#11) |
| 101 | DL RS#12 (or TCI state#12) |
| 110 | UL transmission cancellation associated with DL RS #7~#12 may be applied irrespective of beam relative information and/or priority level |
| 111 | UL CI may be applicable to a UL transmission associated with DL RS #7~#12 indicated/configured as low priority level |

In one embodiment, the resource configuration further includes a second bit (e.g., bit "S" as shown in FIG. 27B). In response to the second bit being a third value (e.g., "0"), the first set of the time and frequency resource is associated with the fourth information, and the second set of the time and frequency resource is associated with the fifth information. On the other hand, in response to the second bit being a fourth value, the first set of the time and frequency resource is associated with the fifth information, and the second set of the time and frequency resource is associated with the fourth information.

Figure 28A:
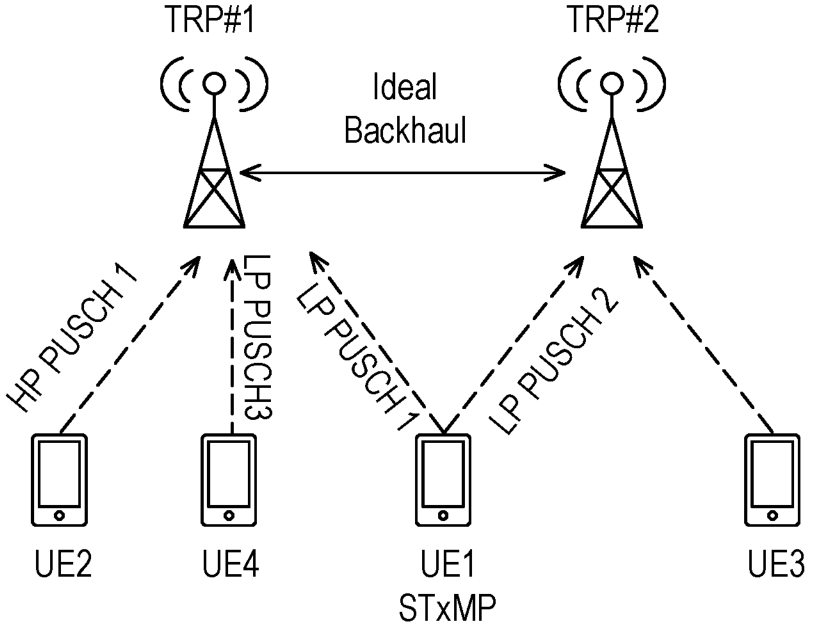
FIG. 28A and FIG. 28B are schematic diagrams that illustrate an explicit beam specific region of time and frequency resource for CI with a switching bit as “0” according to an exemplary embodiment of the present disclosure.
Figure 28B:
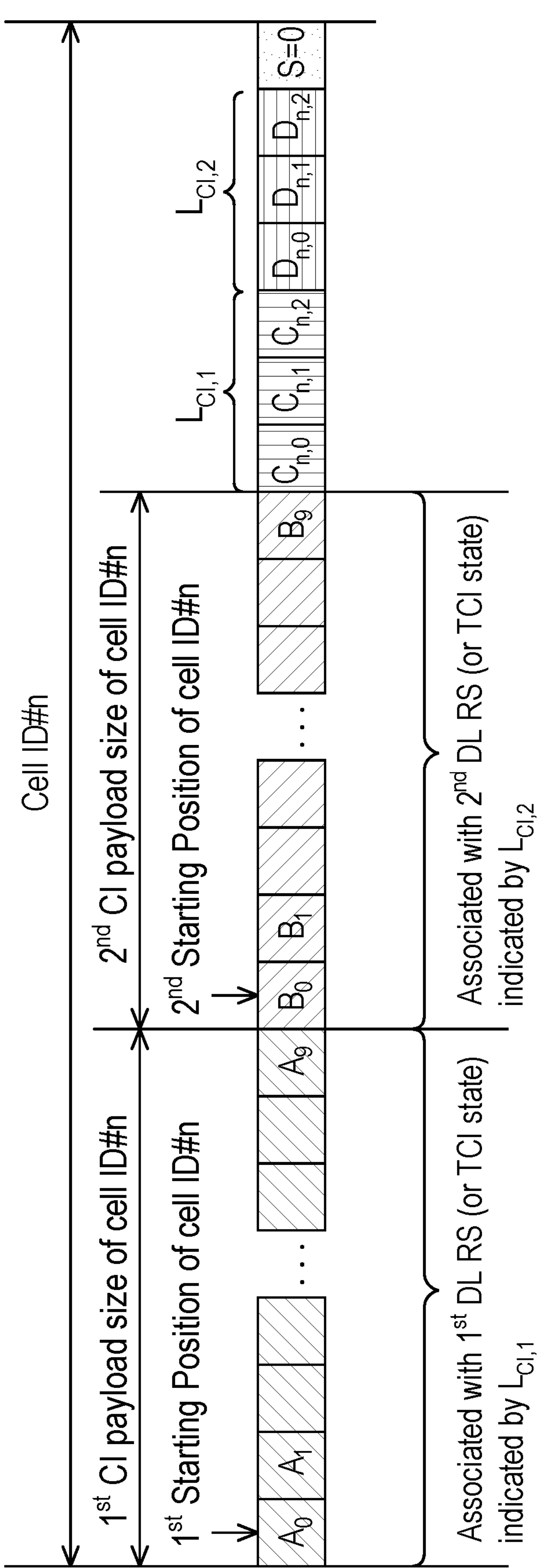

For example, FIG. 28A and FIG. 28B are schematic diagrams that illustrate an explicit beam specific region of time and frequency resource for CI with a switching bit as "0" according to an exemplary embodiment of the present disclosure. Referring to FIG. 28A, TRP #1 serves UE1, UE2 and UE4. TRP #2 serves UE1 and UE3. TRP #1 allocates resources for (HP) PUSCH 1 of UE2, (LP) PUSCH 3 of UE4, and (LP) PUSCH 1 of UE1. TRP #2 allocates resources for (HP) PUSCH 2 of UE3 and (LP) PUSCH 2 of UE 1.

Referring to FIG. 28B, if the bit (e.g., "S")="0" for spatial relative information (e.g., DL RS or TCI state) switching/swap, the $1^{st}$ CI payload size and/or the $1^{st}$ start position may be associated with $1^{st}$ DL RS (or TCI state), and the $2^{nd}$ CI payload size and/or the $2^{nd}$ start position may be associated with $2^{nd}$ DL RS (or TCI state).

Figure 29A:
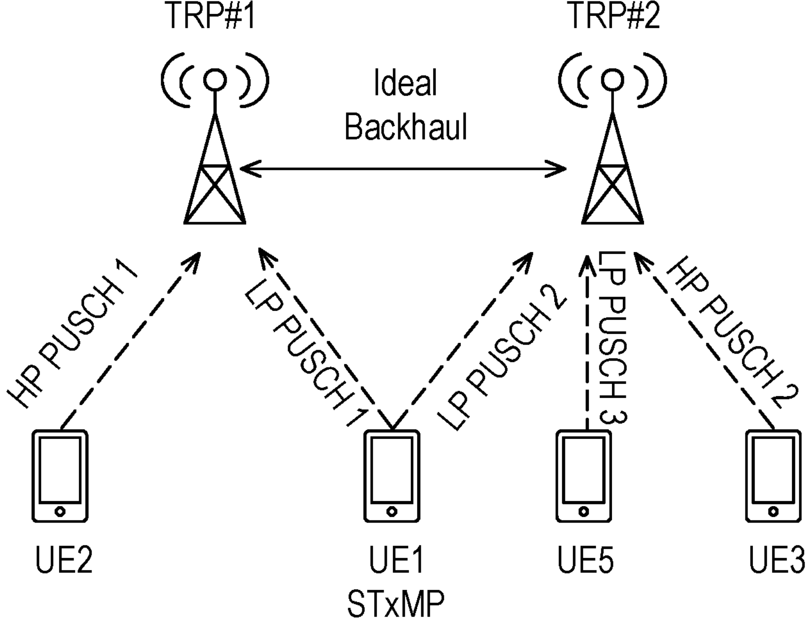
FIG. 29A and FIG. 29B are schematic diagrams that illustrate an explicit beam specific region of time and frequency resource for CI with a switching bit as “1” according to an exemplary embodiment of the present disclosure.
Figure 29B:
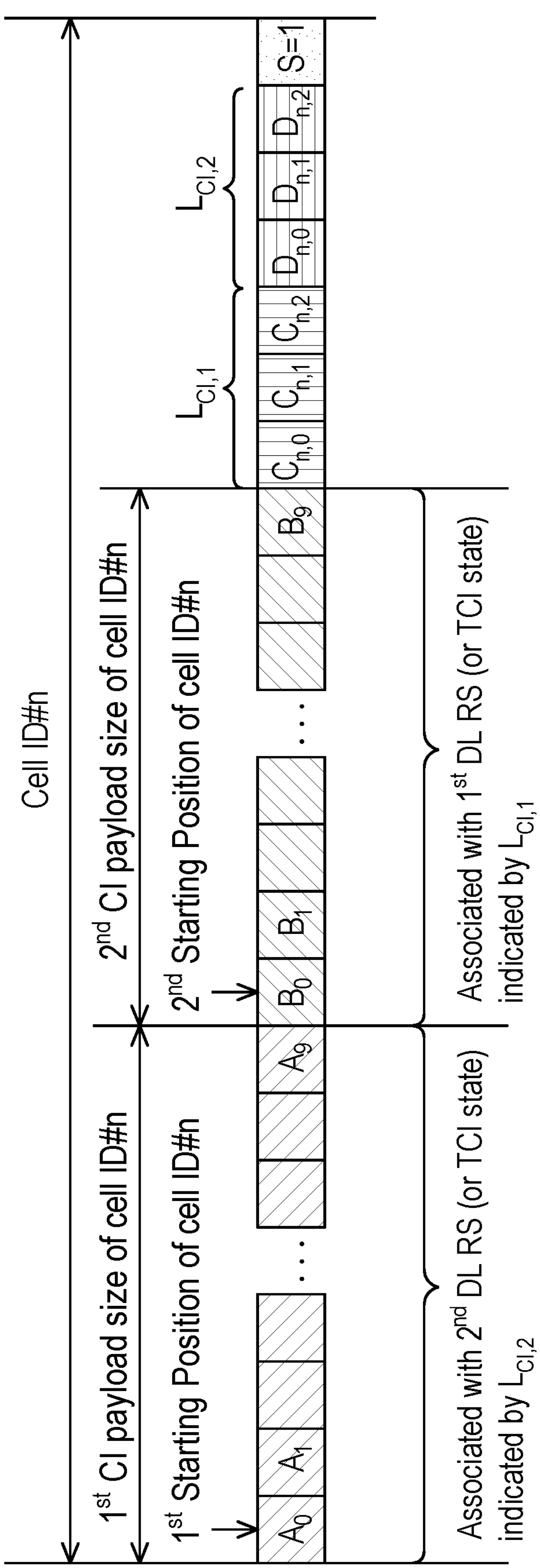

FIG. 29A and FIG. 29B are schematic diagrams that illustrate an explicit beam specific region of time and frequency resource for CI with a switching bit as "1" according to an exemplary embodiment of the present disclosure. Referring to FIG. 29A, TRP #1 serves UE1 and UE2. TRP #2 serves UE1, UE3, and UE5. TRP #1 allocates resources for (HP) PUSCH 1 of UE2 and (LP) PUSCH 1 of UE1. TRP #2 allocates resources for (HP) PUSCH 2 of UE3, (LP) PUSCH 3 of UE5, and (LP) PUSCH 2 of UE1.

Referring to FIG. 28B, if the bit (e.g., "S")="1" for spatial relative information (e.g., DL RS or TCI state) switching/swap, the $1^{st}$ CI payload size and/or the $1^{st}$ start position may be associated with $2^{nd}$ DL RS (or TCI state), and the $2^{nd}$ CI payload size and/or the $2^{nd}$ start position may be associated with $1^{st}$ DL RS (or TCI state).

Figure 30A:
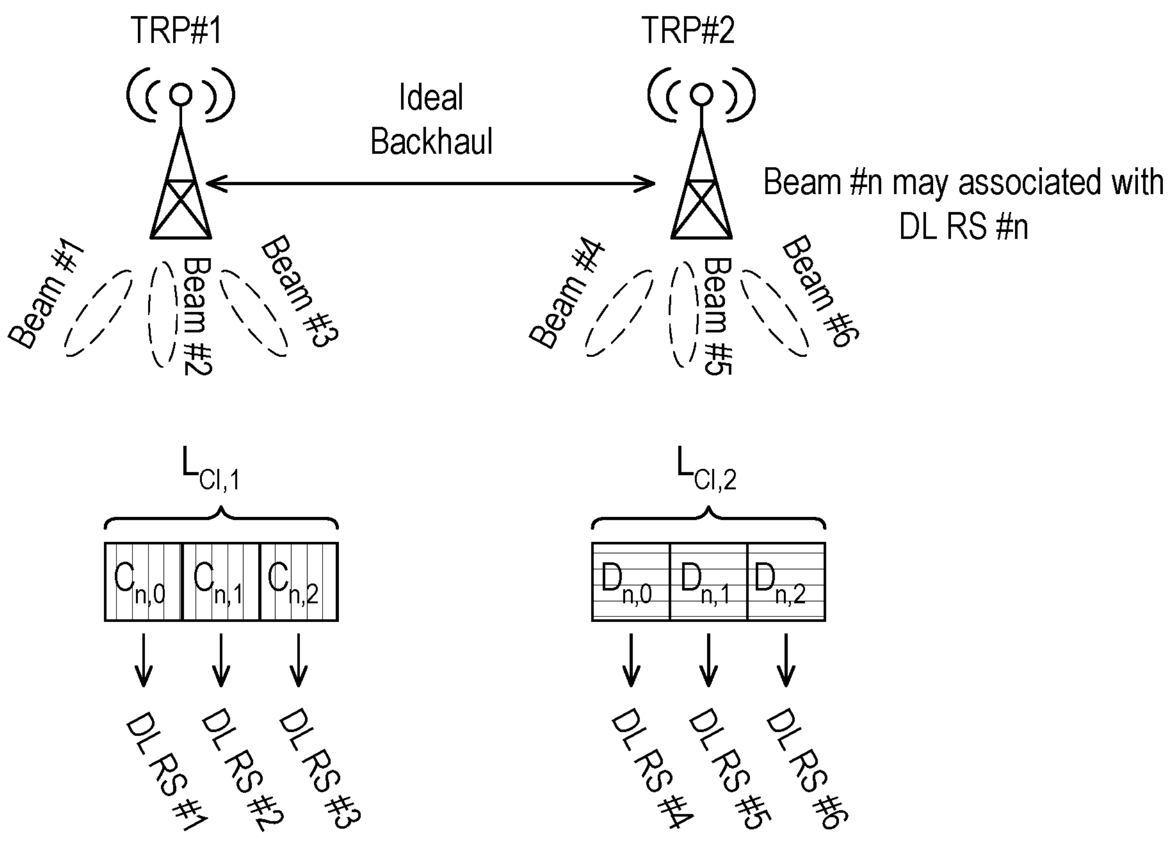
FIG. 30A and FIG. 30B are schematic diagrams that illustrate a beam specific region of time and frequency resource for CI according to an exemplary embodiment of the present disclosure.
Figure 30B:
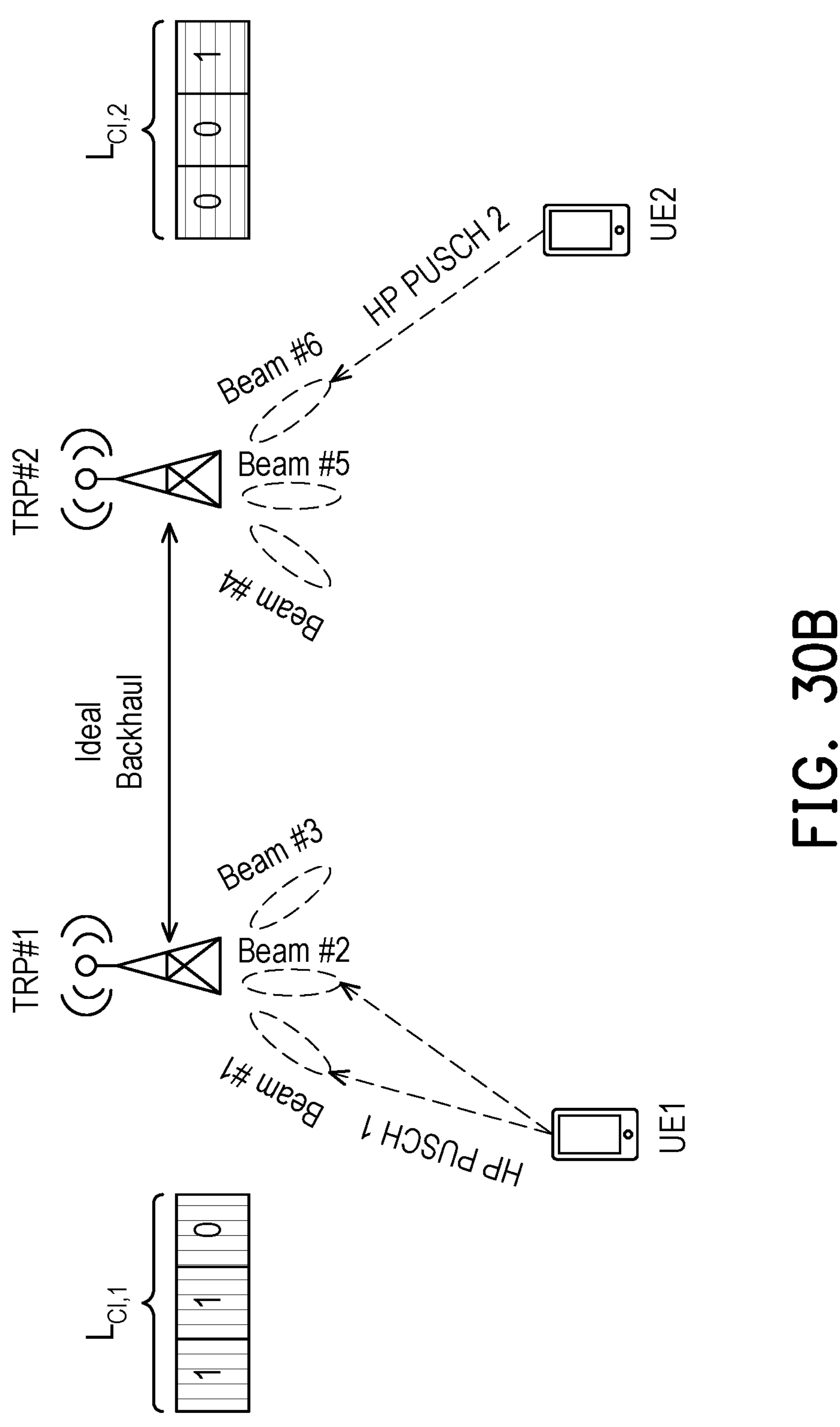

In one embodiment, the second information is a bitmap indicating a first set of TCI states or DL RSs. For example, FIG. 30A and FIG. 30B are schematic diagrams that illustrate a beam specific region of time and frequency resource for CI according to an exemplary embodiment of the present disclosure. Referring to FIG. 30A, each bit in the $L_{CI,1}$ may be associated with at least one DL RS (or TCI state). For example, the $L_{CI,1}$ includes three bits $C_{n,0}$, $C_{n,1}$, $C_{n,2}$ corresponding to DL RS #1, DL RS #2, and DL RS #3, respectively. Each bit in the $L_{CI,2}$ may be associated with at least one DL RS (or TCI state). For example, the $L_{CI,2}$ includes three bits $D_{n,0}$, $D_{n,1}$, $D_{n,2}$ corresponding to DL RS #4, DL RS #5, and DL RS #6, respectively.

Referring to FIG. 30B, if the $L_{CI,1}$ is configured as "110", UE1 cancels the PUSCH via the DL RS #3 or $3^{rd}$ TCI state corresponding to beam #3. If the $L_{CI,2}$ is configured as "001", UE2 cancels the PUSCH via the DL RS #4 to DL RS #5 or $4^{th}$ TCI state to $5^{th}$ TCI state corresponding to beam #4 to beam #5.

Figure 31A:
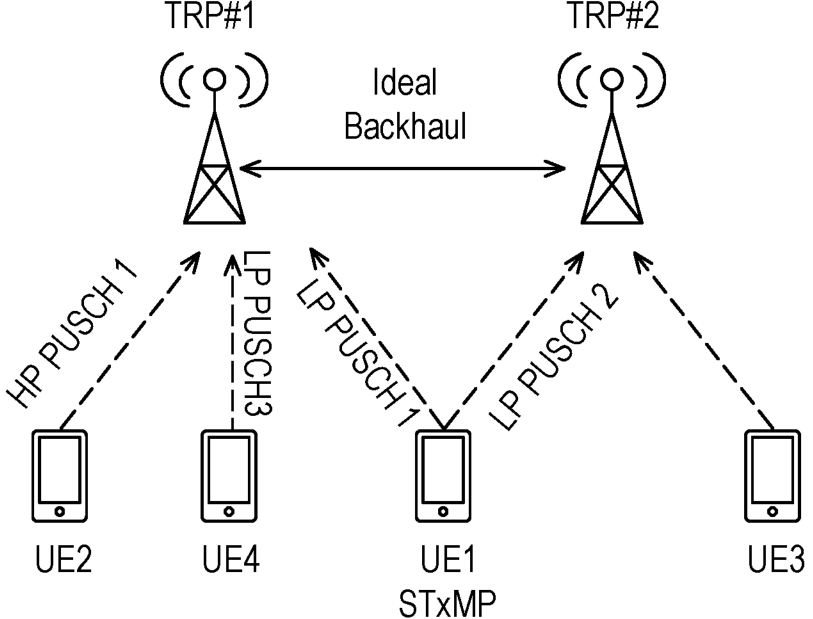
FIG. 31A and FIG. 31B are schematic diagrams that illustrate an explicit beam specific region of time and frequency resource for CI with a switching bit as “0” according to an exemplary embodiment of the present disclosure.
Figure 31B:
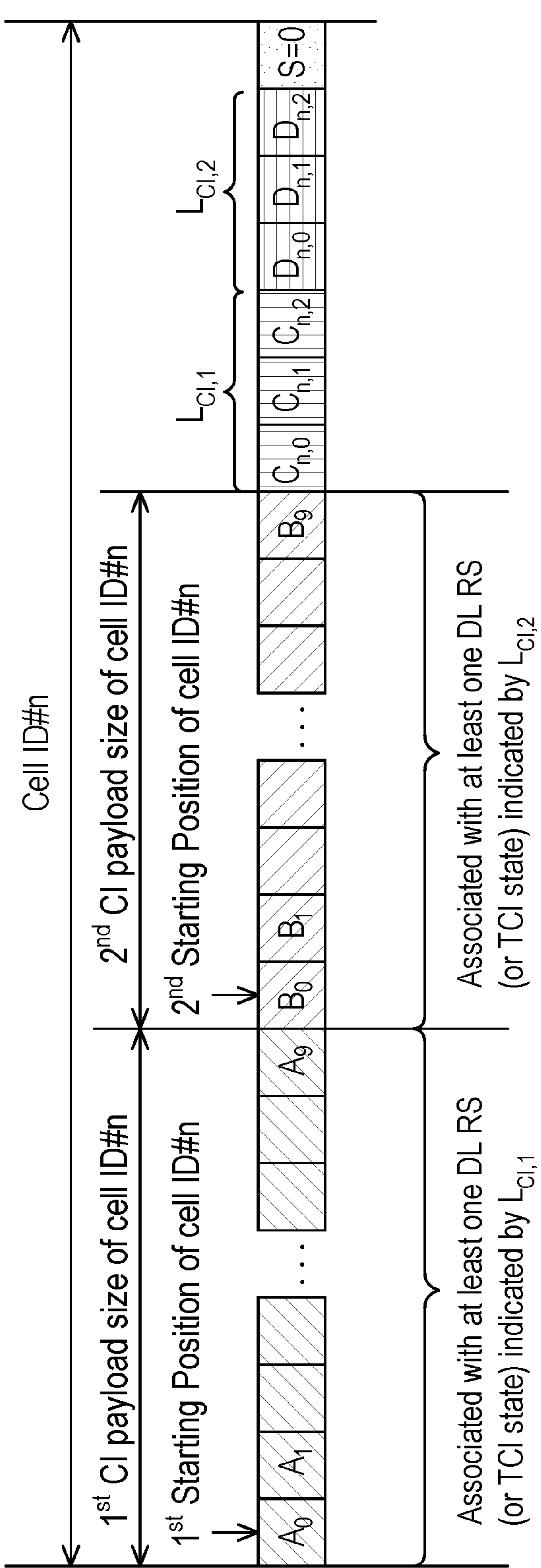

FIG. 31A and FIG. 31B are schematic diagrams that illustrate an explicit beam specific region of time and frequency resource for CI with a switching bit as "0" according to an exemplary embodiment of the present disclosure. Referring FIG. 31A, TRP #1 serves UE1, UE2 and UE4. TRP #2 serves UE1 and UE3. TRP #1 allocates resources for (HP) PUSCH 1 of UE2, (LP) PUSCH 3 of UE4, and (LP) PUSCH 1 of UE1. TRP #2 allocates resources for (HP) PUSCH 2 of UE3 and (LP) PUSCH 2 of UE1.

Referring to FIG. 31B, if the bit (e.g., "S")="0" for spatial relative information (e.g., DL RS or TCI state) switching/swap, the $1^{st}$ CI payload size and/or the $1^{st}$ start position may be associated with at least one DL RS (or TCI state) indicated by $L_{CI,1}$, and the $2^{nd}$ CI payload size and/or the $2^{nd}$ start position may be associated with at least one DL RS (or TCI state) indicated by $L_{CI,2}$.

Figure 32A:
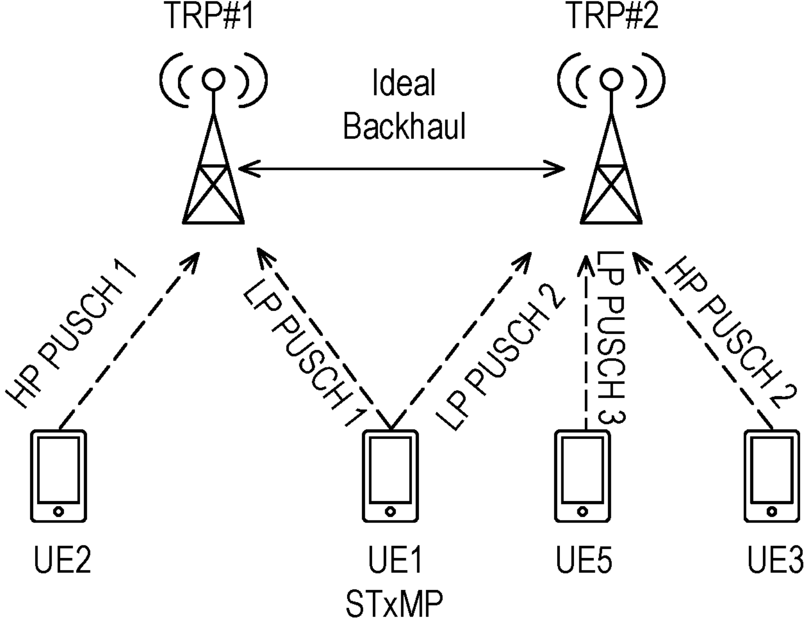
FIG. 32A and FIG. 32B are schematic diagrams that illustrate an explicit beam specific region of time and frequency resource for CI with a switching bit as “1” according to an exemplary embodiment of the present disclosure.
Figure 32B:
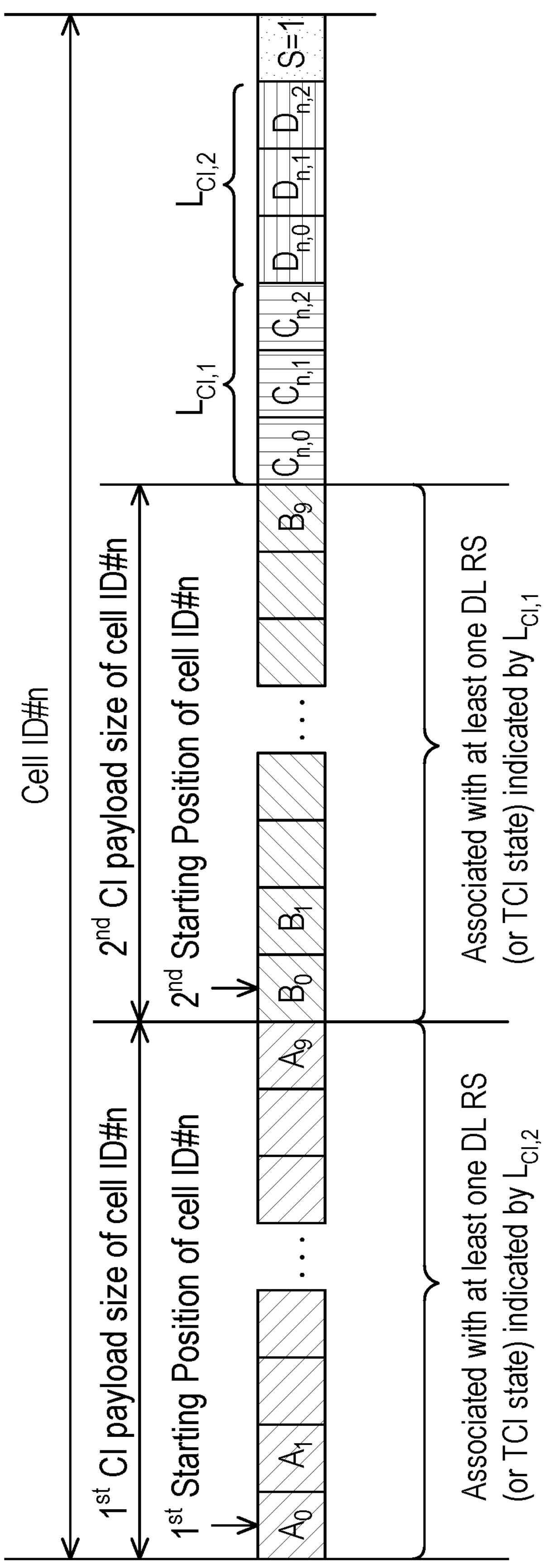

FIG. 32A and FIG. 32B are schematic diagrams that illustrate an explicit beam specific region of time and frequency resource for CI with a switching bit as "1" according to an exemplary embodiment of the present disclosure. Referring to FIG. 32A, TRP #1 serves UE1 and UE2. TRP #2 serves UE1, UE3, and UE5. TRP #1 allocates resources for (HP) PUSCH 1 of UE2 and (LP) PUSCH 1 of UE1. TRP #2 allocates resources for (HP) PUSCH 2 of UE3, (LP) PUSCH 3 of UE5, and (LP) PUSCH 2 of UE1.

Referring to FIG. 32B, if the bit (e.g., "S")="1" for spatial relative information (e.g., DL RS or TCI state) switching/swap, the $1^{st}$ CI payload size and/or the $1^{st}$ start position may be associated with at least one DL RS (or TCI state) indicated by $L_{CI,1}$, and the $2^{nd}$ CI payload size and/or the $2^{nd}$ start position may be associated with at least one DL RS (or TCI state) indicated by $L_{CI,2}$.

In one embodiment, the UE may report the capability of cancelling the first UL transmission according to the first DCI. In one embodiment, the capability of cancelling the first UL transmission includes cancelling the first UL transmission according to a set of time and frequency resources indicated by the first DCI. For example, capability 0: it means the capability of handling Cell specific CI as shown in FIG. 2.

In one embodiment, the capability of cancelling the first UL transmission includes cancelling the first UL transmission according to a set of time and frequency resource, and SRS resource set or CORESET pool index indicated by the first DCI. For example, capability 1: it means the capability of handling Cell specific CI as shown in FIG. 2 and TRP/Panel specific CI as shown in FIGS. 14, 19, 20B, and/or 21B.

In one embodiment, the capability of cancelling the first UL transmission includes cancelling the first UL transmission according to a set of time and frequency resource, SRS resource set or CORESET pool index, and TCI state indicated by the first DCI. For example, capability 2: it means the capability of handling Cell specific CI as shown in FIG. 2, TRP/Panel specific CI as shown in FIGS. 14, 19, 20B, and/or 21B, and Beam specific CI as shown in FIGS. 24, 26A, 27B, 28B, 29B, 31B, and/or 32B.

Figure 33:
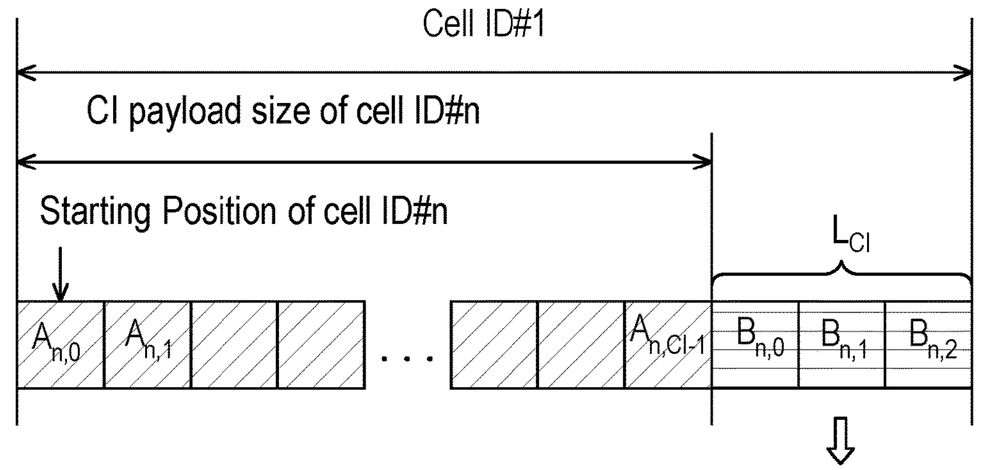
FIG. 33 is a schematic diagram that illustrates UE capability of CI according to an exemplary embodiment of the present disclosure.
Figure 33:
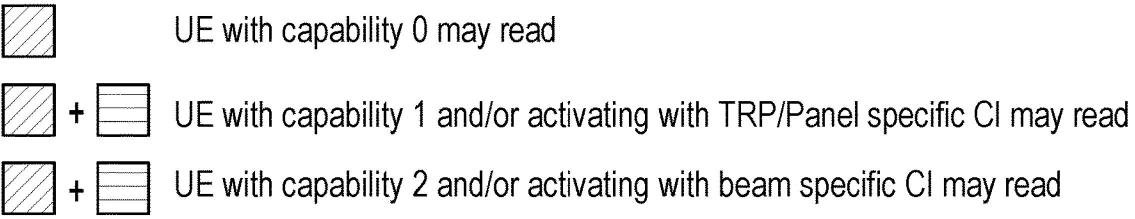

For example, FIG. 33 is a schematic diagram that illustrates UE capability of CI according to an exemplary embodiment of the present disclosure. Referring to FIG. 33, for cell ID #n, UE with capability 0 may merely read bits $A_{n,0}$ to $A_{n,CI-1}$. Bits $B_{n,0}$ to $B_{n,2}$ may be associated with at least one DL RS (or TCI state) and/or a CORESETPoolIndex (or a SRS resource set). UE with capability 1 and/or activating with TRP/Panel specific CI may read bits $A_{n,0}$ to $A_{n,CI-1}$ and bits $B_{n,0}$ to $B_{n,2}$. UE with capability 2 and/or activating with beam specific CI may read bits $A_{n,0}$ to $A_{n,CI-1}$ and bits $B_{n,0}$ to $B_{n,2}$.

Figure 34:
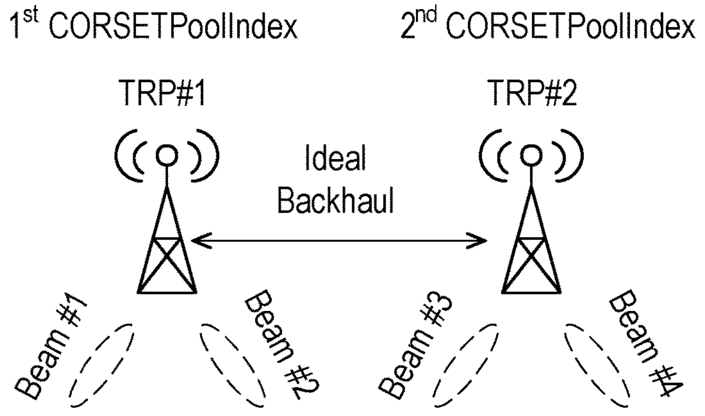
FIG. 34 is a schematic diagram that illustrates associations between UE capabilities and codepoint according to an exemplary embodiment of the present disclosure.

FIG. 34 is a schematic diagram that illustrates associations between UE capabilities and codepoint according to an exemplary embodiment of the present disclosure. Referring to FIG. 34, table (8) is an association between UE capabilities and codepoint.

TABLE 8

| $L_{CI,1}$ e.g., $<B_{n,0}, B_{n,1}, B_{n,2}>$ | UE with capability 2 (Beam specific CI) | UE with capability 1 (TRP/Panel specific CI) |
|---|---|---|
| 000 | 1st SRS resource set (or 1st CORESETPoolIndex) | 1st SRS resource set (or 1st CORESETPoolIndex) |
| 001 | 2nd SRS resource set (or 2nd CORESETPoolIndex) | 2nd SRS resource set (or 2nd CORESETPoolIndex) |
| 010 | UL transmission cancellation may be applied irrespective of beam relative information and/or priority level | UL transmission cancellation may be applied irrespective of TRP/Panel relative information and/or priority level |
| 011 | UL CI may be applicable to a UL transmission indicated/configured as low priority level | UL CI may be applicable to a UL transmission indicated/configured as low priority level |
| 100 | $1^{st}$ DL RS (or $1^{st}$ TCI state) | $1^{st}$ SRS resource set (or $1^{st}$ CORESETPoolIndex) |
| 101 | $2^{nd}$ DL RS (or $2^{nd}$ TCI state) | $1^{st}$ SRS resource set (or $1^{st}$ CORESETPoolIndex) |
| 110 | $3^{rd}$ DL RS (or $3^{rd}$ TCI state) | $2^{nd}$ SRS resource set (or $2^{nd}$ CORESETPoolIndex) |
| 111 | $4^{th}$ DL RS (or $4^{th}$ TCI state) | $2^{nd}$ SRS resource set (or $2^{nd}$ CORESETPoolIndex) |

Figure 35A:
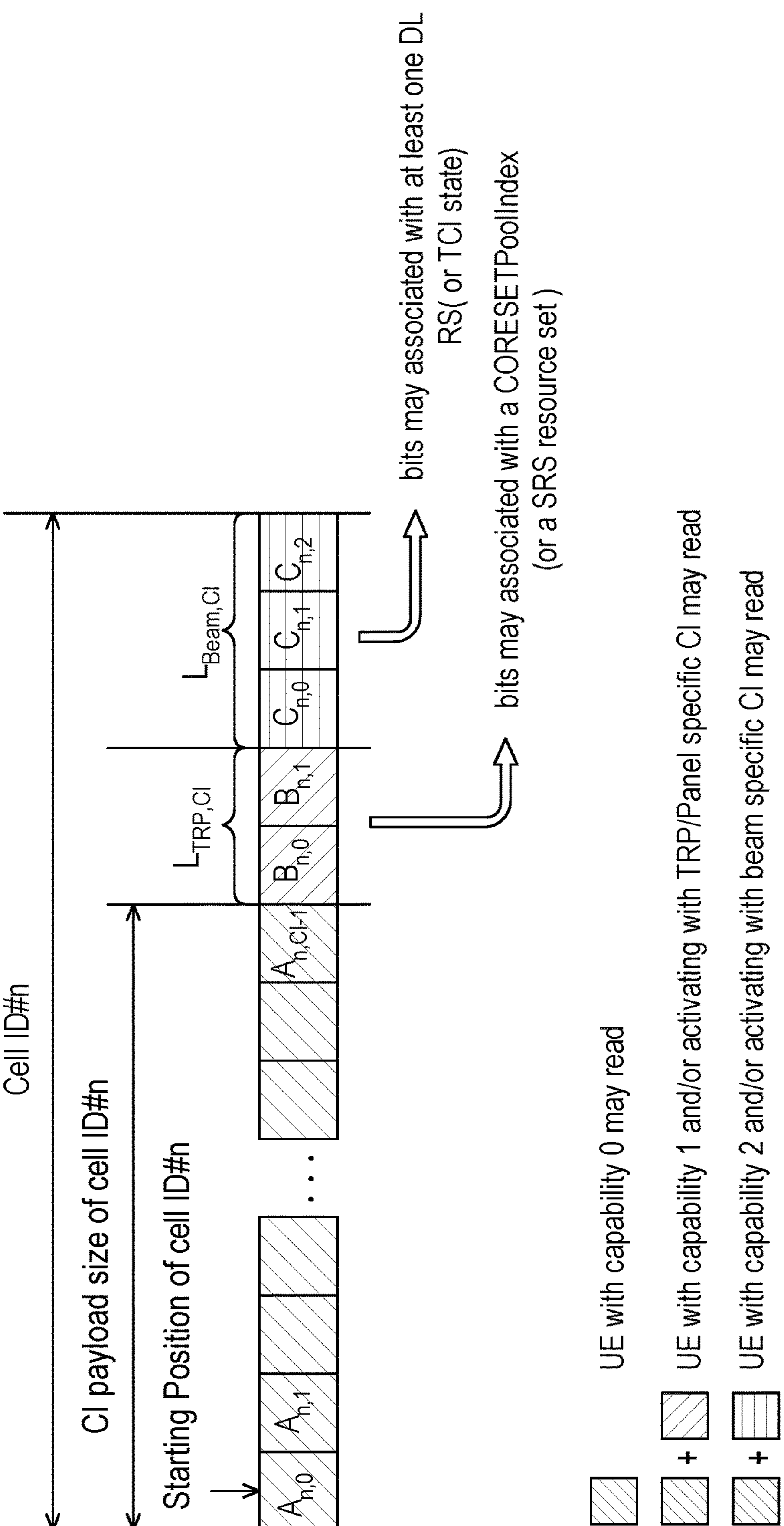
FIG. 35A is a schematic diagram that illustrates UE capability of CI according to an exemplary embodiment of the present disclosure.

FIG. 35A is a schematic diagram that illustrates UE capability of CI according to an exemplary embodiment of the present disclosure. Referring to FIG. 35A, for cell ID #n, UE with capability 0 may merely read bits $A_{n,0}$ to $A_{n,CI-1}$. $L_{TRP,CI}$ includes bits $B_{n,0}$ to $B_{n,1}$. Bits $B_{n,0}$ to $B_{n,2}$ may be associated with a CORES ETPoolIndex (or a SRS resource set. UE with capability 1 and/or activating with TRP/Panel specific CI may read bits $A_{n,0}$ to $A_{n,CI-1}$ and bits $B_{n,0}$ to $B_{n,1}$. $L_{Beam,CI}$ includes bits $C_{n,0}$ to $C_{n,1}$. Bits $C_{n,0}$ to $C_{n,2}$ may be associated with at least one DL RS (or TCI state). UE with capability 2 and/or activating with beam specific CI may read bits $A_{n,0}$ to $A_{n,CI-1}$ and bits $C_{n,0}$ to $C_{n,2}$.

Figure 35B:
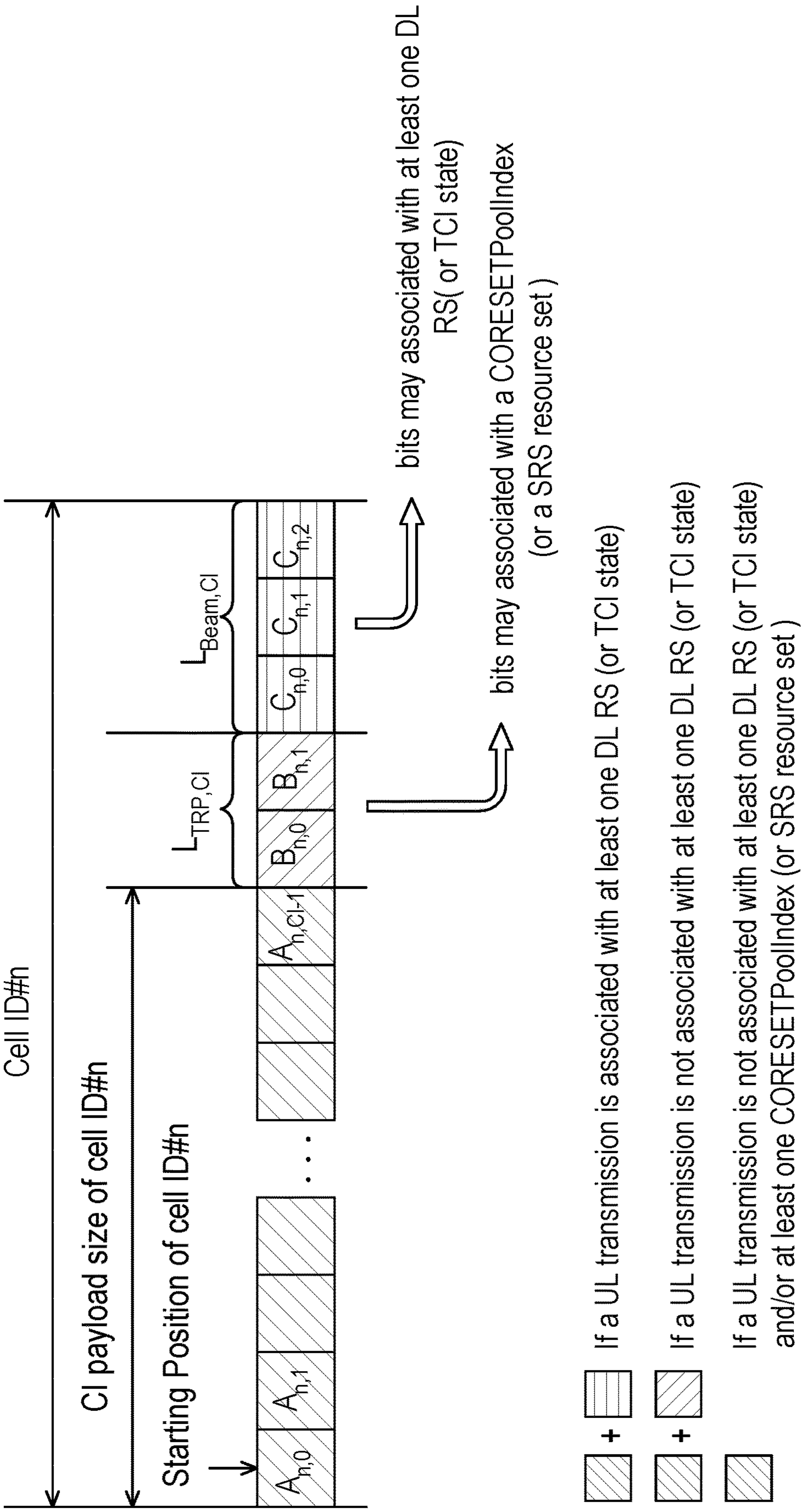
FIG. 35B is a schematic diagram that illustrates UE capability of CI according to an exemplary embodiment of the present disclosure.

FIG. 35B is a schematic diagram that illustrates UE capability of CI according to an exemplary embodiment of the present disclosure. Referring to FIG. 35B, UE may report capability 2. UE with capability 2 and/or activating with beam specific CI may read:

- bits $A_{n,0}$ to $A_{n,CI-1}$ and bits $C_{n,0}$ to $C_{n,2}$ if a UL transmission is associated with at least one DL RS (or TCI state);
- bits $A_{n,0}$ to $A_{n,CI-1}$ and bits $B_{n,0}$ to $C_{n,1}$ if a UL transmission is not associated with at least one DL RS (or TCI state);
- merely bits $A_{n,0}$ to $A_{n,CI-1}$ if a UL transmission is not associated with at least one DL RS (or TCI state) and/or at least one CORESETPoolIndex (or SRS resource set).

Figure 35C:
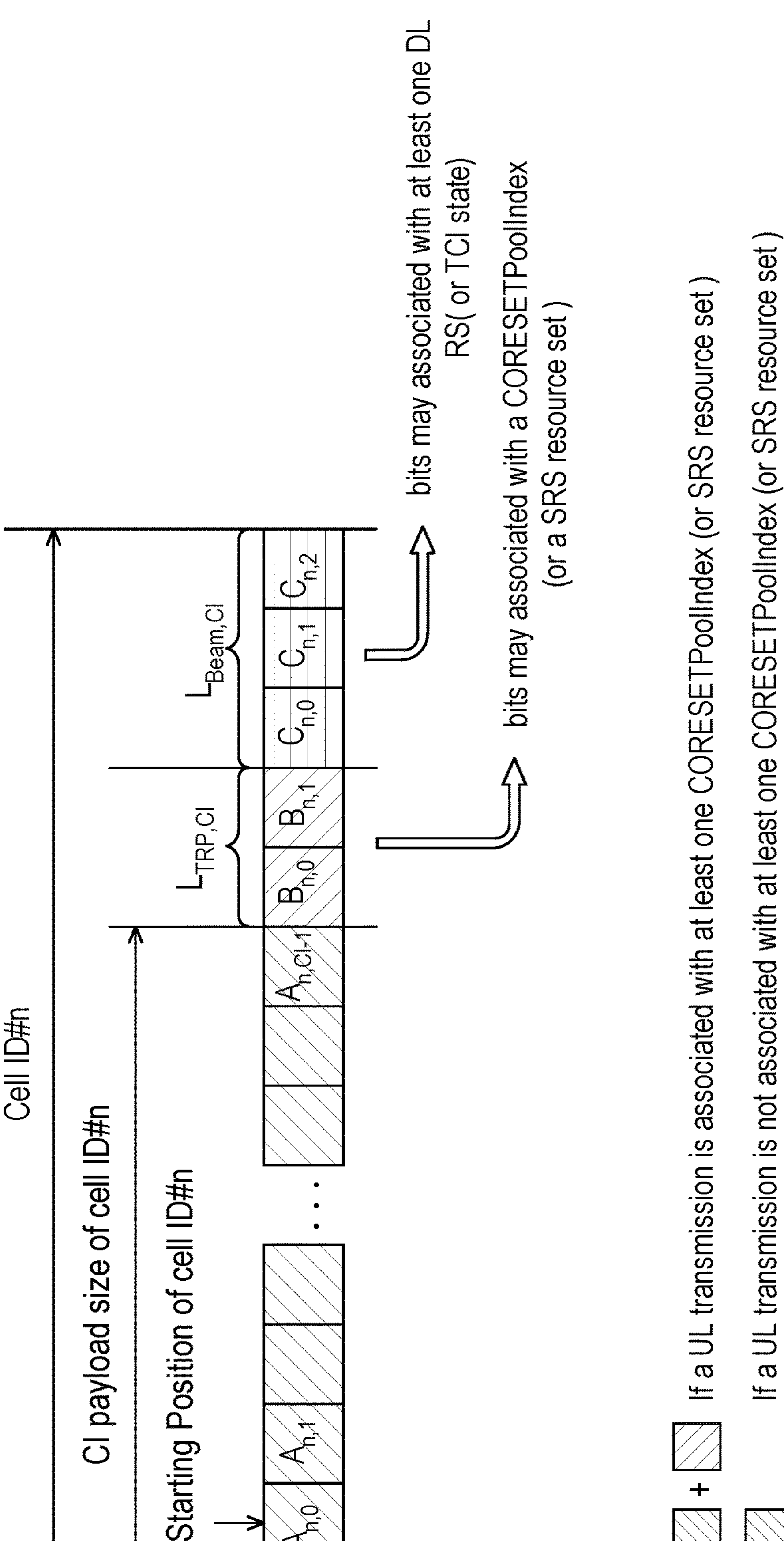
FIG. 35C is a schematic diagram that illustrates UE capability of CI according to an exemplary embodiment of the present disclosure.

FIG. 35C is a schematic diagram that illustrates UE capability of CI according to an exemplary embodiment of the present disclosure. Referring to FIG. 35C, UE may report capability 1. UE with capability 1 and/or activating with TRP/Panel specific CI may read:

- bits $A_{n,0}$ to $A_{n,CI-1}$ and bits $B_{n,0}$ to $C_{n,1}$ if a transmission is associated with at least one CORESETPoolIndex (or SRS resource set);
- merely bits $A_{n,0}$ to $A_{n,CI-1}$ if a UL transmission is not associated with at least one CORESETPoolIndex (or SRS resource set).

In one embodiment, the second information is associated with the first SRS resource set, the first CORESET pool index, or the first TCI state. The UE may receive a third DCI, where the third DCI indicates a second UL transmission associated with the first SRS resource set, the first CORESET pool index, or the first TCI state. The UE may disable transmitting the second UL transmission over a first set of symbols, where the first set of symbols is overlapped symbols of cancelled first UL transmission.

Figure 36:
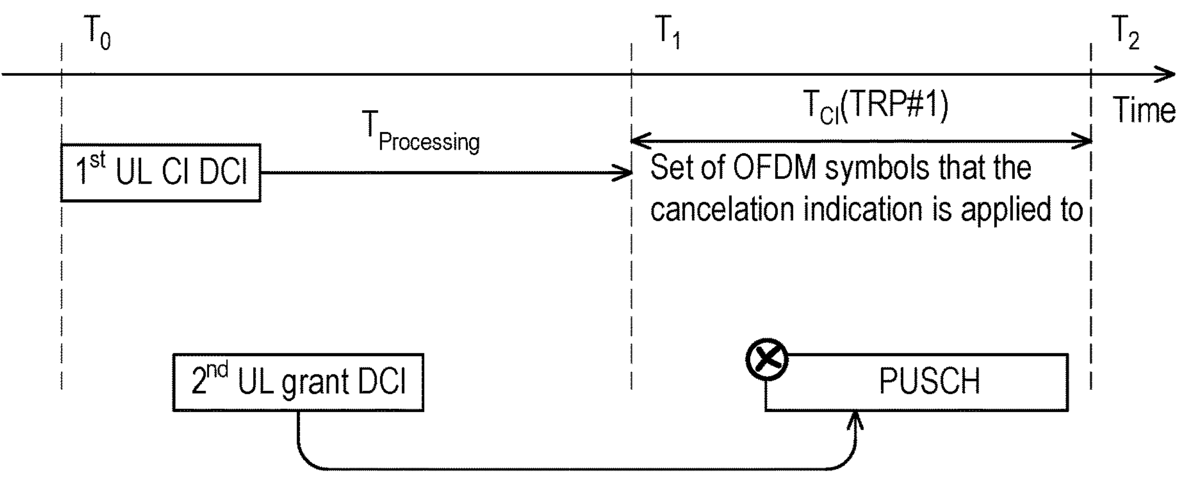
FIG. 36 is a schematic diagram that illustrates UL transmission restriction according to an exemplary embodiment of the present disclosure.

For example, FIG. 36 is a schematic diagram that illustrates UL transmission restriction according to an exemplary embodiment of the present disclosure. Referring to FIG. 36, at $T_0$, a UE receives $1^{st}$ UL CI DCI. After processing time $T_{processing}$, an UL transmission is cancelled over a set of OFDM symbols (the duration of the symbols is $T_{CI}$) that the CI is applied to. On the other hand, before $T_1$, a UE receives $2^{nd}$ UL grant DCI for allocating resources of a PUSCH between $T_1$ and $T_2$. The UL transmission (e.g.,) may not be expected within the duration of symbols after receiving UL CI DCI.

Figure 37:
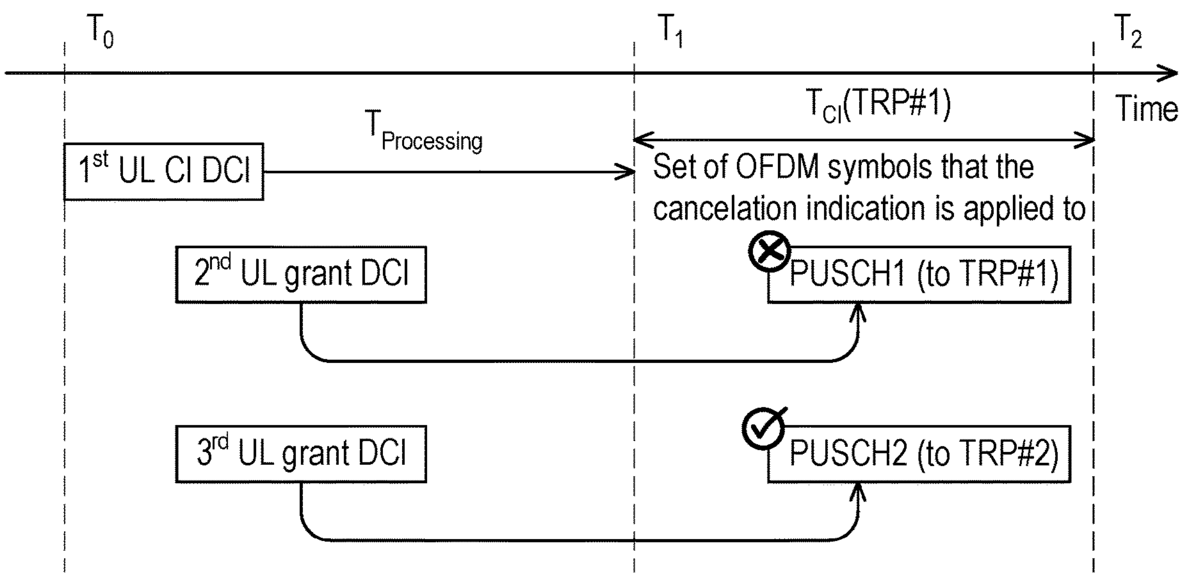
FIG. 37 is a schematic diagram that illustrates spatial domain UL transmission restriction according to an exemplary embodiment of the present disclosure.

In one embodiment, a last symbol of PDCCH reception providing the third DCI is later than the initial symbol of another PDCCH reception providing the first DCI. For example, FIG. 37 is a schematic diagram that illustrates spatial domain UL transmission restriction according to an exemplary embodiment of the present disclosure. Referring to FIG. 37, if a UE cancels a $1^{st}$ UL transmission (e.g., a PUSCH transmission or an SRS transmission) associated with a $1^{st}$ TRP/Panel/Beam relative information based on a $1^{st}$ DCI format e.g., for UL CI, the UE may not expect to be scheduled by a $2^{nd}$ DCI format to transmit a $2^{nd}$ UL transmission (e.g., a PUSCH or an SRS transmission) associated with a $2^{nd}$ TRP/Panel/Beam relative information over a first set of symbols. The first set of symbols may include symbols of the cancelled $1^{st}$ UL transmission. The last symbol of the PDCCH reception providing the $2^{nd}$ DCI format may be later than the first symbol of the PDCCH reception providing the $1^{st}$ DCI format.

In one embodiment, the resource configuration further includes an UL cancellation priority field. UL CI and/or intra-UE priority indicator may be configured for a given UE.

In response to the UL cancellation priority field being present, the priority level is configured as low priority level to the first UL transmission. The UL transmission may be associated with a $1^{st}$ TRP/Panel/Beam relative information and/or a $2^{nd}$ TRP/Panel/Beam relative information based on a DCI format (e.g., $1^{st}$ DCI format) for UL CI. On the other hand, in response to the UL cancellation priority field being absent, the irrespective of the priority level is configured to the first UL transmission. The UL transmission may be associated with a $1^{st}$ TRP/Panel/Beam relative information and/or a $2^{nd}$ TRP/Panel/Beam relative information based on a DCI format (e.g., $1^{st}$ DCI format) for UL CI.

In one embodiment, the first UL transmission includes at least one of PUSCH and SRS transmissions.

Figure 38:
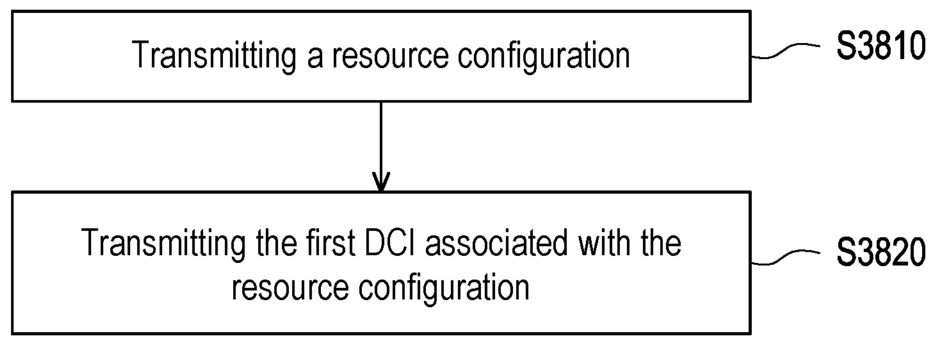
FIG. 38 is a flow chart that illustrates a resource cancellation method according to an exemplary embodiment of the present disclosure.

FIG. 38 is a flow chart that illustrates a resource cancellation method according to an exemplary embodiment of the present disclosure. Referring to FIG. 38, the method is adapted for a network device. The network device transmits a resource configuration (step S3810). The resource configuration indicates the position of first information for a serving cell in a first downlink control information (DCI), and the first information is associated with a first set of time and frequency resource in the serving cell. The network device transmits the first DCI associated with the resource configuration (step S3820). The first DCI indicates cancelling a first uplink (UL) transmission on the serving cell.

In one embodiment, the resource configuration further indicates a position of second information for the serving cell in the first DCI.

In one embodiment, the second information indicates at least one of following information:

- at least one of a first sound reference signal (SRS) resource set and a first control resource set (CORESET) pool index;
- at least one of a second SRS resource set and a second CORESET pool index; a priority level; and
- irrespective of the priority level.

In one embodiment, the resource configuration further indicates a position of third information for the serving cell in the first DCI, and the third information is associated with a second set of the time and frequency resource in the serving cell.

In one embodiment, the first set of the time and frequency resource corresponds to a first spatial relation, and the second set of the time and frequency resource corresponds to a second spatial relation.

In one embodiment, the resource configuration further includes a first bit. In response to configuring the first bit as a first value, the first set of the time and frequency resource is associated with at least one of a first SRS resource set and a first CORESET pool index, and the second set of the time and frequency resource is associated with at least one of a second SRS resource set and a second CORESET pool index. In response to configuring the first bit as a second value, the first set of the time and frequency resource is associated with at least one of the second SRS resource set and the second CORESET pool index, and the second set of the time and frequency resource is associated with the at least one of the first SRS resource set and the first CORESET pool index.

In one embodiment, the position of the third information in the first DCI includes a starting position of the third information and a length of the third information.

In one embodiment, the network device may transmit a second DCI, wherein the second DCI indicates the first UL transmission, where the first DCI is associated with a first CORESET pool index, and the second DCI is associated with a second CORESET pool index.

In one embodiment, the second information further indicates a first TCI state.

In one embodiment, the second information is a bitmap indicating a first set of TCI state.

In one embodiment, the resource configuration further includes fourth information related to TCI state.

In one embodiment, the network device may receive a capability of cancelling the first UL transmission according to the first DCI.

In one embodiment, the capability of cancelling the first UL transmission includes cancelling the first UL transmission according to a set of time and frequency resource indicated by the first DCI.

In one embodiment, the capability of cancelling the first UL transmission includes cancelling the first UL transmission according to a set of time and frequency resource, and SRS resource set or CORESET pool index indicated by the first DCI.

In one embodiment, the capability of cancelling the first UL transmission includes cancelling the first UL transmission according to a set of time and frequency resource, SRS resource set or CORESET pool index, and TCI state indicated by the first DCI.

In one embodiment, the second information is associated with the first SRS resource set, the first CORESET pool index, or the first TCI state. The network device may transmit a third DCI. The third DCI indicates a second UL transmission associated with the first SRS resource set, the first CORESET pool index, or the first TCI state, the second UL transmission is disabled over a first set of symbols, and the first set of symbols is overlapped symbols of cancelled first UL transmission.

In one embodiment, the resource configuration further includes an UL cancellation priority field. In response to configuring the UL cancellation priority field as being present, the priority level is configured as low priority level to the first UL transmission. In response to configuring the UL cancellation priority field as absent, the irrespective of the priority level is configured to the first UL transmission.

In one embodiment, the first UL transmission includes at least one of physical uplink shared channel (PUSCH) and SRS.

The detail description of embodiments of the network device may refer to the aforementioned embodiments adapted for UE and would be omitted.

Figure 39:
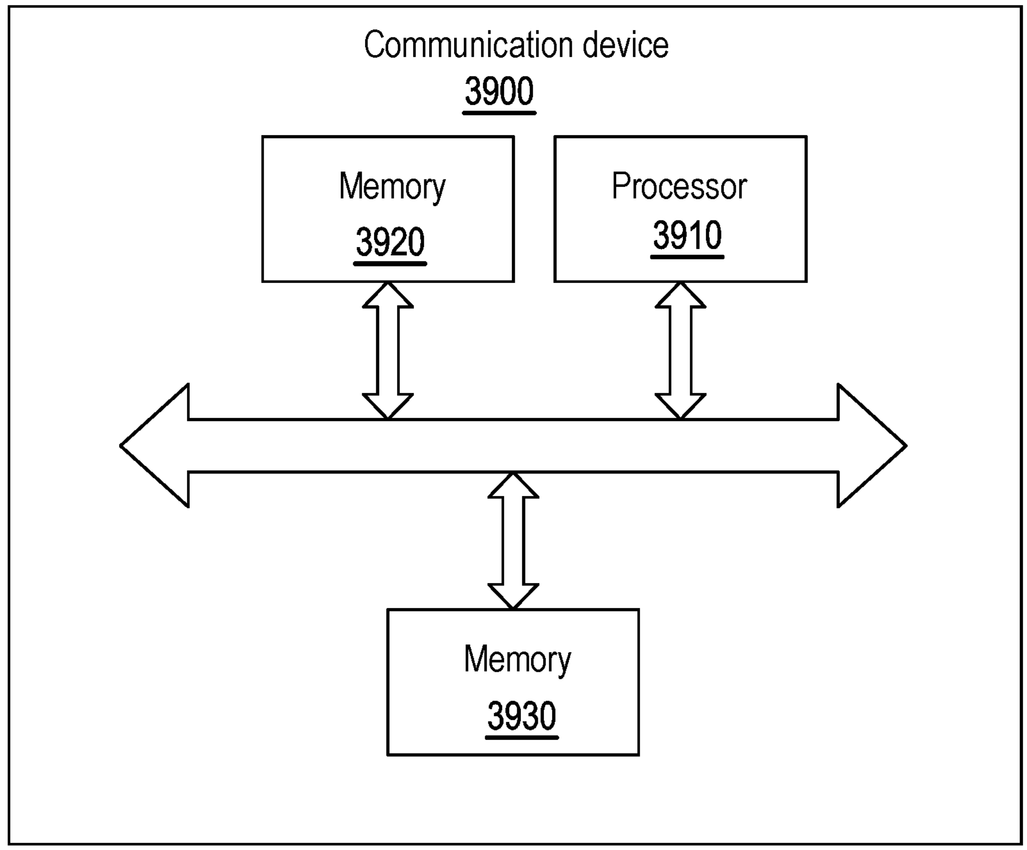
FIG. 39 is a block diagram that illustrates a communication device according to an exemplary embodiment of the present disclosure.

FIG. 39 is a block diagram that illustrates a communication device 3900 according to an exemplary embodiment of the present disclosure. Referring to FIG. 39, the communication device 3900 may be a UE or a network device. The communication device 3900 may include, but is not limited thereto a processor 3910. The processor 3910 (e.g., having processing circuitry) may include an intelligent hardware device, e.g., a Central Processing Unit (CPU), a microcontroller, an ASIC, etc. The processor 3910 can call and run a computer program from memory to implement the method in the embodiment of the disclosure.

Since the program code stored in the communication device 3900 adopts all the technical solutions of all the foregoing embodiments when being executed by the processor 3910, it at least has all the advantageous effects brought by all the technical solutions of all the foregoing embodiments, and no further description is incorporated herein.

Optionally, as shown in FIG. 39, the communication device 3900 may further include a memory 3920. The memory 3900 may include computer-storage media in the form of volatile and/or non-volatile memory. The memory 3900 may be removable, non-removable, or a combination thereof. Exemplary memory includes solid-state memory, hard drives, optical-disc drives, etc. The processor 3910 may call and run a computer program from the memory 520 to implement the method in the embodiment of the disclosure.

The memory 3920 may be a separate device independent of the processor 3910, or may be integrated in the processor 3910.

Optionally, as shown in FIG. 39, the communication device 3900 may further include a transceiver 3930, and the processor 3910 may control the transceiver 3930 to communicate with other devices. The transceiver 3900 having a transmitter (e.g., transmitting/transmission circuitry) and a receiver (e.g., receiving/reception circuitry) may be configured to transmit and/or receive time and/or frequency resource partitioning information. In some implementations, the transceiver 3900 may be configured to transmit in different types of subframes and slots including, but not limited to, usable, non-usable and flexibly usable subframes and slot formats. The transceiver 3900 may be configured to receive data and control channels.

Specifically, the transceiver 3930 may send information or data to other devices, or receive information or data sent by other devices.

Specifically, the transceiver 3930 may include a transmitter and a receiver. The transceiver 3930 may further include an antenna, and the number of antennas may be one or more.

Optionally, the communication device 3900 may specifically be a network device in an embodiment of the disclosure, and the communication device 3900 may implement the corresponding process implemented by the network device in various methods of the embodiment of the disclosure. For the conciseness, related descriptions are omitted.

Optionally, the communication device 3900 may specifically be a mobile terminal, a terminal device, or a UE in an embodiment of the disclosure, and the communication device 3900 may implement the corresponding process implemented by the mobile terminal, the terminal device, or the UE in various methods in the embodiment of the disclosure. For conciseness, related description is omitted.

In summary, in the resource cancellation method, the user equipment, and the network device of the embodiments of the disclosure, cell specific CI, TRP/panel specifc CI, and beam specific CI are introduced. Therefore, throughput loss may be reduced, and the embodiment could be applicable to STxMP and different spatial relation configurations for UL transmission.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A resource cancellation method, adapted for a user equipment (UE), the method comprising:

receiving a resource configuration, wherein the resource configuration indicates a position of first information for a serving cell in a first downlink control information (DCI), and the first information is associated with a first set of time and frequency resource in the serving cell;

receiving the first DCI associated with the resource configuration;

cancelling a first uplink (UL) transmission on the serving cell according to the first DCI;

receiving a configuration of simultaneous multi-panel UL transmission (STxMP) of multiple DCI; and receiving a configuration of a first sound reference signal (SRS) resource set and a second SRS resource set, wherein the first SRS resource set is associated with a first control resource set (CORESET) pool index and the second SRS resource set is associated with a second CORESET pool index, wherein the resource configuration further comprises an UL cancellation priority field, in response to the UL cancellation priority field being present, a priority level is configured as low priority level to the first UL transmission; and in response to the UL cancellation priority field being absent, an irrespective of the priority level is configured to the first UL transmission.

2. The method according to claim 1, wherein cancelling the first UL transmission on the serving cell according to the first information comprises:

cancelling the first UL transmission on the serving cell according to the first information in the first DCI.

3. The method according to claim 1, wherein the resource configuration further indicates a position of second information for the serving cell in the first DCI.

4. The method according to claim 3, wherein the second information indicates at least one of following information:

at least one of the first sound reference signal (SRS) resource set and the first control resource set (CORESET) pool index;

at least one of the second SRS resource set and the second CORESET pool index;

the priority level; and the irrespective of the priority level.

5. The method according to claim 3, wherein cancelling the first UL transmission on the serving cell according to the first DCI comprises:

cancelling the first UL transmission on the serving cell according to the first information and the second information in the first DCI.

6. The method according to claim 5, wherein the resource configuration further indicates a payload size of the first DCI, and the position of the first information in the first DCI comprises a starting position of the first information and a length of the first information.

7. The method according to claim 4, wherein the second information further indicates a first TCI state.

8. The method according to claim 7, wherein the second information is associated with the first SRS resource set, the first CORESET pool index, or the first TCI state, the method further comprises:

receiving a third DCI, wherein the third DCI indicates a second UL transmission associated with the first SRS resource set, the first CORESET pool index, or the first TCI state; and disabling transmitting the second UL transmission over a first set of symbols, wherein the first set of symbols is overlapped symbols of cancelled first UL transmission.

9. The method according to claim 8, wherein a last symbol of physical downlink control channel (PDCCH) reception providing the third DCI is later than an initial symbol of another PDCCH reception providing the first DCI.

10. The method according to claim 3, wherein the second information is a bitmap indicating a first set of TCI state.

11. The method according to claim 10, wherein the first set of the time and frequency resource is associated with one of the first set of TCI state indicated by the second information.

12. The method according to claim 1, wherein the resource configuration further indicates a position of third information for the serving cell in the first DCI, and the third information is associated with a second set of the time and frequency resource in the serving cell.

13. The method according to claim 12, wherein the first set of the time and frequency resource corresponds to a first spatial relation, and the second set of the time and frequency resource corresponds to a second spatial relation.

14. The method according to claim 13, wherein the first spatial relation comprises at least one of the first SRS resource set, a first transmission configuration indicator (TCI) state and a first value of CORESET pool index; and the second spatial relation comprises at least one of the second SRS resource set, a second transmission configuration indicator (TCI) state and a second value of CORESET pool index.

15. The method according to claim 12, wherein the resource configuration further comprises a first bit, in response to the first bit being a first value, the first set of the time and frequency resource is associated with at least one of the first SRS resource set and the first CORESET pool index, and the second set of the time and frequency resource is associated with at least one of the second SRS resource set and the second CORESET pool index; and in response to the first bit being a second value, the first set of the time and frequency resource is associated with at least one of the second SRS resource set and the second CORESET pool index, and the second set of the time and frequency resource is associated with the at least one of the first SRS resource set and the first CORESET pool index.

16. The method according to claim 12, wherein cancelling the first UL transmission on the serving cell according to the first DCI comprises:

cancelling the first UL transmission on the serving cell according to the first information and the third information in the first DCI.

17. The method according to claim 12, wherein the position of the third information in the first DCI comprises a starting position of the third information and a length of the third information.

18. The method according to claim 12, wherein the resource configuration further comprises fourth information related to TCI state.

19. The method according to claim 18, wherein the fourth information indicates at least one of following information:

a first TCI state;
the priority level; and
the irrespective of the priority level.

20. The method according to claim 18, wherein the resource configuration further comprises fifth information related to the TCI state.

21. The method according to claim 20, wherein the fifth information indicates at least one of following information:
a second TCI state;
the priority level; and
the irrespective of the priority level.

22. The method according to claim 20, wherein the resource configuration further comprises a second bit,
in response to the second bit being a third value,
the first set of the time and frequency resource is associated with the fourth information, and
the second set of the time and frequency resource is associated with the fifth information; and
in response to the second bit being a fourth value,
the first set of the time and frequency resource is associated with the fifth information, and
the second set of the time and frequency resource is associated with the fourth information.

23. The method according to claim 1, further comprising:
receiving a second DCI, wherein the second DCI indicates the first UL transmission, wherein the first DCI is associated with the first CORESET pool index, and the second DCI is associated with the second CORESET pool index.

24. The method according to claim 23, wherein cancelling the first UL transmission on the serving cell according to the first information comprises:
cancelling the first UL transmission on the serving cell according to the first DCI in response to the first CORESET pool index being same as the second CORESET pool index.

25. The method according to claim 1, further comprising:
reporting a capability of cancelling the first UL transmission according to the first DCI.

26. The method according to claim 25, wherein the capability of cancelling the first UL transmission comprises cancelling the first UL transmission according to a set of time and frequency resource indicated by the first DCI.

27. The method according to claim 25, wherein the capability of cancelling the first UL transmission comprises cancelling the first UL transmission according to a set of time and frequency resource, and SRS resource set or CORESET pool index indicated by the first DCI.

28. The method according to claim 25, wherein the capability of cancelling the first UL transmission comprises cancelling the first UL transmission according to a set of time and frequency resource, SRS resource set or CORESET pool index, and TCI state indicated by the first DCI.

29. The method according to claim 1, wherein the first UL transmission comprises at least one of physical uplink shared channel (PUSCH) and SRS.

30. A user equipment (UE), comprising:
a transceiver, used for transmitting or receiving signals;
a memory, used for storing a program code; and
a processor, coupled to the transceiver and the memory, and configured for executing the program code to:
receive, through the transceiver, a resource configuration, wherein the resource configuration indicates a position of first information for a serving cell in a first downlink control information (DCI), and the first information is associated with a first set of time and frequency resource in the serving cell;
receive, through the transceiver, the first DCI associated with the resource configuration;
cancel a first uplink (UL) transmission on the serving cell according to the first DCI;
receive a configuration of simultaneous multi-panel UL transmission (STxMP) of multiple DCI; and
receive a configuration of a first sound reference signal (SRS) resource set and a second SRS resource set,
wherein the first SRS resource set is associated with a first control resource set (CORESET) pool index and the second SRS resource set is associated with a second CORESET pool index,
wherein the resource configuration further comprises an UL cancellation priority field,
in response to the UL cancellation priority field being present,
a priority level is configured as low priority level to the first UL transmission; and
in response to the UL cancellation priority field being absent,
an irrespective of the priority level is configured to the first UL transmission.

31. A resource cancellation method, adapted for a network device, the method comprising:
transmitting a resource configuration, wherein the resource configuration indicates a position of first information for a serving cell in a first downlink control information (DCI), and the first information is associated with a first set of time and frequency resource in the serving cell;
transmitting the first DCI associated with the resource configuration, wherein the first DCI indicates cancelling a first uplink (UL) transmission on the serving cell;
transmitting a configuration of simultaneous multi-panel UL transmission (STxMP) of multiple DCI; and
transmitting a configuration of a first sound reference signal (SRS) resource set and a second SRS resource set,
wherein the first SRS resource set is associated with a first control resource set (CORESET) pool index and the second SRS resource set is associated with a second CORESET pool index,
wherein the resource configuration further comprises an UL cancellation priority field,
in response to the UL cancellation priority field being present,
a priority level is configured as low priority level to the first UL transmission; and
in response to the UL cancellation priority field being absent,
an irrespective of the priority level is configured to the first UL transmission.

32. The method according to claim 31, wherein the resource configuration further indicates a position of second information for the serving cell in the first DCI.

33. The method according to claim 32, wherein the second information indicates at least one of following information:
at least one of the first sound reference signal (SRS) resource set and the first control resource set (CORESET) pool index;
at least one of the second SRS resource set and the second CORESET pool index;
the priority level; and
the irrespective of the priority level.

34. The method according to claim 33, wherein the second information further indicates a first TCI state.

35. The method according to claim 34, wherein the second information is associated with the first SRS resource set, the first CORESET pool index, or the first TCI state, the method further comprises:

transmitting a third DCI, wherein the third DCI indicates a second UL transmission associated with the first SRS resource set, the first CORESET pool index, or the first TCI state, the second UL transmission is disabled over a first set of symbols, and the first set of symbols is overlapped symbols of cancelled first UL transmission.

36. The method according to claim 32, wherein the second information is a bitmap indicating a first set of TCI state.

37. The method according to claim 31, wherein the resource configuration further indicates a position of third information for the serving cell in the first DCI, and the third information is associated with a second set of the time and frequency resource in the serving cell.

38. The method according to claim 37, wherein the first set of the time and frequency resource corresponds to a first spatial relation, and the second set of the time and frequency resource corresponds to a second spatial relation.

39. The method according to claim 37, wherein the resource configuration further comprises a first bit, in response to configuring the first bit as a first value, the first set of the time and frequency resource is associated with at least one of the first SRS resource set and the first CORESET pool index, and the second set of the time and frequency resource is associated with at least one of the second SRS resource set and the second CORESET pool index; and in response to configuring the first bit as a second value, the first set of the time and frequency resource is associated with at least one of the second SRS resource set and the second CORESET pool index, and the second set of the time and frequency resource is associated with the at least one of the first SRS resource set and the first CORESET pool index.

40. The method according to claim 37, wherein the position of the third information in the first DCI comprises a starting position of the third information and a length of the third information.

41. The method according to claim 37, wherein the resource configuration further comprises fourth information related to TCI state.

42. The method according to claim 31, further comprising:

transmitting a second DCI, wherein the second DCI indicates the first UL transmission, wherein the first DCI is associated with the first CORESET pool index, and the second DCI is associated with the second CORESET pool index.

43. The method according to claim 31, further comprising: receiving a capability of cancelling the first UL transmission according to the first DCI.

44. The method according to claim 43, wherein the capability of cancelling the first UL transmission comprises cancelling the first UL transmission according to a set of time and frequency resource indicated by the first DCI.

45. The method according to claim 43, wherein the capability of cancelling the first UL transmission comprises cancelling the first UL transmission according to a set of time and frequency resource, and SRS resource set or CORESET pool index indicated by the first DCI.

46. The method according to claim 43, wherein the capability of cancelling the first UL transmission comprises cancelling the first UL transmission according to a set of time and frequency resource, SRS resource set or CORESET pool index, and TCI state indicated by the first DCI.

47. The method according to claim 31, wherein the first UL transmission comprises at least one of physical uplink shared channel (PUSCH) and SRS.

* * * * *